(12) United States Patent
Matsuoka

(10) Patent No.: US 9,098,096 B2
(45) Date of Patent: Aug. 4, 2015

(54) CONTINUOUS INTELLIGENT-CONTROL-SYSTEM UPDATE USING INFORMATION REQUESTS DIRECTED TO USER DEVICES

(75) Inventor: Yoky Matsuoka, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 331 days.

(21) Appl. No.: 13/440,910

(22) Filed: Apr. 5, 2012

(65) Prior Publication Data

US 2013/0268125 A1    Oct. 10, 2013

(51) Int. Cl.
*G05D 23/19* (2006.01)
*F24F 11/00* (2006.01)

(52) U.S. Cl.
CPC ........ *G05D 23/1917* (2013.01); *F24F 11/0012* (2013.01); *G05D 23/1905* (2013.01); *F24F 2011/0068* (2013.01)

(58) Field of Classification Search
CPC ................ G05B 2219/163; G05B 2219/25011
See application file for complete search history.

(56) References Cited

U.S. PATENT DOCUMENTS

| | | |
|---|---|---|
| 3,640,455 A | 2/1972 | Romanelli |
| 4,183,290 A | 1/1980 | Kucharczyk |
| 4,646,964 A | 3/1987 | Parker et al. |
| 4,656,835 A | 4/1987 | Kidder et al. |
| 4,657,179 A | 4/1987 | Aggers et al. |
| 4,742,475 A | 5/1988 | Kaiser et al. |
| 4,948,040 A | 8/1990 | Kobayashi et al. |
| 5,348,078 A | 9/1994 | Dushane et al. |
| 5,381,950 A | 1/1995 | Aldridge |
| 5,395,042 A | 3/1995 | Riley et al. |
| 5,460,327 A | 10/1995 | Hill et al. |
| 5,533,668 A | 7/1996 | Erikson |
| 5,544,036 A | 8/1996 | Brown, Jr. et al. |
| 5,595,342 A | 1/1997 | McNair et al. |
| 5,611,484 A | 3/1997 | Uhrich |
| 5,635,896 A | 6/1997 | Tinsley et al. |
| 5,644,173 A | 7/1997 | Elliason et al. |
| 5,761,083 A | 6/1998 | Brown, Jr. et al. |
| 5,802,467 A | 9/1998 | Salazar et al. |
| 5,839,654 A | 11/1998 | Weber |
| 5,926,776 A | 7/1999 | Glorioso et al. |
| 5,973,662 A | 10/1999 | Singers et al. |
| 6,020,881 A | 2/2000 | Naughton et al. |
| 6,095,427 A | 8/2000 | Hoium et al. |

(Continued)

FOREIGN PATENT DOCUMENTS

| | | |
|---|---|---|
| EP | 1275037 | 2/2006 |
| JP | 10023565 | 1/1998 |

OTHER PUBLICATIONS

Ecobee Smart Thermostat Installation Manual, Jun. 29, 2011, 20 pages.

(Continued)

*Primary Examiner* — Ryan Jarrett
(74) *Attorney, Agent, or Firm* — Kilpatrick Townsend & Stockton LLP

(57) ABSTRACT

An intelligent control system includes intelligent thermostats and controls an environment, such as a residential living space, commercial building, or another environment. The intelligent control system obtains information related to the controlled environment by collecting sensor data, obtaining data from users during interactive information-exchange sessions, and by directing information queries to users on one or more user devices.

18 Claims, 35 Drawing Sheets

(56) References Cited

U.S. PATENT DOCUMENTS

| | | |
|---|---|---|
| 6,116,512 A | 9/2000 | Dushane et al. |
| 6,122,603 A | 9/2000 | Budike, Jr. |
| 6,385,510 B1 | 5/2002 | Hoog et al. |
| 6,453,687 B2 | 9/2002 | Sharood et al. |
| 6,574,581 B1 | 6/2003 | Bohrer et al. |
| 6,604,023 B1 | 8/2003 | Brown et al. |
| 6,619,055 B1 | 9/2003 | Addy |
| 6,622,115 B1 | 9/2003 | Brown et al. |
| 6,622,925 B2 | 9/2003 | Carner et al. |
| 6,789,739 B2 | 9/2004 | Rosen |
| 6,798,341 B1 | 9/2004 | Eckel et al. |
| 6,851,621 B1 | 2/2005 | Wacker et al. |
| 6,891,838 B1 | 5/2005 | Petite et al. |
| 6,975,958 B2 | 12/2005 | Bohrer et al. |
| 6,983,889 B2 | 1/2006 | Alles |
| 6,997,390 B2 | 2/2006 | Alles |
| 7,038,667 B1 | 5/2006 | Vassallo et al. |
| 7,055,759 B2 | 6/2006 | Wacker et al. |
| 7,099,723 B2 * | 8/2006 | Gonzales et al. ............... 700/87 |
| 7,108,194 B1 | 9/2006 | Hankins, II |
| 7,135,965 B2 | 11/2006 | Chapman, Jr. et al. |
| 7,156,316 B2 | 1/2007 | Kates |
| 7,168,627 B2 | 1/2007 | Kates |
| 7,188,482 B2 | 3/2007 | Sadegh et al. |
| 7,222,800 B2 | 5/2007 | Wruck |
| 7,289,887 B2 | 10/2007 | Rodgers |
| 7,360,370 B2 | 4/2008 | Shah et al. |
| RE40,437 E | 7/2008 | Rosen |
| 7,427,926 B2 | 9/2008 | Sinclair et al. |
| 7,537,171 B2 | 5/2009 | Mueller et al. |
| 7,558,648 B2 | 7/2009 | Hoglund et al. |
| 7,605,714 B2 | 10/2009 | Thompson et al. |
| 7,832,465 B2 | 11/2010 | Zou et al. |
| 7,837,128 B2 | 11/2010 | Helt et al. |
| 7,847,681 B2 | 12/2010 | Singhal et al. |
| 7,890,195 B2 | 2/2011 | Bergman et al. |
| 7,900,849 B2 | 3/2011 | Barton et al. |
| 7,904,209 B2 * | 3/2011 | Podgorny et al. ............. 700/276 |
| 7,904,830 B2 | 3/2011 | Hoglund et al. |
| 8,219,249 B2 | 7/2012 | Harrod et al. |
| 8,415,829 B2 | 4/2013 | Di Cristofaro |
| 8,442,752 B2 | 5/2013 | Wijaya et al. |
| 2003/0034898 A1 | 2/2003 | Shamoon et al. |
| 2004/0034638 A1 * | 2/2004 | Brown et al. .................... 707/10 |
| 2004/0256472 A1 | 12/2004 | DeLuca |
| 2005/0043907 A1 | 2/2005 | Eckel et al. |
| 2005/0159847 A1 | 7/2005 | Shah et al. |
| 2005/0194455 A1 | 9/2005 | Alles |
| 2005/0194456 A1 | 9/2005 | Tessier et al. |
| 2005/0270151 A1 | 12/2005 | Winick |
| 2006/0105697 A1 | 5/2006 | Aronstam et al. |
| 2006/0149395 A1 | 7/2006 | Archacki et al. |
| 2006/0186214 A1 | 8/2006 | Simon et al. |
| 2006/0208099 A1 | 9/2006 | Chapman et al. |
| 2006/0218244 A1 * | 9/2006 | Rasmussen et al. .......... 709/218 |
| 2007/0114295 A1 | 5/2007 | Jenkins |
| 2007/0115902 A1 | 5/2007 | Shamoon et al. |
| 2007/0131787 A1 | 6/2007 | Rossi et al. |
| 2007/0173978 A1 | 7/2007 | Fein et al. |
| 2007/0228183 A1 | 10/2007 | Kennedy et al. |
| 2007/0266575 A1 | 11/2007 | Nash |
| 2008/0015740 A1 | 1/2008 | Osann |
| 2008/0048046 A1 | 2/2008 | Wagner et al. |
| 2008/0128523 A1 | 6/2008 | Hoglund et al. |
| 2008/0161977 A1 | 7/2008 | Takach et al. |
| 2008/0185450 A1 | 8/2008 | Kwon et al. |
| 2008/0215240 A1 | 9/2008 | Howard et al. |
| 2008/0221737 A1 | 9/2008 | Josephson et al. |
| 2009/0045263 A1 | 2/2009 | Mueller et al. |
| 2009/0057425 A1 | 3/2009 | Sullivan et al. |
| 2009/0140057 A1 | 6/2009 | Leen |
| 2009/0140060 A1 | 6/2009 | Stoner et al. |
| 2009/0140064 A1 | 6/2009 | Schultz et al. |
| 2009/0236433 A1 | 9/2009 | Mueller et al. |
| 2009/0243842 A1 | 10/2009 | Mitchell et al. |
| 2009/0261174 A1 | 10/2009 | Butler et al. |
| 2010/0000239 A1 | 1/2010 | Lifson et al. |
| 2010/0006660 A1 | 1/2010 | Leen et al. |
| 2010/0084482 A1 | 4/2010 | Kennedy et al. |
| 2010/0168924 A1 | 7/2010 | Tessier et al. |
| 2010/0250009 A1 | 9/2010 | Lifson et al. |
| 2010/0261465 A1 | 10/2010 | Rhoads et al. |
| 2010/0289643 A1 | 11/2010 | Trundle et al. |
| 2010/0305771 A1 | 12/2010 | Rodgers |
| 2011/0015797 A1 | 1/2011 | Gilstrap |
| 2011/0022242 A1 | 1/2011 | Bukhin et al. |
| 2011/0046805 A1 * | 2/2011 | Bedros et al. ................. 700/291 |
| 2011/0046806 A1 | 2/2011 | Nagel et al. |
| 2011/0054699 A1 | 3/2011 | Imes et al. |
| 2011/0054710 A1 | 3/2011 | Imes et al. |
| 2011/0253796 A1 | 10/2011 | Posa et al. |
| 2012/0005590 A1 | 1/2012 | Lombard et al. |
| 2012/0101637 A1 | 4/2012 | Imes et al. |
| 2012/0252430 A1 | 10/2012 | Imes et al. |
| 2013/0013120 A1 * | 1/2013 | Sabripour ..................... 700/291 |
| 2013/0184880 A1 * | 7/2013 | McMahon .................... 700/286 |
| 2013/0245837 A1 * | 9/2013 | Grohman ...................... 700/276 |

OTHER PUBLICATIONS

Ecobee Smart Thermostat User Manual, May 11, 2010, 20 pages.
Hunter Internet Thermostat Installation Guide, Hunter Fan Co., Aug. 14, 2012, 8 pages.
SYSTXCCUIZ01-V Infinity Control Installation Instructions, Carrier Corp, May 31, 2012, 20 pages.
Trane Communicating Thermostats for Fan Coil, Trane, May, 2011, 32 pages.
Trane Communicating Thermostats for Heat Pump Control, Trane, May 2011, 32 pages.
VisionPRO Wi-Fi Programmable Thermostat User Guide, Honeywell International, Inc., Aug. 2012, 48 pages.
Arens, E., et al., "Demand Response Enabling Technology Development," Phase I Report, University of California Berkeley, Apr. 4, 2006, 108 pages.
Arens, E., et al, "New Thermostat Demand Response Enabling Technology," University of California Berkeley, Jun. 2004, 1 page.

* cited by examiner

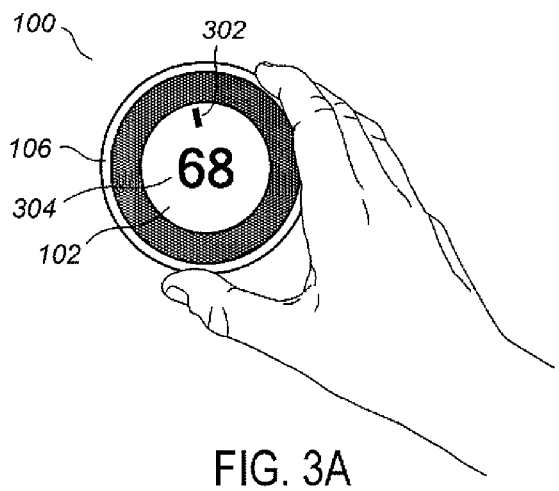
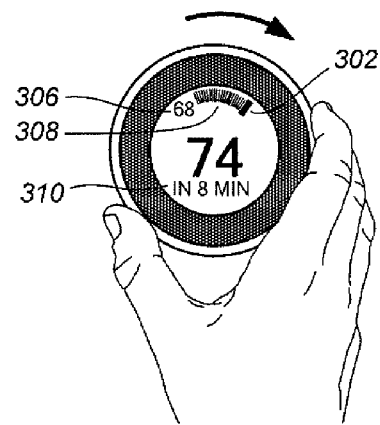
FIG. 3A  FIG. 3B
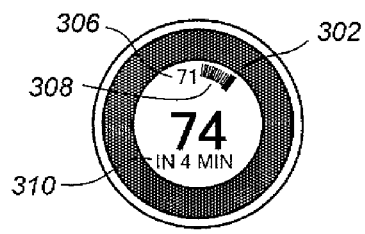 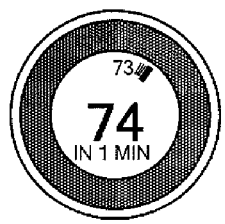 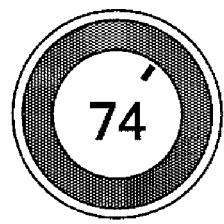
FIG. 3C  FIG. 3D  FIG. 3E
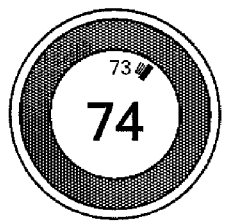  
FIG. 3F  FIG. 3G  FIG. 3H
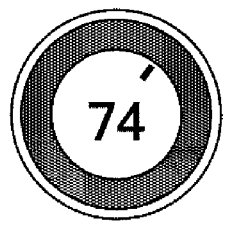 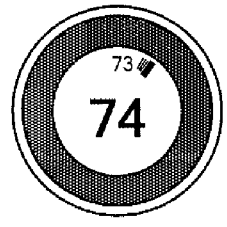 
FIG. 3I  FIG. 3J  FIG. 3K

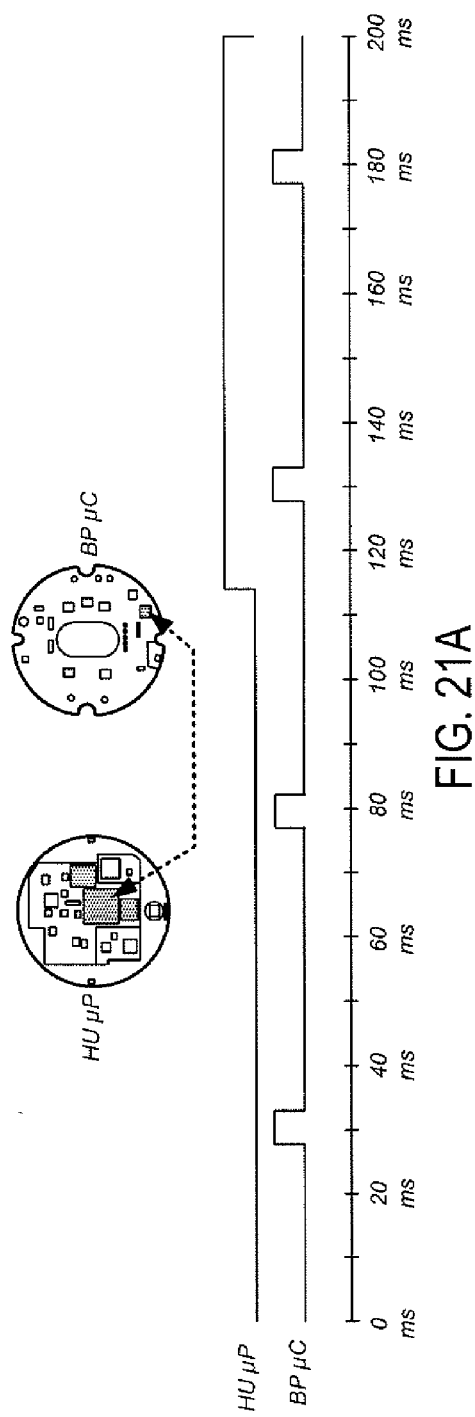
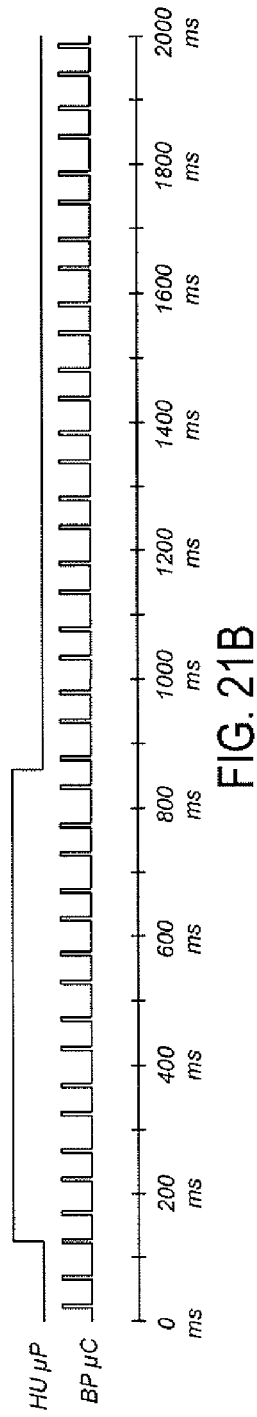
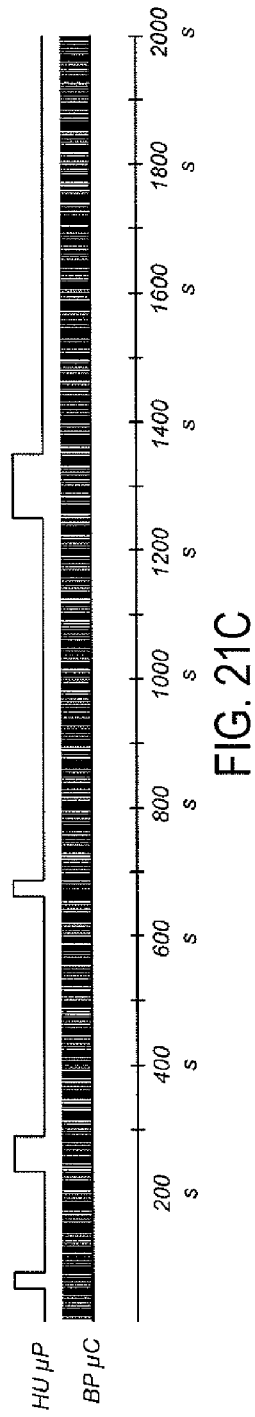
FIG. 21A
FIG. 21B
FIG. 21C

CONTINUOUS INTELLIGENT-CONTROL-SYSTEM UPDATE USING INFORMATION REQUESTS DIRECTED TO USER DEVICES

FIELD

The current patent relates to intelligent-thermostat-controlled HVAC systems and other intelligently controlled environment-conditioning systems and, in particular, to intelligently controlled environment-conditioning systems that continuously adapt to changing environments and refine computational models by acquiring information from users.

BACKGROUND

While substantial effort and attention continues toward the development of newer and more sustainable energy supplies, the conservation of energy by increased energy efficiency remains crucial to the world's energy future. Along with improvements in the physical plant associated with home heating and cooling, including improvements in insulation, higher efficiency furnaces, and in other such improvements, substantial increases in energy efficiency can be achieved by better control and regulation of home heating and cooling equipment. By efficiently controlling operation of heating, ventilation, and air conditioning (HVAC) equipment, substantial energy can be saved.

Many currently available HVAC thermostatic control systems can be characterized as belonging to one of two categories: (1) a first category that includes many simple, non-programmable home thermostats, each typically consisting of a single mechanical or electrical dial for setting a desired temperature and a single HEAT-FAN-OFF-AC switch; and (2) a second category that includes many programmable thermostats, which have become more prevalent in recent years and which feature many different HVAC-system settings that can be individually manipulated. While being easy to use for even the most unsophisticated occupant, thermostats of the first category are performed manually by the user. As a result, substantial energy-saving opportunities are often missed for all but the most vigilant users. Moreover, advanced energy-saving settings are not generally provided, including an ability to specify a custom temperature swing, the difference between the desired set temperature and actual current temperature that triggers activation of the heating/cooling unit. Users of thermostats of the second category are often intimidated by a large number of switches and controls, and therefore seldom adjust the manufacturer defaults to optimize their own energy usage despite the fact that these thermostats are capable of operating HVAC equipment with energy-saving profiles. Indeed, in an unfortunately large number of cases, a home user may permanently operate the unit in a "temporary" or "hold" mode, manually manipulating the displayed set temperature as if the unit were a thermostat of the first category.

SUMMARY

The current application discusses intelligent control systems that include a programmable device, generally an intelligent thermostat, for locally controlling an HVAC system. The intelligent thermostat includes high-power-consuming circuitry that performs, while in an active state, a number of high power activities, including operating wireless communications, driving display circuitry, displaying graphical information to a user, and performing calculations relating to learning. The high-power consuming circuitry uses substantially less power while in an INACTIVE, or SLEEP, state that when in the ACTIVE state. The intelligent thermostat also includes low-power-consuming circuitry to perform a number of low power activities, including: transitioning the high-power circuitry from the INACTIVE state to the ACTIVE state; polling sensors, including temperature and occupancy sensors; and switching HVAC functions between ON and OFF states. The intelligent thermostat also includes power-stealing circuitry that harvests power from an HVAC-triggering circuit and a power-storage medium, such as a rechargeable battery, that stores power harvested by the power-stealing circuitry for use by other intelligent-thermostat circuitry, including the above-mentioned high-power-consuming. In many implementations, the high-power consuming circuitry includes a microprocessor that is located on a head unit and the low-power consuming circuitry includes a microcontroller and is located on a backplate. The current application is directed to an intelligent control system that includes at least one intelligent thermostat and remote servers that continuously refine computational models of controlled environments digitally encoded and electronically stored within the intelligent control system and that adapt to changing environmental conditions by gathering information from users via non-obtrusive information queries constructed and transmitted according to user-specified and feedback-determined user preferences.

BRIEF DESCRIPTION OF THE DRAWINGS

FIGS. 3A-3K illustrate user temperature adjustment based on rotation of the outer ring along with an ensuing user interface display.

FIGS. 21A-21C illustrate the sleep-wake timing dynamic, at progressively larger time scales.

DETAILED DESCRIPTION

Figure 1A:
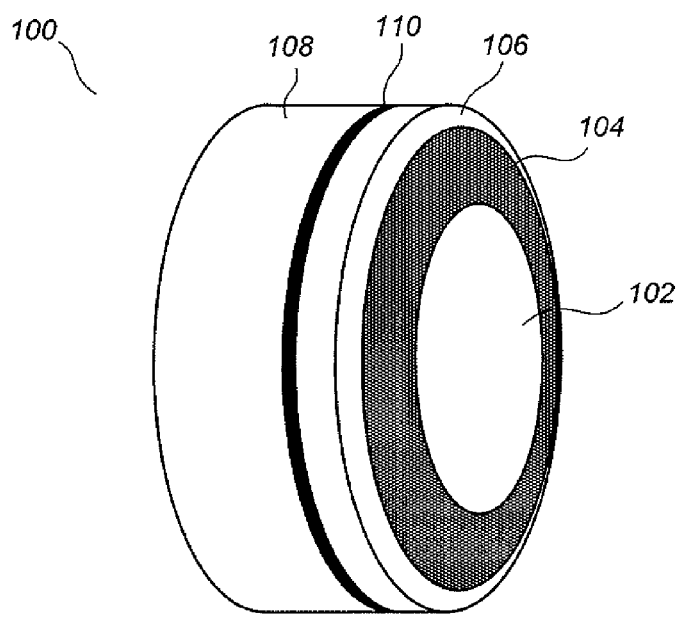
FIG. 1A illustrates a perspective view of a versatile sensing and control unit (VSCU unit).

The current application is directed to intelligent control systems that include one or more intelligent thermostats that each controls one or more HVAC systems, the intelligent thermostats alternatively referred to as "versatile sensing and control units" (VSCU units). Each VSCU unit provides energy-saving HVAC control functionality while, at the same time, is visually appealing and easy to use. Each VSCU unit includes selectively layered functionality, exposing unsophisticated users to a simple user interface but providing advanced users many different energy-saving and energy tracking functionalities. Even for the case of unsophisticated users, a VSCU unit provides advanced energy-saving functionality that runs in the background. In addition, a VSCU unit uses multi-sensor technology to learn about its heating and cooling environment and optimize control settings and parameters. A VSCU unit also learns about users via interactive information gathering methods, including a setup interview in which a user answers a few simple questions and, continuing over time, by using multi-sensor technology to detect user occupancy and control patterns, by tracking user control inputs, and by additional interactive information-gathering methods. On an ongoing basis, the VSCU unit processes the learned and sensed information and automatically adjusts its environmental control settings to optimize energy usage while, at the same time, maintaining the living space at optimal levels according to the learned occupancy patterns and comfort preferences of the user. The VSCU unit additionally promotes energy-saving behavior of users by displaying, at selected times, information that encourages reduced energy usage, including characterizations of historical energy cost performance, forecasted energy costs, and displayed congratulations and encouragement.

When the VSCU unit is connected to the internet via a home network, such as through IEEE 802.11 (Wi-Fi) connectivity, a VSCU may transmit real-time or aggregated home energy performance data to a utility company, a VSCU data-service provider, VSCU units in other locations, and/or other data recipients. The VSCU may; receive real-time or aggregated home energy performance data from a utility company, a VSCU data service provider, VSCU units in other locations, and/or other data sources. The VSCU may receive new energy-control executables and/or other types of control upgrades from one or more VSCU data service providers and/or other sources. The VSCU may receive current and forecasted weather information for inclusion in energy-saving control routines and user control commands from a user's computer, network-connected television, smart phone, and/or other stationary or portable data-communication appliance. The VSCU may provide an interactive user interface to the user through a user's data-communication appliance. The VSCU may receive control commands and information from an external energy-management advisor, such as a subscription-based service aimed at leveraging collected information from multiple sources to generate the best possible energy-saving control commands and/or profiles for subscribers and may receive control commands and information from an external energy management authority, such as a utility company to whom limited authority has been voluntarily given to control the VSCU in exchange for rebates or other cost incentives. The VSCU may additionally provide alarms, alerts, and other information to the user on a user's digital device and/or that of another person or organization designated for receiving the alarms and alerts by the user. The need for transmission of alarms and alerts may be determined by the VSCU by sensing various types of events within the environment of the VSCU, including both HVAC-related events and non-HVAC related events.

The environment controlled by an intelligent control system may include all or portions of a residential home, a duplex, townhome, multi-unit apartment building, hotel, retail store, office building, industrial building, and other living spaces and work spaces serviced by one or more HVAC systems. Users of intelligent control systems and VSCUs may include residents, building owners, landlords, and other individuals who direct control an environment serviced by an HVAC system through interfaces provided by VSCUs.

The phrases "set point" and "temperature set point" refer to a target temperature setting of a temperature control system, generally set by a user or automatically set according to a schedule. Many thermostatic functionalities described below apply in both heating and cooling contexts. To avoid unnecessary repetition, some examples may be presented in only one of these contexts, without mentioning the other. Therefore, where a particular example is set forth, below, in the context of home heating, the present teachings are likewise applicable to the counterpart context of home cooling, and vice versa, to the extent such counterpart application would be logically consistent.

FIG. 1A illustrates a perspective view of a versatile sensing and control ("VSCU") unit. The VSCU unit 100 preferably has a sleek, elegant appearance that does not detract from home decoration. The VSCU unit 100 comprises a main body 108 that is preferably circular with a diameter of about 8 cm and that has a visually pleasing outer finish, such as a satin nickel or chrome finish. A cap-like structure comprising a rotatable outer ring 106, a sensor ring 104, and a circular display monitor 102 is separated from the main body 108 by a small peripheral gap 110. The outer ring 106 has an outer finish similar to that of the main body 108, while the sensor ring 104 and circular display monitor 102 have a common circular glass or plastic outer covering that is gently arced in an outward direction. The sensor ring 104 contains any of a wide variety of sensors including infrared sensors, visible-light sensors, and acoustic sensors. The glass or plastic that covers the sensor ring 104 is generally smoked or mirrored so that the sensors themselves are not visible to the user. An air-venting functionality is provided to allow the ambient air to be sensed by the internal sensors.

Figures 1B, 1C:
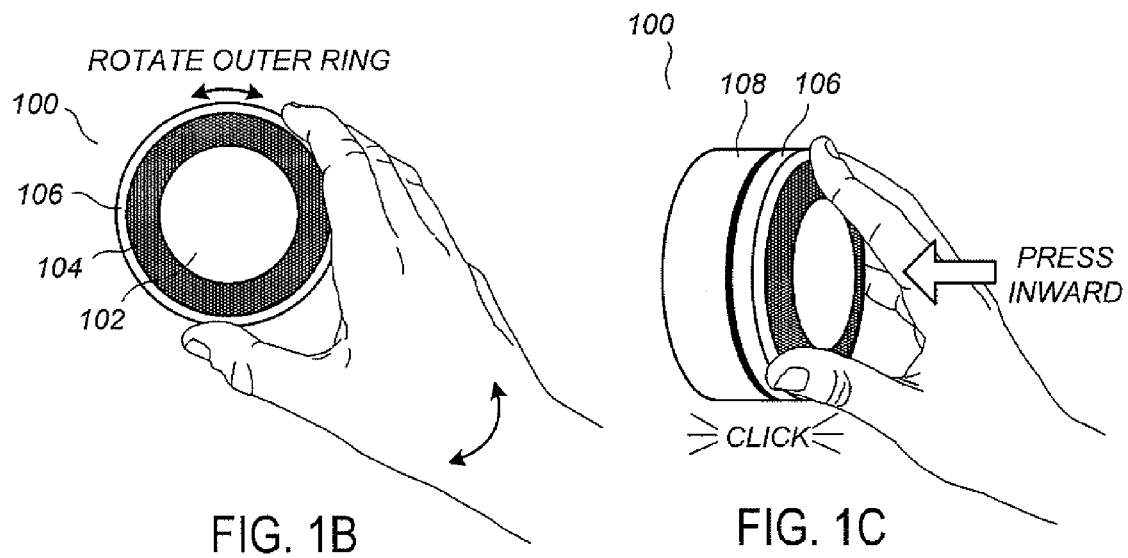
FIGS. 1B-1C illustrate the VSCU unit as it is being controlled by the hand of a user.

FIGS. 1B-1C illustrate the VSCU unit as it is being controlled by the hand of a user. In one example, the VSCU unit 100 is controlled by only two types of user input, the first being a rotation of the outer ring 106 (FIG. 1B), and the second being an inward push on the outer ring 106 (FIG. 1C) until an audible and/or tactile click occurs. For one example, the inward push of FIG. 1C only causes the outer ring 106 to move forward, while in another example the entire cap-like structure, including both the outer ring 106 and the glass covering of the sensor ring 104 and circular display monitor 102, move inwardly together when pushed. In one example, the sensor ring 104, the circular display monitor 102, and their common glass covering do not rotate with outer ring 106.

By user rotation of the outer ring 106 ("ring rotation") and inward pushing of the outer ring 106 ("inward click") responsive to intuitive and easy-to-read prompts on the circular display monitor 102, the VSCU unit 100 is capable of receiving information from the user for basic setup and operation. Generally, the outer ring 106 is mechanically mounted in a manner that provides a smooth yet viscous feel to the user, which promotes an overall feeling of elegance while also reducing spurious or unwanted rotational inputs. In one example, the VSCU unit 100 recognizes three different types of user inputs via ring rotation and inward click: (1) ring rotate left, (2) ring rotate right, and (3) inward click. In other examples, more complex fundamental user inputs can be recognized, including double-click or triple-click inward presses, speed-sensitive, and acceleration-sensitive rotational inputs.

A discrete mechanical HEAT-COOL toggle switch, HEAT-OFF-COOL selection switch, or HEAT-FAN-OFF-COOL switch is generally not included in the VSCU unit 100, contributing to the overall visual simplicity and elegance of the VSCU unit 100 and facilitating the provision of advanced control abilities. Generally, no electrical proxy for such a discrete mechanical switch is included. Instead, the switching between these settings is performed under computerized control of the VSCU unit 100 responsive to multi-sensor readings, programming, and/or the above-described ring-rotation and inward-click user inputs.

Figure 2A:
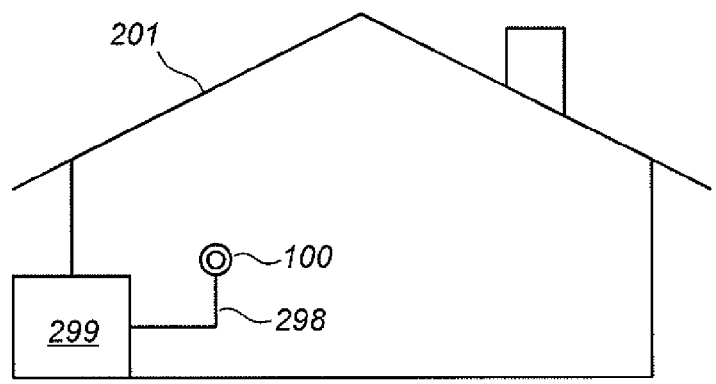
FIG. 2A illustrates the VSCU unit as installed in a house having an HVAC system and a set of control wires.

FIG. 2A illustrates the VSCU unit as installed in a house having an HVAC system and a set of control wires. The VSCU unit 100 is well suited for installation by contractors in new home construction and/or in the context of complete HVAC system replacement. However, the VSCU unit 100 may also serve as a replacement thermostat in an existing home. In either case, the VSCU unit 100 can facilitate inserting an entire energy-saving technology platform into the home. The phrase "VSCU Efficiency Platform" refers to products and services that are technologically compatible with the VSCU unit 100 and/or with devices and programs that support the operation of the VSCU unit 100.

Figure 2B:
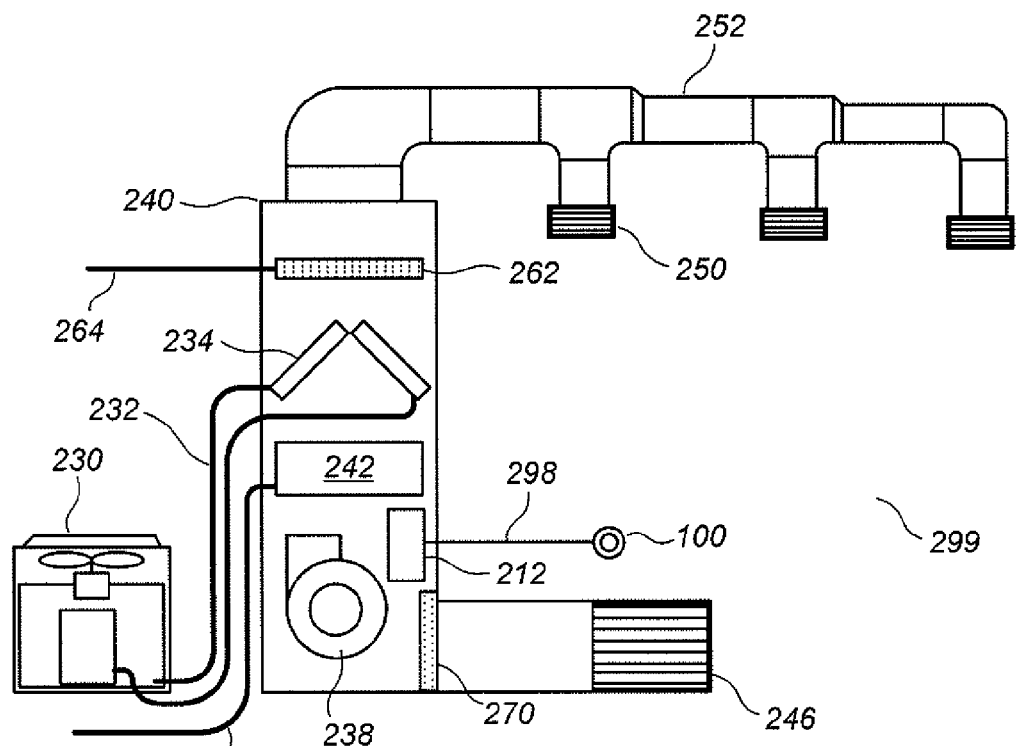
FIG. 2B illustrates an exemplary diagram of the HVAC system of FIG. 2A.

FIG. 2B illustrates an exemplary diagram of the HVAC system of FIG. 2A. HVAC system 299 provides heating, cooling, ventilation, and/or air handling for an enclosure, such as the single-family home 201 depicted in FIG. 2A. The HVAC system 299 depicts a forced-air type heating system, although according to other examples, other types of systems can be used. In heating, heating coils or elements 242 within air handler 240 provide a source of heat using electricity or gas via line 236. Cool air is drawn from the enclosure via return air duct 246 through filter 270 using fan 238 and is heated by the heating coils or elements 242. The heated air flows back into the enclosure at one or more locations through a supply air duct system 252 and supply air grills such as grill 250. In cooling, an outside compressor 230 passes a gas such as Freon through a set of heat exchanger coils to cool the gas. The gas then goes via line 232 to the cooling coils 234 in the air handlers 240 where it expands, cools and cools the air being circulated through the enclosure via fan 238. According to some examples a humidifier 262 is also provided to moisten the air using water provided by a water line 264. Although not shown in FIG. 2B, according to some examples the HVAC system for the enclosure has other known components such as dedicated outside vents to pass air to and from the outside, one or more dampers to control airflow within the duct systems, an emergency heating unit, and a dehumidifier. The HVAC system is selectively actuated via control electronics 212 that communicate with the VSCU 100 over control wires 298.

FIGS. 3A-3K illustrate user temperature adjustment based on rotation of the outer ring along with an ensuing user interface display. In one example, prior to the time depicted in FIG. 3A in which the user has approached the VSCU unit 100, the VSCU unit 100 has set the circular display monitor 102 to be entirely blank ("dark"), which corresponds to a state of inactivity. As the user walks up to the display, the user's presence is detected by one or more sensors in the VSCU unit 100, at which point the circular display monitor 102 is automatically turned on. When this happens, as illustrated in FIG. 3A, the circular display monitor 102 displays the current set point in a large font at a center readout 304. Also displayed is a set point icon 302 disposed along a periphery of the circular display monitor 102 at a location that is spatially representative of the current set point. Although it is electronic, the set point icon 302 is reminiscent of older mechanical thermostat dials.

The example of FIG. 3A assumes a scenario for which the actual current temperature of 68 is equal to the set point temperature of 68. For a case in which the user approaches the VSCU unit 100 when the actual current temperature is different than the set point temperature, the display would also include an actual temperature readout and a trailing icon, which are described further below in the context of FIGS. 3B-3K.

Referring now to FIG. 3B, as the user turns the outer ring 106 clockwise, the increasing value of the set point temperature is instantaneously provided at the center readout 304 and the set point icon 302 moves in a clockwise direction around the periphery of the circular display monitor 102 to a location representative of the increasing set point. Whenever the actual current temperature is different than the set point temperature, an actual temperature readout 306 is provided in relatively small digits along the periphery of the circular a location spatially representing the actual current temperature. Further provided is a trailing icon 308, also referred to as a "tail icon" or "difference-indicating icon," which extends between the location of the actual temperature readout 306 and the set point icon 302. Further provided is a time-to-temperature readout 310 that is indicative of a prediction, as computed by the VSCU unit 100, of the time interval required for the HVAC system to bring the temperature from the actual current temperature to the set point temperature.

FIGS. 3C-3K illustrate views of the circular display monitor 102 at exemplary instants in time after the user set point change that was completed in FIG. 3B (assuming that the circular display monitor 102 has remained active, such as during a preset post-activity time period, responsive to the continued proximity of the user, or responsive to the detected proximity of another occupant). Thus, at FIG. 3C, the current actual temperature is about halfway from the old set point to the new set point, and, in FIG. 3D, the current actual temperature is almost at the set point temperature. As illustrated in FIG. 3E, both the trailing icon 308 and the actual temperature readout 306 disappear when the current actual temperature reaches the set point temperature and the heating system is turned off. Then, as typically happens in home heating situations, the actual temperature begins to sag (FIG. 3F) until the permissible temperature swing is reached, at which point the heating system is again turned on and the temperature rises to the set point (FIGS. 3H-3I) and the heating system is turned off. In this example, the swing is set to two degrees. The current actual temperature then begins to sag again (FIGS. 3J-3K), and the cycle continues.

Figure 4:
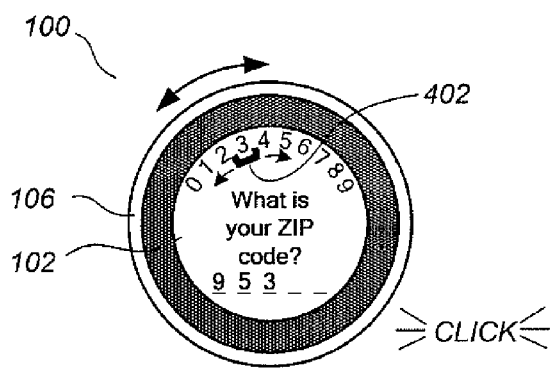
FIG. 4 illustrates a data input functionality provided by the user interface of the VSCU unit.

FIG. 4 illustrates a data input functionality provided by the user interface of the VSCU unit. The data-input functionality is provided for a particular example in which the user is asked, during a congenial setup interview, to enter the user's ZIP code. Responsive to a display of digits 0-9 distributed around a periphery of the circular display monitor 102 along with a selection icon 402, the user turns the outer ring 106 to move the selection icon 402 to the appropriate digit, and then provides an inward click command to enter that digit.

In one example, the VSCU unit 100 is programmed to provide a software-lockout functionality, requiring a person to enter a password or combination before the VSCU unit 100 will accept control inputs. The user interface for password request and entry can be similar to that shown in FIG. 4.

Figure 5A:
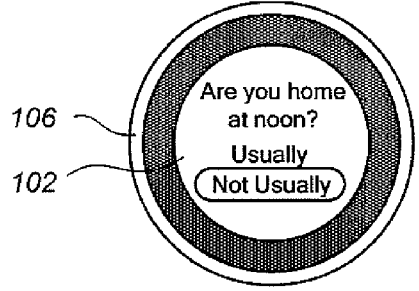
FIGS. 5A-5B illustrate a similar data input functionality provided by the user interface of the VSCU unit for answering various questions during the set up interview.
Figure 5B:
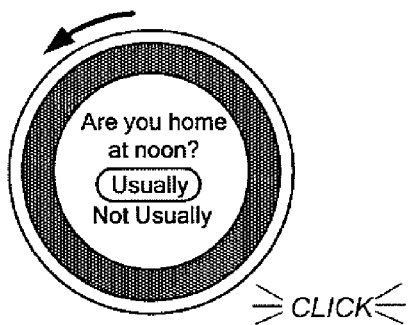

FIGS. 5A-5B illustrate a similar data input functionality provided by the user interface of the VSCU unit for answering various questions during the set up interview. The user rotates the outer ring 106 until the desired answer is highlighted, and then provides an inward click command to enter that answer.

Figure 6A:
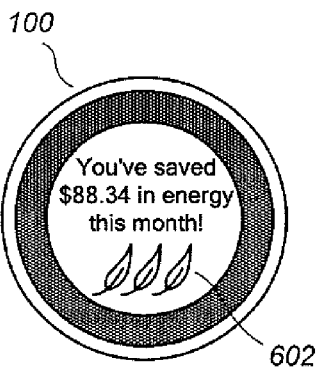
FIGS. 6A-6C illustrate some of the many examples of user interface displays provided by the VSCU unit.
Figure 6B:
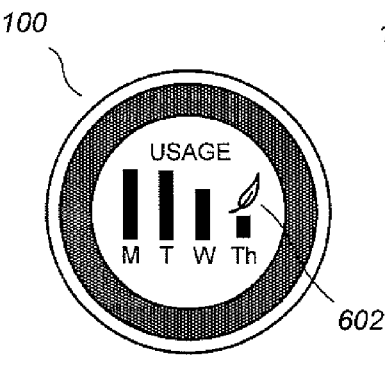
Figure 6C:
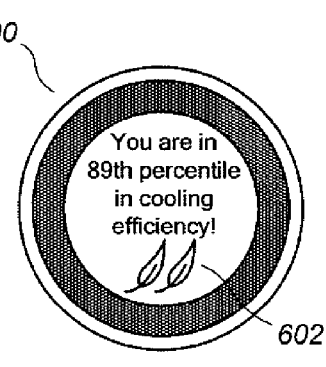

FIGS. 6A-6C illustrate some of the many examples of user interface displays provided by the VSCU unit. At selected times, upon user request, or at other times, including random points in time, the VSCU unit 100 displays information on its visually appealing user interface that encourages reduced energy usage. In one example shown in FIG. 6A, the user is shown a message of congratulations regarding a particular energy-saving accomplishment achieved by the user. It has been found particularly effective to include pictures or symbols, such as leaf icons 602, that evoke pleasant feelings or emotions in the user for providing positive reinforcement of energy-saving behavior.

FIG. 6B illustrates another example of an energy performance display that can influence user energy-saving behavior. The performance display comprises a display of the household's recent energy use on a daily basis and a positive-feedback leaf icon 602 for days of relatively low energy usage. Messages such as those of FIG. 6A can be displayed for customers who are not Wi-Fi enabled, based on the known cycle times and durations of the home HVAC equipment as tracked by the VSCU unit 100. Indeed, although a bit more involved, messages such as those of FIG. 6A can also be displayed for customers who are not Wi-Fi enabled, based on the known HVAC cycle times and durations combined with pre-programmed estimates of energy costs for their ZIP code and/or user-entered historical energy cost information from past utility bills.

For another example shown in FIG. 6C, the user is shown information about the user's energy performance status or progress relative to a population of other VSCU-equipped owners who are similarly situated from an energy usage perspective. For this type of display, and similar displays in which data from other homes and/or central databases is required, the VSCU unit 100 needs to be network-enabled. It has been found particularly effective to provide competitive or game-style information to the user as an additional means to influence energy-saving behavior. As illustrated in FIG. 6B, positive-feedback leaf icons 602 can be added to the display if the user's competitive results are positive. Optionally, the leaf icons 602 can be associated with a frequent flyer miles-type point-collection scheme or carbon credit-type business method, as administered, for example, by an external VSCU data service provider so that a tangible, fiscal reward is also associated with the emotional reward.

In some examples, the VSCU unit 100 is manufactured and sold as a single, monolithic structure containing electrical and mechanical connections on the back of the unit. In some examples, the VSCU 100 is manufactured and/or sold in different versions or packaging groups depending on the particular capabilities of the manufacturer(s) and the particular needs of the customer. For example, the VSCU unit 100 is provided, in some examples, as the principal component of a two-part combination consisting of the VSCU 100 and one of a variety of dedicated docking devices, as described further below.

Figure 7:
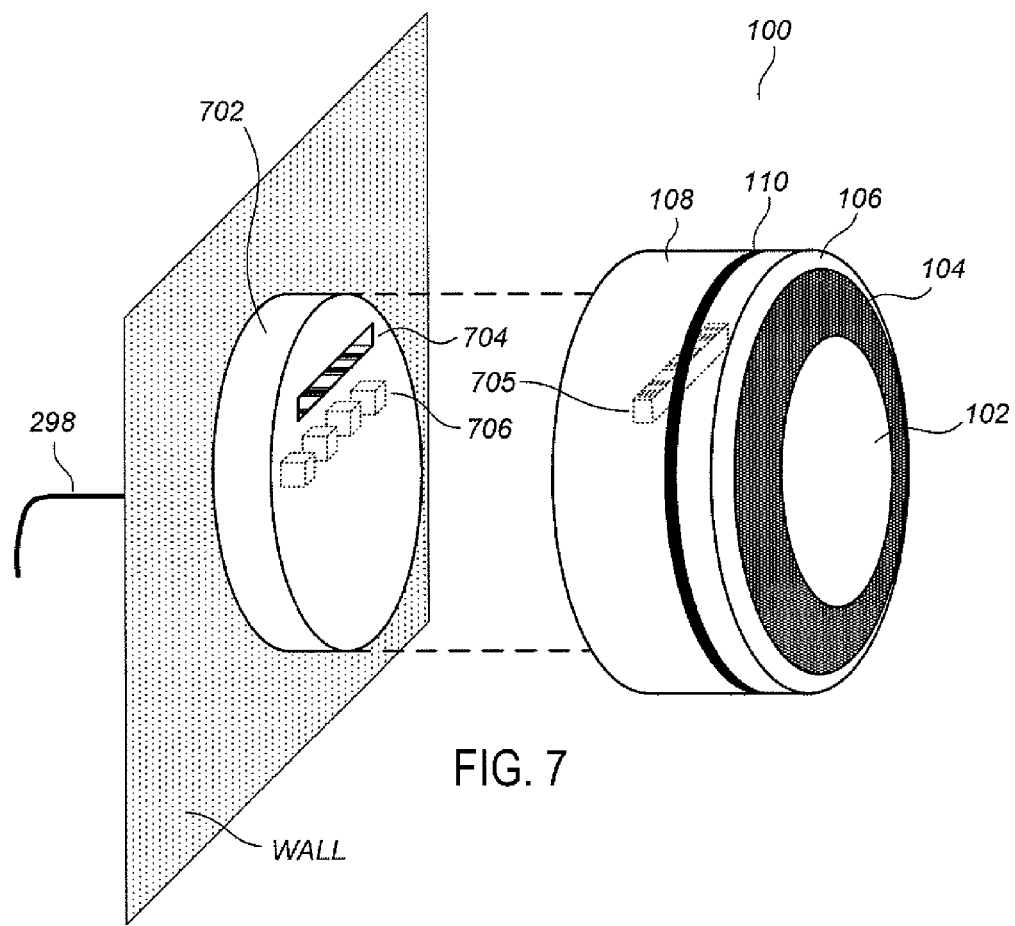
FIG. 7 illustrates an exploded perspective view of the VSCU unit and an HVAC-coupling wall dock.

FIG. 7 illustrates an exploded perspective view of the VSCU unit and an HVAC-coupling wall dock. For first-time customers who are going to be replacing an old thermostat, the VSCU unit 100 is provided in combination with HVAC-coupling wall dock 702. The HVAC-coupling wall dock 702 comprises mechanical hardware for attaching to the wall and electrical terminals for connecting to the HVAC wiring 298 that will be extending out of the wall in a disconnected state when the old thermostat is removed. The HVAC-coupling wall dock 702 is configured with an electrical connector 704 that mates to a counterpart electrical connector 705 in the VSCU 100.

For the initial installation process, the customer first installs the HVAC-coupling wall dock 702, including necessary mechanical connections, to the wall and HVAC wiring connections to the HVAC wiring 298. Once the HVAC-coupling wall dock 702 is installed, the next task is to slide the VSCU unit 100 over the wall dock to mate the electrical connectors 704/705. The components are generally configured so that the HVAC-connecting wall dock 702 is entirely hidden underneath and inside the VSCU unit 100.

In one example, the HVAC-connecting wall dock 702 is a relatively bare-bones device having the function of facilitating electrical connectivity between the HVAC wiring 298 and the VSCU unit 100. In another example, the HVAC-coupling wall dock 702 is equipped to perform and/or facilitate, in either a duplicative sense and/or a primary sense, one or more of the functionalities attributed to the VSCU unit 100 in the instant disclosure, using a set of electrical, mechanical, and/or electromechanical components 706. One particularly useful functionality is for the components 706 to include power-extraction circuitry for extracting usable power from the HVAC wiring 298, at least one wire of which carries a 24-volt AC signal in accordance with common HVAC wiring practice. The power-extraction circuitry converts the 24-volt AC signal into DC power that is usable by the processing circuitry and display components of the main unit 701.

The division and/or duplication of functionality between the VSCU unit 100 and the HVAC-coupling wall dock 702 can be provided in many different ways. In another example, the components 706 of the HVAC-coupling wall dock 702 can include one or more sensing devices, such as an acoustic sensor, for complementing the sensors provided on the sensor ring 104 of the VSCU unit 100.

In another example, the components 706 can include wireless communication circuitry compatible with one or more wireless communication protocols, such as the Wi-Fi and/or ZigBee protocols. In another example, the components 706 can include external AC or DC power connectors. In another example, the components 706 can include wired data communications jacks, such as an RJ45 Ethernet jack, an RJ11 telephone jack, or a USB connector.

Provided in accordance with one or more examples related to the docking capability shown in FIG. 7 are further devices and features that advantageously promote expandability of the number of sensing and control nodes that can be provided throughout the home. In one example, a tabletop docking station (not shown) is provided for docking of a second instance of the VSCU unit 100, which is referred to as an "auxiliary VSCU" unit (not shown). The tabletop docking station and the auxiliary VSCU unit can be separately purchased by the user, either at the same time of purchase of the original VSCU unit 100 or at a later time. The tabletop docking station is similar in functionality to the HVAC-coupling wall dock 702, except that it does not require connection to the HVAC wiring 298 and is conveniently powered by a standard wall outlet. In another example, instead of being identical to the original VSCU unit 100, the auxiliary VSCU unit can be a differently labeled version.

The phrase "primary VSCU unit" refers to one that is electrically connected to actuate an HVAC system in whole or in part, which would necessarily include the first VSCU unit purchased for any home, while the phrase "auxiliary VSCU unit" refers to one or more additional VSCU units not electrically connected to actuate an HVAC system in whole or in part. An auxiliary VSCU unit, when docked, will automatically detect the primary VSCU unit and will automatically be detected by the primary VSCU unit, such as by Wi-Fi or ZigBee wireless communication. Although the primary VSCU unit remains the sole provider of electrical actuation signals to the HVAC system, the two VSCU units will otherwise cooperate in unison for improved control heating and cooling control functionality, such improvement being enabled by added multi-sensing functionality provided by the auxiliary VSCU unit as well as by additional processing power provided to accommodate more powerful and precise control algorithms. Because the auxiliary VSCU unit can accept user control inputs just like the primary VSCU unit, user convenience is also enhanced. Thus, for example, where the tabletop docking station and the auxiliary VSCU unit are placed on a nightstand next to the user's bed, the user is not required to get up and walk to the location of the primary VSCU unit to manipulate the temperature set point, view energy usage, or otherwise interact with the system.

In one example, VSCU units sold by the manufacturer are identical in their core functionality, each being able to serve as either a primary VSCU unit or auxiliary VSCU unit as the case requires, although the different VSCU units may have different colors, ornamental designs, memory capacities, and so forth. For this example, the user is able to interchange the positions of VSCU units by simple removal of each one from its existing docking station and placement into a different docking station. There is an environmentally, technically, and commercially appealing ability for the customer to upgrade to the newest, latest VSCU designs and technologies without the need to throw away the existing VSCU unit.

In other examples, different VSCU units sold by a manufacturer can have different functionalities in terms of their abilities to serve as primary versus auxiliary VSCU units. The hardware cost of an auxiliary-only VSCU unit may be substantially less than that of a dual-capability primary/auxiliary VSCU unit. In other examples, primary VSCU units may use one kind of docking connection system and auxiliary VSCU units may use a different kind of docking connection system. In still other examples, primary VSCU units may feature the docking-station capability of FIG. 7, but auxiliary VSCU units, wherein auxiliary VSCU units may not.

Figure 8A:
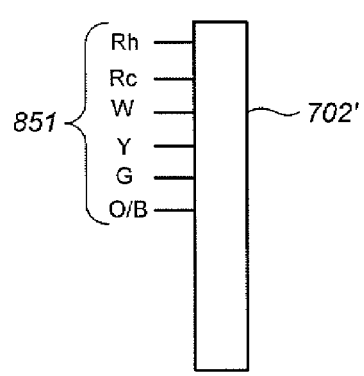
FIGS. 8A-B illustrates HVAC-coupling wall docks.

FIG. 8A illustrates an HVAC-coupling wall dock. The HVAC-coupling wall dock 702', which includes a set of input wiring ports 851, represents a first version of the HVAC-coupling wall dock 702 of FIG. 7 that is manufactured and sold in a simple or do-it-yourself ("DIY") product package in conjunction with the VSCU unit 100. The input wiring ports 851 of the HVAC-coupling wall dock 702' are limited in number and selection to represent a business and technical compromise between providing enough control signal inputs to meet the needs of a reasonably large number of HVAC systems in a reasonably large number of households, while, at the same time, not intimidating or overwhelming the do-it-yourself customer with an overly complex array of connection points. In one example, the input wiring ports 851 include: Rh (24 VAC heating call switch power); Rc (24VAC cooling call switch power); W (heating call); Y (cooling call); G (fan); and O/B (heat pump).

The HVAC-coupling wall dock 702' is configured and designed in conjunction with the VSCU unit 100, including both hardware aspects and programming aspects, to provide a simple DIY installation process that further provides an appreciable degree of foolproofing for protecting the HVAC system from damage and for ensuring that signals are directed to appropriate corresponding equipment. In one example, the HVAC-coupling wall dock 702' is equipped with a small mechanical detection switch (not shown) for each distinct input port, such that insertion of a wire and non-insertion of a wire is automatically detected and a corresponding indication signal is provided to the VSCU 100 upon initial docking. In this way, the VSCU 100 has knowledge for each individual input port whether a wire has, or has not been, inserted into that port. Preferably, the VSCU unit 100 is also provided with electrical sensors (e.g., voltmeter, ammeter, and ohmmeter) corresponding to each of the input wiring ports 851. The VSCU 100 is therefore enabled, by suitable programming, to perform sanity checks at initial installation. By way of example, if there is no input wire at either the Rc or Rh terminal, or if there is no AC voltage sensed at either of these terminals, further initialization activity can be immediately halted, and the user notified on the circular display monitor 102, because there is either no power at all or the user has inserted the Rc and/or Rh wires into the wrong terminal. By way of further example, if there is a live voltage on the order of 24 VAC detected at any of the W, Y, and G terminals, then it can be concluded that the user has placed the Rc and/or Rh wire in the wrong place, and appropriate installation halting and user notification can be made.

One feature provided according to one example relates to automated opening versus automated shunting of the Rc and Rh terminals by the VSCU unit 100. In many common home installations, instead of there being separate wires provided for Rc (24 VAC heating call switch power) and Rh (24 VAC cooling call switch power), there is only a single 24VAC call switch power lead provided. This single 24VAC lead, which might be labeled R, V, Rh, or Rc, depending on the unique history and geographical location of the home, provides the call switch power for both heating and cooling. For such cases, a thermostat has the Rc and Rh input ports shunted together so that the power from a single lead can be respectively accessed by the heating and cooling call switches. However, in many other common home installations, there are separate 24 VAC wires provided for Rc and Rh running from separate transformers and, when so provided, it is important not to shunt them together to avoid equipment damage. These situations are resolved historically by a professional installer examining the HVAC system and ensuring that a shunting lead (or equivalent DIP switch setting) is properly installed or not installed as appropriate and/or the presence on most thermostats of a discrete user-toggled mechanical or electromechanical switch to ensure that heating and cooling are not simultaneously activated. The VSCU 100 is equipped and programmed to automatically test the inserted wiring to classify the user's HVAC system into one of the above two types (i.e., single call power lead versus dual call power leads), to automatically ensure that the Rc and Rh input ports remain electrically segregated when the user's HVAC system is determined to be of the dual call power lead type, and to automatically shunt the Rc and Rh input ports together when the user's HVAC system is determined to be of the single call power lead type. The automatic testing can comprise, without limitation, electrical sensing such as that provided by voltmeter, ammeters, ohmmeters, and reactance-sensing circuitry, as well as functional detection as described further below.

The VSCU may conduct automated functional testing of the HVAC system by the VSCU unit 100 based on the wiring insertions made by the installer as detected by the small mechanical detection switches at each distinct input port. Thus, for example, where an insertion into the W (heating call) input port is mechanically sensed at initial startup, the VSCU unit 100 actuates the furnace (by coupling W to Rh) and then automatically monitors the temperature over a predetermined period, such as ten minutes. When the temperature is found to be rising over that predetermined period, then the VSCU determines that the W (heating call) lead has been properly connected to the W (heating call) input port. However, when the temperature is found to be falling over that predetermined period, then it is determined that Y (cooling call) lead has likely been erroneously connected to the W (heating call) input port. In one example, when such error is detected, the system is shut down and the user is notified and advised of the error on the circular display monitor 102. In another example, when such error is detected, the VSCU unit 100 automatically reassigns the W (heating call) input port as a Y (cooling call) input port to automatically correct the error. Similarly, according to an example, where the Y (cooling call) lead is mechanically sensed at initial startup, the VSCU unit 100 actuates the air conditioner (by coupling Y to Rc) and then automatically monitors the temperature, validating the Y connection when the temperature is sensed to be falling and invalidating the Y connection (and, optionally, automatically correcting the error by reassigning the Y input port as a W input port) when the temperature is sensed to be rising.

The VSCU may additionally determine a homeowner's pre-existing heat pump wiring convention when an insertion onto the O/B (heat pump) input port is mechanically sensed at initial startup. Depending on a combination of several factors, such as the history of the home, the geographical region of the home, and the particular manufacturer and installation year of the home's heat pump, there may be a different heat pump signal convention used with respect to the direction of operation (heating or cooling) of the heat pump. According to an example, the VSCU unit 100 automatically and systematically applies, for each of a number of preselected candidate heat pump actuation signal conventions, a cooling actuation command and a heating actuation command, each actuation command being followed by a predetermined time period over which the temperature change is sensed. If the cooling command according to the presently selected candidate convention is followed by a sensed period of falling temperature, and the heating command according to the presently selected candidate convention is followed by a sensed period of rising temperature, then the presently selected candidate convention is determined to be the actual heat pump signal convention for that home. If, on the other hand, the cooling command was not followed by a sensed period of cooling and/or the heating command was not followed by a sensed period of heating, then the presently selected candidate convention is discarded and the VSCU unit 100 repeats the process for the next candidate heat pump actuation signal convention.

Figure 8B:
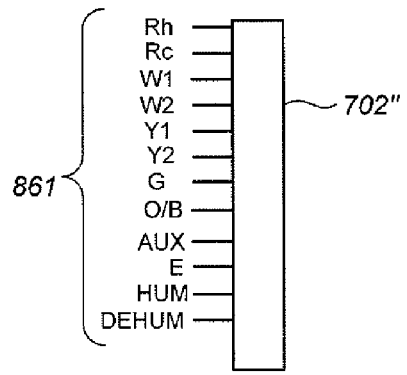

FIG. 8B illustrates a diagram of an HVAC-coupling wall dock 702", with particular reference to a set of input wiring ports 861, which represents a second version of the HVAC-coupling wall dock 702 of FIG. 7 that is manufactured and sold in a professional product package in conjunction with the VSCU unit 100. The professional product package is generally manufactured and marketed with professional installation in mind, such as by direct marketing to HVAC service companies, general contractors involved in the construction of new homes, or to homeowners having more complex HVAC systems with a recommendation for professional installation. The input wiring ports 861 of the HVAC-coupling wall dock 702" are selected to be sufficient to accommodate both simple and complex HVAC systems. In one example, the input wiring ports 861 include the following set: Rh (24 VAC heating call switch power); Rc (24VAC cooling call switch power); W1 (first stage heating call); W2 (second stage heating call); Y1 (first stage cooling call); Y2 (second stage cooling call); G (fan); O/B (heat pump); AUX (auxiliary device call); E (emergency heating call); HUM (humidifier call); and DEHUM (dehumidifier call). In one example, even though professional installation is contemplated, the HVAC-coupling wall dock 702" is nevertheless provided with small mechanical detection switches (not shown) at the respective input wiring ports for wire insertion sensing, and the VSCU unit 100 is provided with one or more of the various automated testing and automated configuration capabilities associated with the DIY package described above, which may be useful for some professional installers and/or more technically savvy do-it-yourselfers confident enough to perform the professional-model installation for their more advanced HVAC systems.

Figure 9:
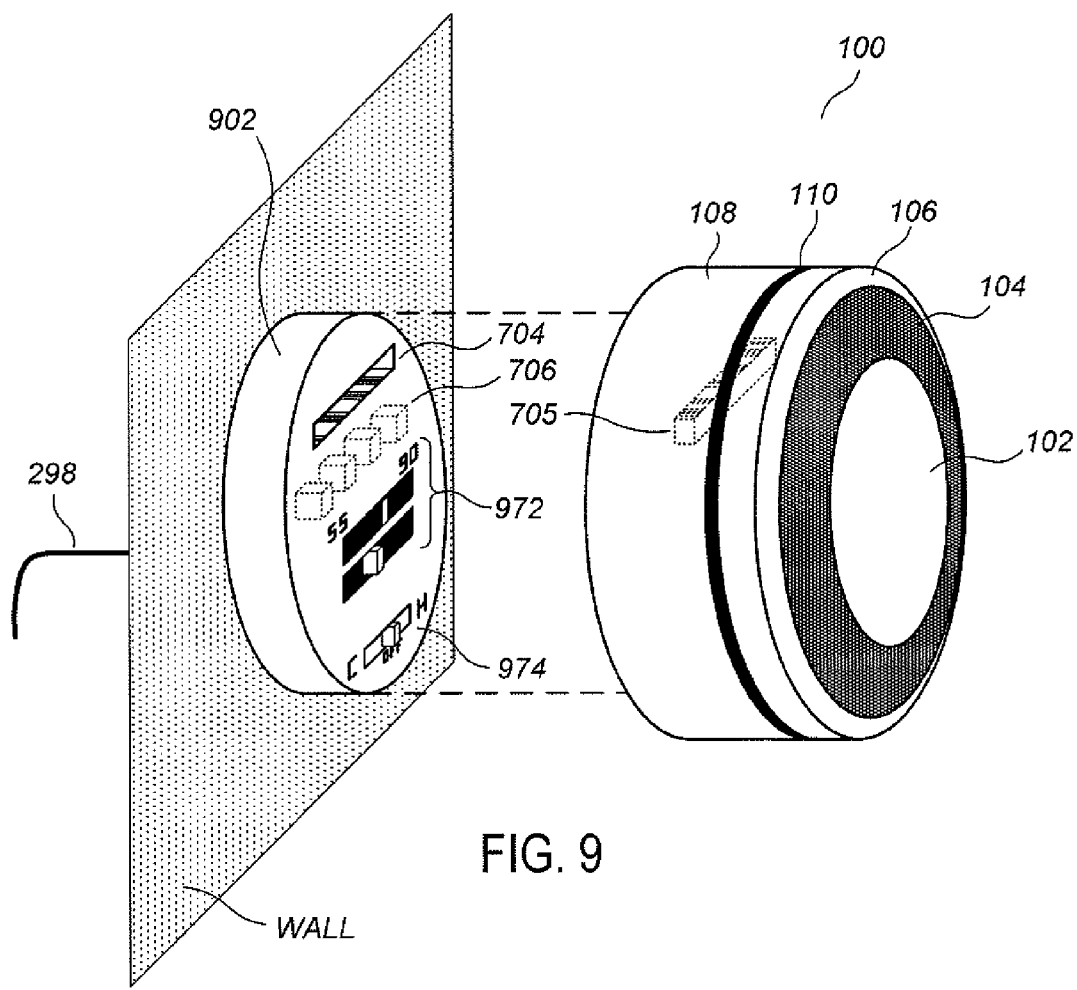
FIG. 9 illustrates an exploded perspective view of the VSCU unit and an HVAC-coupling wall dock.

FIG. 9 illustrates the VSCU unit and an HVAC-coupling wall dock. The HVAC-coupling wall dock 902 is similar to the HVAC-coupling wall dock 702 of FIG. 7, except that it has an additional functionality as a very simple, elemental, standalone thermostat when the VSCU unit 100 is removed, the elemental thermostat including a standard temperature readout/setting dial 972 and a simple COOL-OFF-HEAT switch 974. This can prove useful for a variety of situations, such as when the VSCU 100 needs to be removed for service or repair for an extended period of time over which the occupants would still like to remain reasonably comfortable. In one example, the elemental thermostat components 972 and 974 are entirely mechanical in nature, with no electrical power needed to trip the control relays. In other examples, simple electronic controls, such as electrical up/down buttons and/or an LCD readout, are provided. In other examples, some subset of the advanced functionalities of the VSCU unit 100 can be provided, such as elemental network access to allow remote control, to provide a sort of brain stem functionality while the brain (the VSCU unit 100) is temporarily away.

Figure 10A:
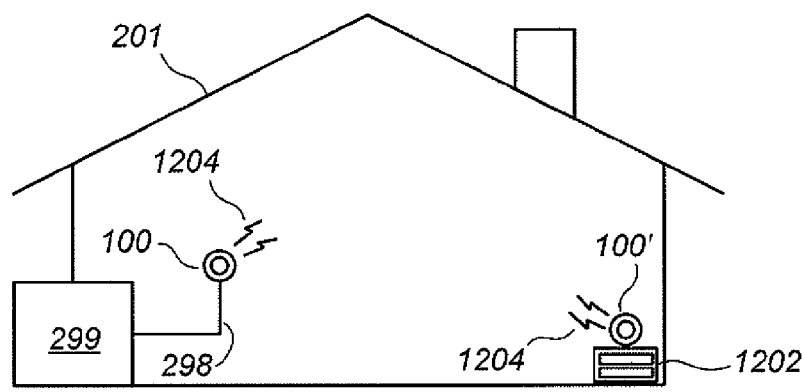
FIGS. 10A-10C illustrate conceptual diagrams representative of advantageous scenarios in which multiple VSCU units are installed in a home or other space that does not have a wireless data network.
Figure 10B:
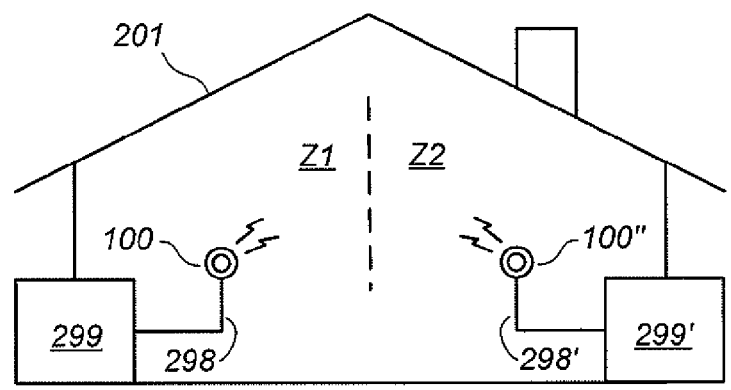
Figure 10C:
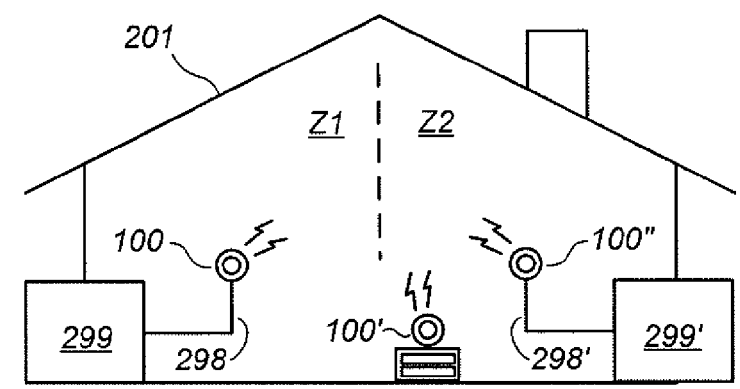

FIGS. 10A-10C illustrate conceptual diagrams representative of scenarios in which multiple VSCU units are installed in a home or other space that does not have a wireless data network. For the example of FIG. 10A in which the home 201 has a single HVAC system 298, a primary VSCU unit 100 is installed and connected to the HVAC system via the control wires 298 and an auxiliary VSCU unit 100' is placed, by way of example, on a nightstand 1202. The primary VSCU unit 100 and auxiliary VSCU unit 100' are each configured to automatically recognize the presence of the other and to communicate with each other using a wireless communication protocol such as Wi-Fi or ZigBee running in an ad hoc mode.

Many advantageous capabilities are programmed into the VSCU units 100 and 100' to leverage their communication and multi-sensing capabilities that allow them, in a cooperative manner, to perform many VSCU unit functionalities, including learning about the home HVAC environment, performing occupancy sensing and prediction, learning user comfort preferences, etc., that do not require Internet access. In one example, the primary VSCU unit 100 receives temperature data from the auxiliary VSCU unit 100' and computes an average of the two temperatures, controlling the HVAC system 299 so that the average temperature of the home 201 is maintained at the current temperature set point level. One or more additional auxiliary VSCU units (not shown) may also be positioned at one or more additional locations throughout the home and can become part the ad hoc home VSCU network. Among other advantages, adding more auxiliary VSCU units promotes more accurate occupancy detection, facilitates better determination of spatial temperature gradients and thermal characteristics, and provides additional data processing power.

The primary/auxiliary VSCU units 100/100' may be programmed to establish a master/slave relationship, in which any conflicts in their automated control determinations are resolved in favor of the master VSCU unit, and/or such that any user inputs at the master unit take precedence over any conflicting user inputs made at the slave VSCU unit. Although the primary VSCU unit 100 is likely the "master" VSCU unit in a beginning or default scenario, the status of any particular VSCU unit as a "master" or "slave" is not dictated solely by its status as a primary or auxiliary VSCU unit. Moreover, the status of any particular VSCU unit as "master" or "slave" is not permanent, but rather is dynamically established to best meet current HVAC control needs as can be best sensed and/or predicted by the VSCU units. In one example, the establishment of master versus slave status is optimized to best meet the comfort desires of users as can be best sensed and/or predicted by the VSCU units. By way of example, when each VSCU unit is sensing the presence of multiple occupants, then the primary VSCU unit is established as the master unit and controls the HVAC system 299 such that the average temperature reading of the two VSCU units is maintained at the current set point temperature according to a currently active template schedule (La, a schedule of time intervals and set point temperatures for each time interval). However, when no occupants in the home are sensed except for a person in the bedroom, as sensed by the auxiliary VSCU unit 100' which is positioned on a nightstand in this example, then the auxiliary VSCU unit 100' becomes the "master" VSCU unit, which commands the "slave" VSCU unit 100 to control the HVAC system 299 so that the temperature in the bedroom, as sensed by the master unit, stays at a current set point temperature.

Many other automated master/slave establishment scenarios and control determinations may be implemented. In one example, the master-slave determination can be made, influenced, and/or supported based on an automated determination of which thermostat is in the best location to reliably govern the temperature, based on historical and/or testing-observed cycling behavior or other criteria.

The establishment of master-slave status for the primary/auxiliary VSCU units 100/100' can also be based upon human control inputs. By way of example, when each VSCU unit is sensing the presence of multiple occupants, and a user manually changes the current set point temperature on one of the two units, the VSCU unit can output the question "Master Override?" on its circular display monitor 102 along with two answer options "Yes" and "Let VSCU Decide," with the latter being circled as the default response. On the other hand, when the two VSCUs collectively sense only the presence of one user in the home, then whichever unit is controlled by the user can be established as the master unit, without the need for asking the user for a resolution. The VSCU units 100/100' can be programmed so that the establishment of master/slave status can be explicitly dictated by a user at system setup time, such as during a setup interview, or at a subsequent configuration time using the menu-driven user interface of one of the two VSCU units.

Multiple VSCU units may share computing tasks among themselves in an optimal manner based on power availability and/or circuitry heating criteria. Many of the advanced sensing, prediction, and control algorithms provided with the VSCU unit are relatively complex and computationally intensive, and can result in high power usage and/or device heating when carried out unthrottled. In one example, the intensive computations are automatically distributed so that most are carried out on a subset of the VSCU units known to have the best power source(s) available at that time and/or known to have the highest amount of stored battery power available. Thus, for example, because it is generally preferable for each primary VSCU unit not to require household AC power for simplicity of installation as well as for equipment-safety concerns, the primary VSCU unit 100 of FIG. 10A is often powered by energy harvested from one or more of the 24 VAC call relay power signals, and therefore may only have a limited amount of extra power available for carrying out intensive computations. In contrast, a typical auxiliary VSCU unit may be a nightstand unit that can be plugged in as easily as a clock radio. In such cases, much of the computational load can be assigned to the auxiliary VSCU unit so that power is preserved in the primary VSCU unit. In another example, the speed of the intensive data computations carried out by the auxiliary VSCU unit (or, more generally, any VSCU unit to which the heavier computing load is assigned) can be automatically throttled using known techniques to avoid excessive device heating, so that temperature sensing errors in that unit are avoided. In yet another example, the temperature sensing functionality of the VSCU unit(s) to which the heavier computing load is assigned can be temporarily suspended for an interval that includes the duration of the computing time, so that no erroneous control decisions are made when substantial circuitry heating does Occur.

Referring now to FIG. 10B, it is often the case that a home or business will have two or more HVAC systems, each of them being responsible for a different zone in the house and being controlled by its own thermostat. Thus, shown in FIG. 10B is a first HVAC system 299 associated with a first zone Z1 and a second HVAC system 299' associated with a second zone Z2. According to an example, first and second primary VSCU units 100 and 100" are provided for controlling the respective HVAC units 299 and 299'. The first and second primary VSCU units 100 and 100" are configured to leverage their communication and multi-sensing capabilities such that they jointly, in a cooperative manner, perform many cooperative communication-based VSCU unit functionalities similar or analogous to those described above with respect to FIG. 10A, and still further cooperative VSCU unit functionalities for multi-zone control. As illustrated in FIG. 10C, the cooperative functionality of the first and second primary VSCU units 100 and 100" can be further enhanced by the addition of one or more auxiliary VSCU units 100' according to further examples.

It is to be appreciated that there are other multiple-thermostat scenarios that exist in some homes other than ones for which each thermostat controls a distinct HVAC system, and that multiple VSCU unit installations can be configured to control such systems. In some existing home installations there may only be a single furnace or a single air conditioning unit, but the home may still be separated into multiple zones by actuated flaps in the ductwork, each zone controlled by its own thermostat. In such settings, two primary VSCU units can be installed and configured to cooperate, optionally in conjunction with one or more auxiliary VSCU units, to provide optimal HVAC system control according to the described examples.

In one example in the context of non-network-connected VSCU units, the VSCU unit is configured and programmed to use optically sensed information to determine an approximate time of day. For a large majority of installations, regardless of the particular location of installation in the home, there is generally a cyclical 24-hour pattern related to the intensity of ambient light detected by a VSCU unit. This cyclical 24-hour pattern is automatically sensed, with spurious optical activity such as light fixture actuations being filtered out over many days or weeks when necessary, and optionally using ZIP code information, to establish a rough estimate of the actual time of day. This rough internal clock can be used for non-network-connected installations to verify and correct a gross clock setting error by the user or to establish a time-of-day clock when the user does not enter a time during configuration.

Figure 11:
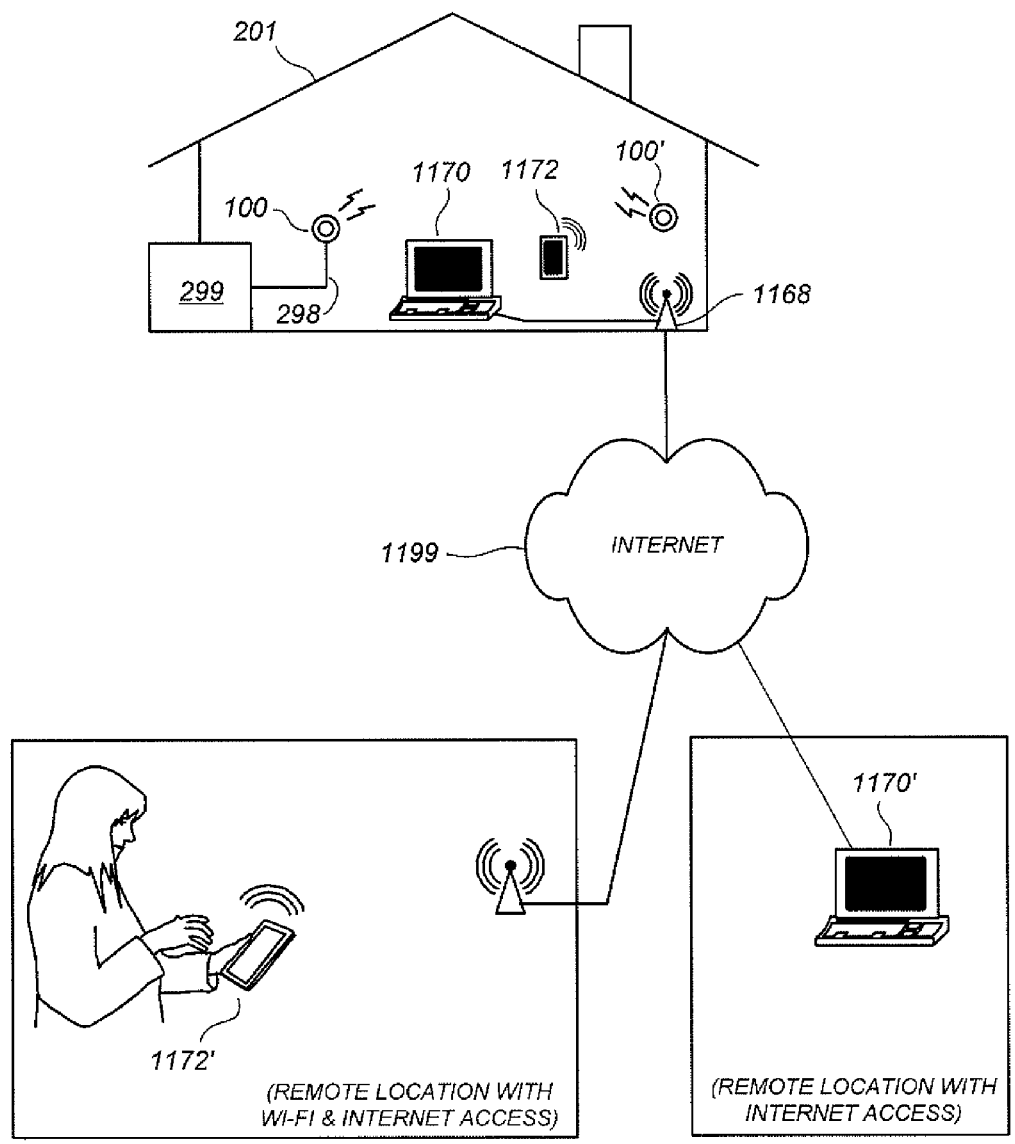
FIG. 11 illustrates an advantageous scenario in which one or more VSCU units are installed in a home that is equipped with WiFi wireless connectivity and access to the Internet.

FIG. 11 illustrates a scenario in which one or more VSCU units are installed in a home that is equipped with WiFi wireless connectivity and access to the Internet. In addition to providing the standalone, non-Internet connected functionalities described for FIGS. 10A-10C, the connection of one or more VSCU units to the Internet allows the VSCUs to provide a rich variety of additional capabilities. Shown in FIG. 11 is a primary VSCU unit 100 and auxiliary VSCU unit 100' having WiFi access to the Internet 1199 via a wireless router/Internet gateway 1168. A user may communicate with the VSCU units 100 and/or 100' via a home computer 1170, a smart phone 1172 or other portable data communication appliance 1172', or any other Internet-connected computer 1170'.

Figure 12:
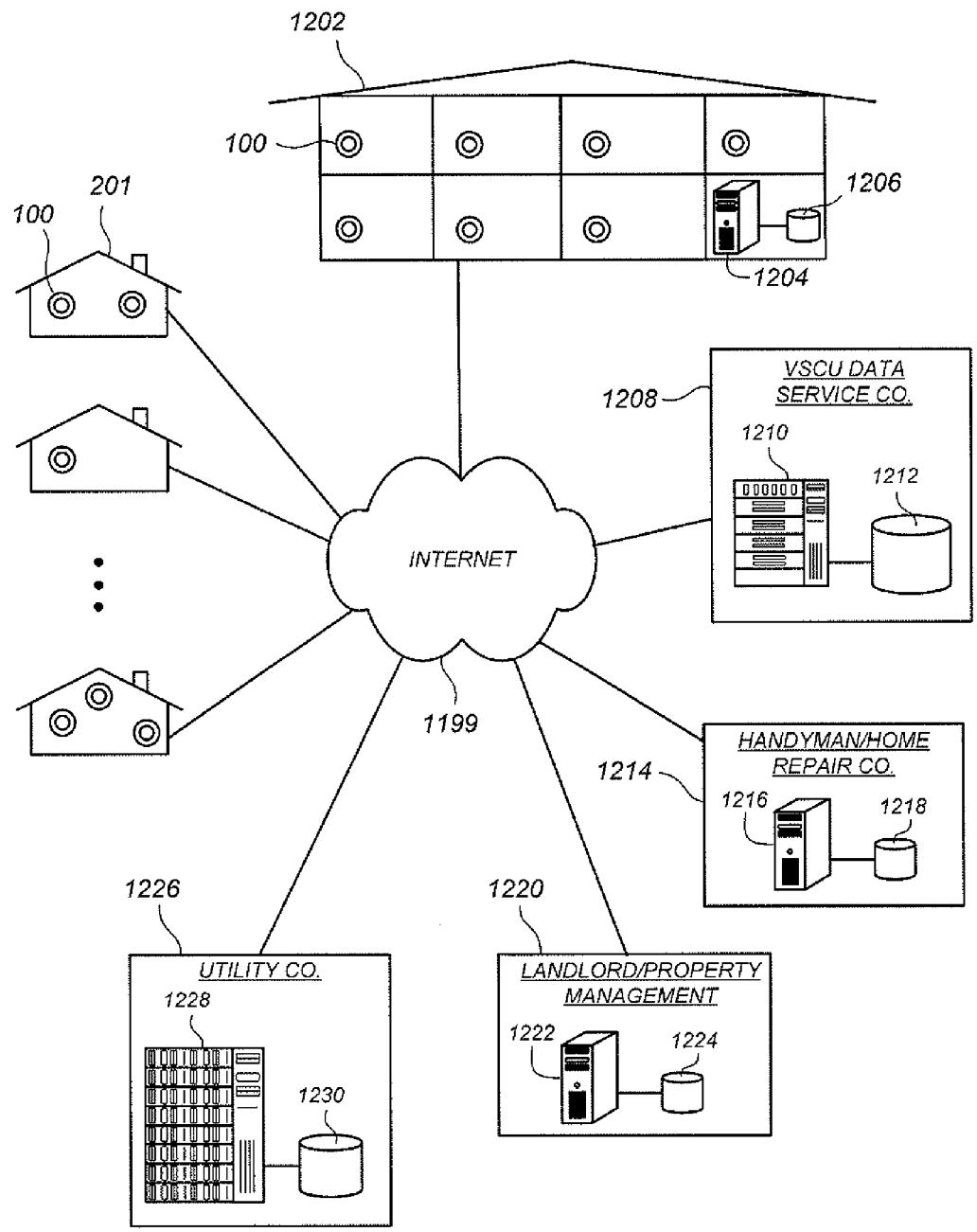
FIG. 12 illustrates an energy management network as enabled by the VSCU units and VSCU Efficiency Platform.

FIG. 12 illustrates an energy management network as enabled by the VSCU units and VSCU Efficiency Platform. The environment of FIG. 12, which is applicable on any scale (neighborhood, regional, state-wide, country-wide, and even world-wide), includes: a number of homes 201 each having one or more network-enabled VSCU units 100; an exemplary hotel 1202 (or multi-unit apartment building, etc.) in which each room or unit has a VSCU unit 100, the hotel 1202 further having a computer system 1204 and database 1206 configured for managing the multiple VSCU units and running software programs, or accessing cloud-based services, provisioned and/or supported by the VSCU data service company 1208; a VSCU data service company 1208 having computing equipment 1210 and database equipment 1212 configured for facilitating provisioning and management of VSCU units, VSCU support equipment, and VSCU-related software and subscription services; a handyman or home repair company 1214 having a computer 1216 and database 1218 configured, for example, to remotely monitor and test VSCU operation and automatically trigger dispatch tickets for detected problems, the computer 1216 and database 1218 running software programs or accessing cloud-based services provisioned and/or supported by the VSCU data service company 1208; a landlord or property management company 1220 having a computer 1222 and database 1224 configured, for example, to remotely monitor and/or manage the VSCU operation of their tenants and/or clients, the computer 1222 and database 1224 running software programs, or accessing cloud-based services, provisioned and/or supported by the VSCU data service company 1208; and a utility company 1226 providing HVAC energy to utility customers and having computing equipment 1228 and database equipment 1230 for monitoring VSCU unit operation, providing VSCU-usable energy usage data and statistics, and managing and/or controlling VSCU unit set points at peak load times or other times, the computing equipment 1228 and database equipment 1230 running software programs or accessing cloud-based services provisioned and/or supported by the VSCU data service company 1208.

According to one example, each VSCU unit provides external data access at two different functionality levels, one for user-level access with energy and home-management functionality, and another for an installer/vendor ("professional") that lets the professional monitor a user's system, look at all the different remote sensing gauges, and offer to provide and/or automatically provide a user with a service visit.

Figures 13A, 13B, 13C:
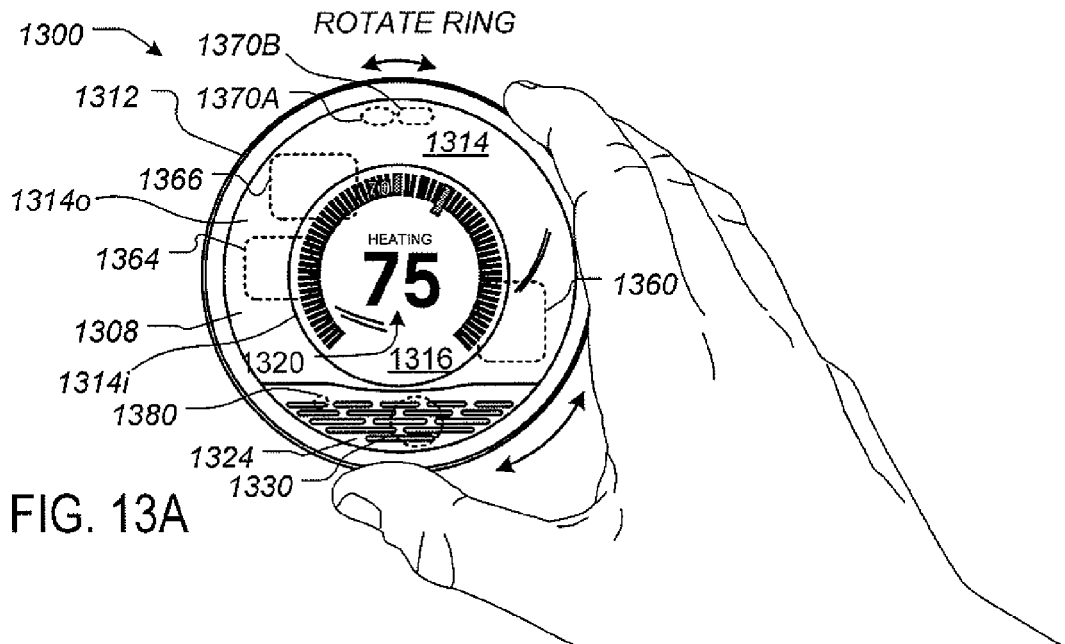
FIGS. 13A-B illustrate a thermostat having a user-friendly interface.
FIG. 13C illustrates a shell portion of a frame of the thermostat of FIGS. 13A-B.

FIGS. 13A-B illustrate a thermostat having a user-friendly interface. The term "thermostat" is used below to refer to a VSCU unit (Versatile Sensing and Control) that is particularly applicable for HVAC control in an enclosure. Unlike many prior art thermostats, thermostat 1300 has a sleek, simple, uncluttered and elegant design. Moreover, user interaction with thermostat 1300 is facilitated and greatly enhanced over known conventional thermostats by the design of thermostat 1300. The thermostat 1300 includes control circuitry and is electrically connected to an HVAC system, such as is shown with thermostat 110 in FIGS. 1 and 2. Thermostat 1300 is wall mounted, is circular in shape, and has an outer rotatable ring 1312 for receiving user input. Thermostat 1300 has a large front face lying inside the outer ring 1312. According to some examples, thermostat 1300 is approximately 80 mm in diameter. The outer rotatable ring 1312 allows the user to make adjustments, such as selecting a new target temperature. For example, by rotating the outer ring 1312 clockwise, the target temperature can be increased, and by rotating the outer ring 1312 counter-clockwise, the target temperature can be decreased. The front face of the thermostat 1300 comprises a clear cover 1314 that according to some examples is polycarbonate, and a metallic portion 1324 having a number of slots. According to some examples, the surface of cover 1314 and metallic portion 1324 form a common outward arc or spherical shape gently arcing outward, and this gentle arcing shape is continued by the outer ring 1312.

Although being formed from a single lens-like piece of material, such as polycarbonate, the cover 1314 has two different regions or portions including an outer portion 1314o and a central portion 1314i. According to some examples, the cover 1314 is painted or smoked around the outer portion 1314o, but leaves the central portion 1314i visibly clear so as to facilitate viewing of an electronic display 1316. According to some examples, the curved cover 1314 acts as a lens that tends to magnify the information being displayed in electronic display 1316 to users. An example of information displayed on the electronic display 1316 is illustrated in FIG. 13A, and includes central numerals 1320 that are representative of a current set point temperature. According to some examples, metallic portion 1324 has number of slot-like openings so as to facilitate the use of a passive infrared motion sensor 1330. The metallic portion 1324 can alternatively be termed a metallic front grille portion. The thermostat 1300 is generally constructed so that the electronic display 1316 is at a fixed orientation and does not rotate with the outer ring 1312. In some examples, the cover 1314 and metallic portion 1324 also remain at a fixed orientation and do not rotate with the outer ring 1312. According to one example in which the diameter of the thermostat 1300 is about 80 mm, the diameter of the electronic display 1316 is about 45 mm. According to some examples an LED indicator 1380 is positioned beneath portion 1324 to act as a low-power-consuming indicator of certain status conditions. For, example the LED indicator 1380 can be used to display blinking red when a rechargeable battery of the thermostat is very low and is being recharged. More generally, the LED indicator 1380 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy. According to some examples, occupancy information is used in generating an effective and efficient scheduled program. Preferably, an active proximity sensor 1370A is provided to detect an approaching user by infrared light reflection, and an ambient light sensor 1370B is provided to sense visible light. The proximity sensor 1370A can be used to detect proximity in the range of about one meter so that the thermostat 1300 can initiate wake-up functionality when the user is approaching the thermostat and prior to the user touching the thermostat. Such use of proximity sensing is useful for enhancing the user experience by readying the thermostat for interaction as soon as, or very soon after the user is ready to interact with the thermostat. Further, the wake-up-on-proximity functionality also allows for energy savings within the thermostat by sleeping when no user interaction is taking place our about to take place. The ambient light sensor 1370B can be used for a variety of intelligence-gathering purposes, such as for facilitating confirmation of occupancy when sharp rising or falling edges are detected (because it is likely that there are occupants who are turning the lights on and off) and for detecting long patterns of ambient light intensity for confirming and/or automatically establishing the time of day.

The thermostat 1300 is controlled by only two types of user input, the first being a rotation of the outer ring 1312 as shown in FIG. 13A, and the second being an inward push on an outer cap 1308 (see FIG. 13B) until an audible and/or tactile click occurs. For the example of FIGS. 13A-13B, the outer cap 1308 is an assembly that includes all of the outer ring 1312, cover 1314, electronic display 1316, and metallic portion 1324. When pressed inwardly by the user, the outer cap 1308 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the example of FIGS. 13A-13B, an inward click can be achieved by direct pressing on the outer ring 1312 itself, or by indirect pressing of the outer ring by virtue of providing inward pressure on the cover 1314, metallic portion 1314, or by various combinations thereof. In other examples, the thermostat 1300 can be mechanically configured so that only the outer ring 1312 travels inwardly for the inward click input, while the cover 1314 and metallic portion 1324 remain motionless. It has been found desirable to provide the user with an ability to quickly go back and forth between registering ring rotations and inward clicks with a single hand and with minimal amount of time and effort involved. The strategic placement of the electronic display 1316 centrally inside the rotatable ring 1312 allows the user to focus his or her attention on the electronic display throughout the input process.

FIG. 13C illustrates a shell portion of a frame of the thermostat of FIGS. 13A-B. While the thermostat functionally adapts to the user's schedule, the outer shell portion 1309 is specially configured to convey a chameleon quality or characteristic so that the overall device appears to naturally blend in with many of the most common wall colors and wall textures found in home and business environments, at least in part because it will appear to assume the surrounding colors and even textures when viewed from many different angles. The shell portion 1309 has the shape of a frustum that is gently curved when viewed in cross-section, and comprises a sidewall 1376 that is made of a clear solid material, such as polycarbonate plastic. The sidewall 1376 is backpainted with a substantially flat silver- or nickel-colored paint, the paint being applied to an inside surface 1378 of the sidewall 1376 but not to an outside surface 1377. The outside surface 1377 is smooth and glossy but is not painted. The sidewall 1376 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension h of about 22.5 mm, the diameter change taking place in either a linear fashion or, more preferably, a slightly nonlinear fashion with increasing outward distance to form a slightly curved shape when viewed in profile, as shown in FIG. 13C. The outer ring 1312 of outer cap 1308 is preferably constructed to match the diameter d2 where disposed near the second end of the shell portion 1309 across a modestly sized gap g1 therefrom, and then to gently arc back inwardly to meet the cover 1314 across a small gap g2.

According to some examples, the thermostat 1300 includes a processing system 1360, display driver 1364 and a wireless communications system 1366. The processing system 1360 is adapted to cause the display driver 1364 and display area 1316 to display information to the user, and to receiver user input via the rotatable ring 1312. The processing system 1360, according to some examples, is capable of carrying out the governance of the operation of thermostat 1300 including the user interface features. The processing system 1360 is further programmed and configured to carry out other operations as described further below and/or in other ones of the commonly assigned incorporated applications. For example, processing system 1360 is further programmed and configured to maintain and update a thermodynamic model for the enclosure in which the HVAC system is installed. According to some examples, the wireless communications system 1366 is used to communicate with devices such as personal computers and/or other thermostats or HVAC system components, which can be peer-to-peer communications, communications through one or more servers located on a private network, or and/or communications through a cloud-based service.

Figure 14A:
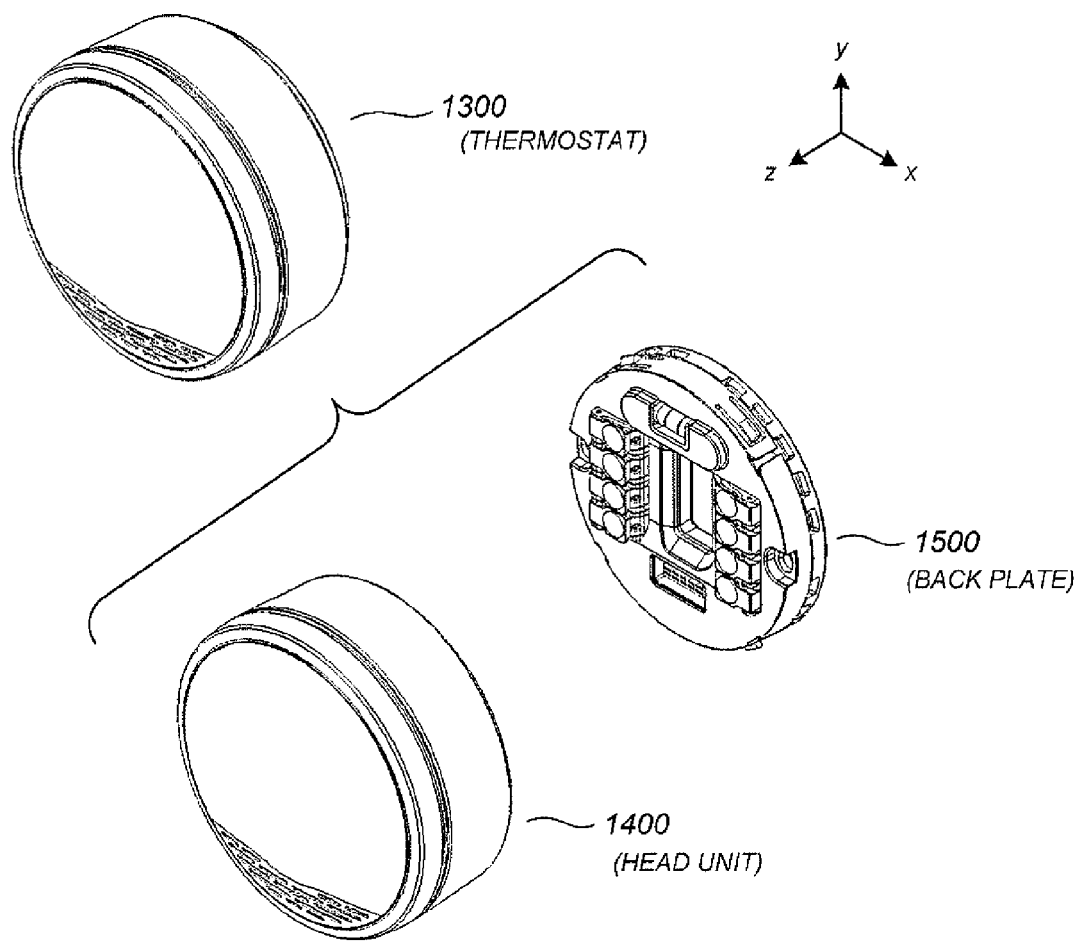
FIGS. 14A-14B illustrate a thermostat with respect to its two main components: the head unit and the back plate.
Figure 14B:
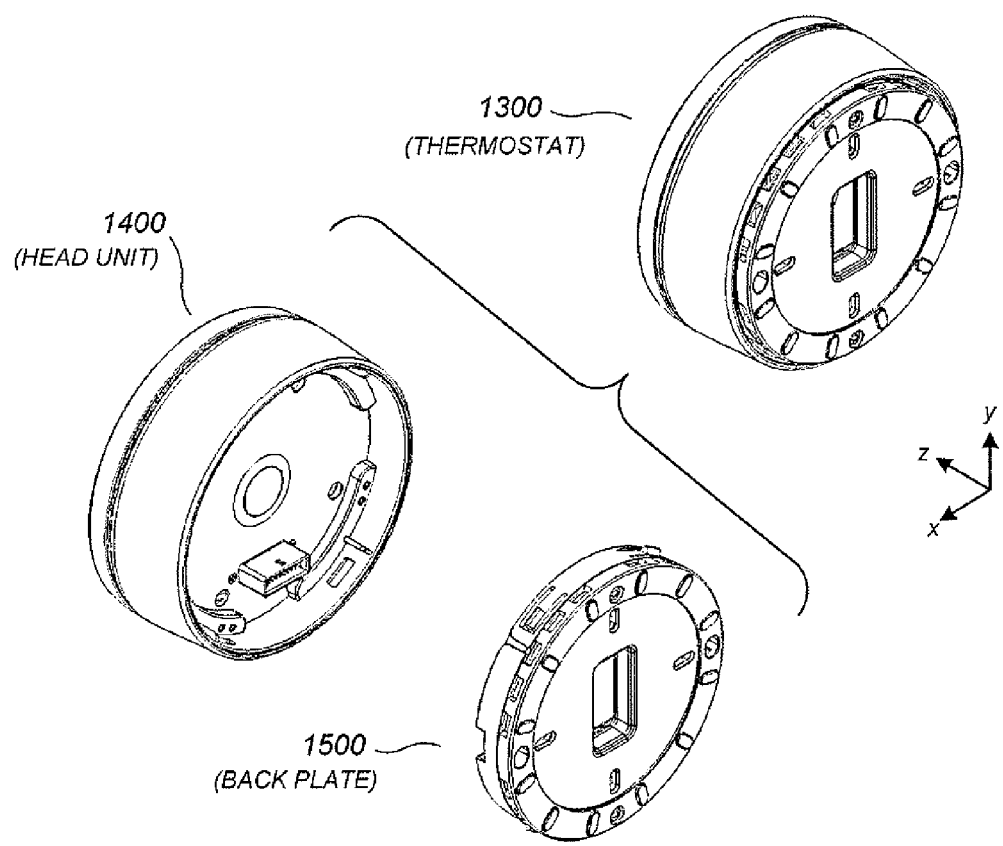

FIGS. 14A-14B illustrate a thermostat with respect to its two main components: the head unit and the back plate. The thermostat 1300 includes head unit 1400 and back plate 1500. In the drawings shown, the "z" direction is outward from the wall, the "y" direction is the head-to-toe direction relative to a walk-up user, and the "x" direction is the user's left-to-right direction.

Figure 15A:
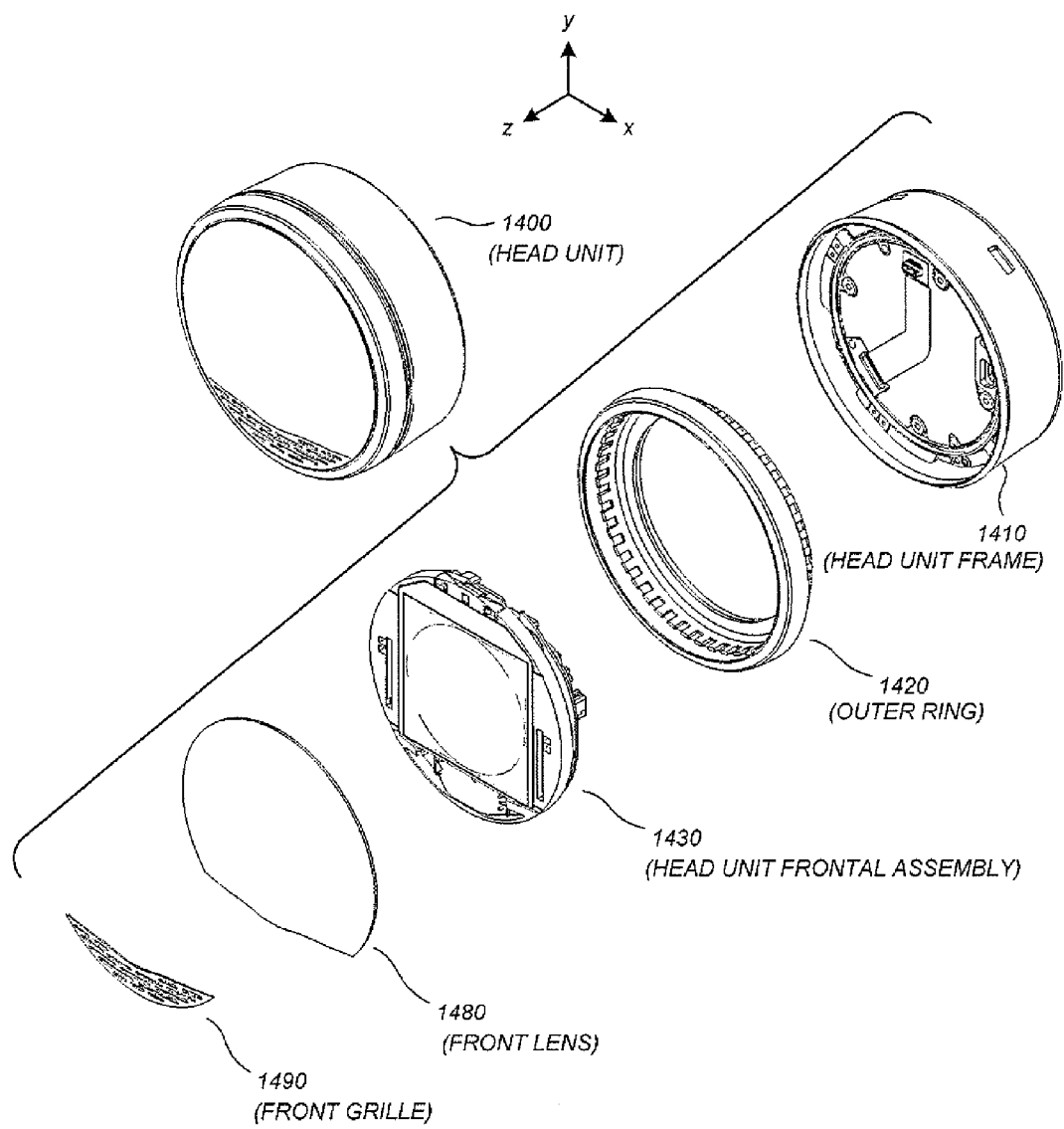
FIGS. 15A-15B illustrate the head unit with respect to its primary components.
Figure 15B:
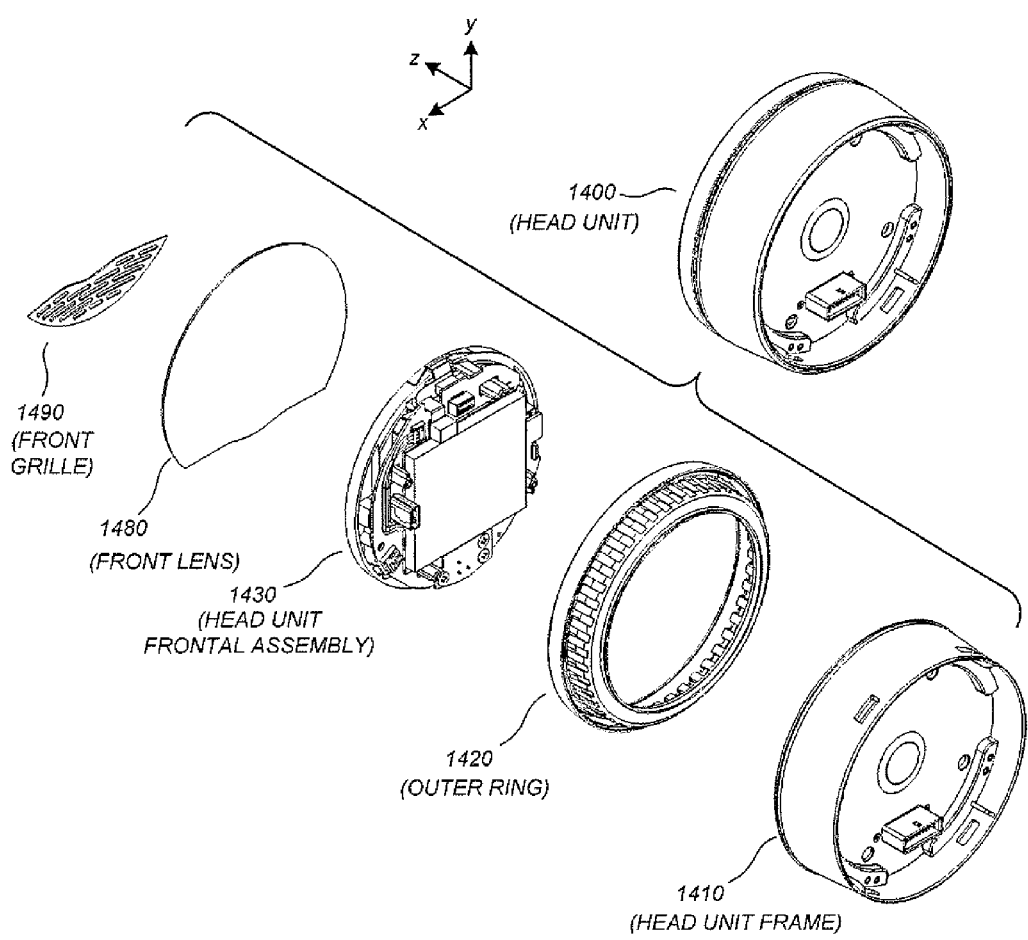

FIGS. 15A-15B illustrate the head unit with respect to its primary components. Head unit 1400 includes a head unit frame 1410, the outer ring 1420 (which is manipulated for ring rotations), a head unit frontal assembly 1430, a front lens 1480, and a front grille 1490. Electrical components on the head unit frontal assembly 1430 can connect to electrical components on the backplate 1500 by virtue of ribbon cables and/or other plug type electrical connectors.

Figure 16A:
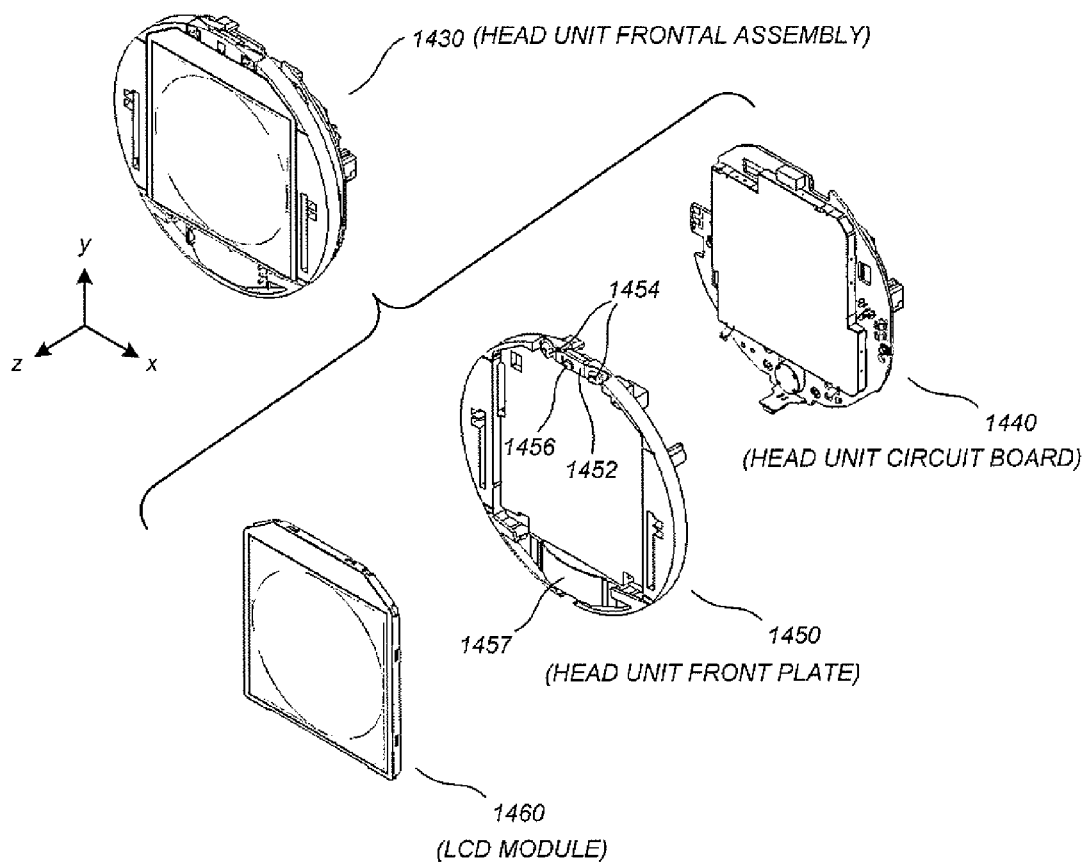
FIGS. 16A-16B illustrate the head-unit frontal assembly with respect to its primary components.
Figure 16B:
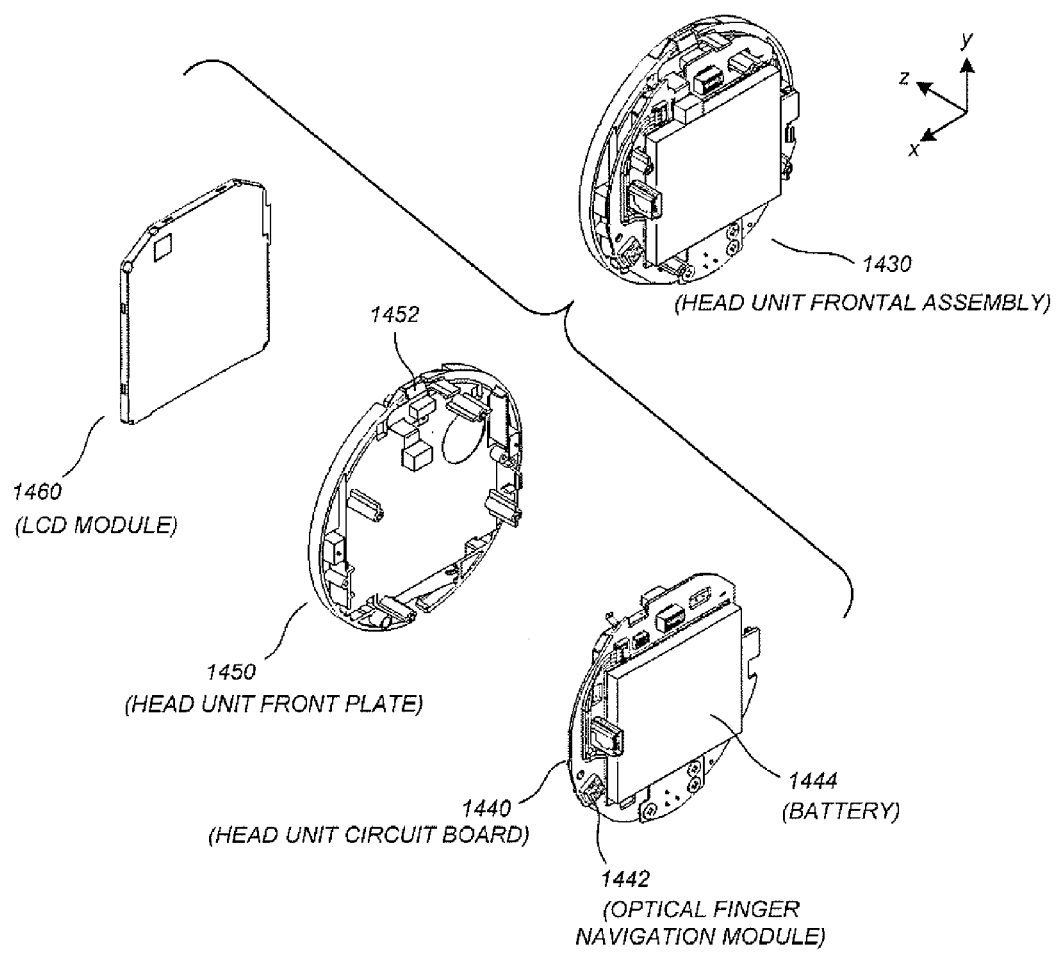

FIGS. 16A-16B illustrate the head-unit frontal assembly with respect to its primary components. Head unit frontal assembly 1430 comprises a head unit circuit board 1440, a head unit front plate 1450, and an LCD module 1460. The components of the front side of head unit circuit board 1440 are hidden behind an RF shield in FIG. 16A but are discussed in more detail below with respect to FIG. 19. On the back of the head unit circuit board 1440 is a rechargeable Lithium-Ion battery 1444, which for one preferred example has a nominal voltage of 3.7 volts and a nominal capacity of 560 mAh. To extend battery life, however, the battery 1444 is normally not charged beyond 450 mAh by the thermostat battery charging circuitry. Moreover, although the battery 1444 is rated to be capable of being charged to 4.2 volts, the thermostat battery charging circuitry normally does not charge it beyond 3.95 volts. Also visible in FIG. 16B is an optical finger navigation module 1442 that is configured and positioned to sense rotation of the outer ring 1420. The module 1442 uses methods analogous to the operation of optical computer mice to sense the movement of a texturable surface on a facing periphery of the outer ring 1420. Notably, the module 1442 is one of the very few sensors that is controlled by the relatively power-intensive head unit microprocessor rather than the relatively low-power backplate microprocessor. This is achievable without excessive power drain implications because the head unit microprocessor will be awake when the user is manually turning the dial, so there is no excessive wake-up power drain. Very fast response can also be provided by the head unit microprocessor. Also visible in FIG. 16A is a Fresnel lens 1457 that operates in conjunction with a PIR motion sensor.

Figure 17A:
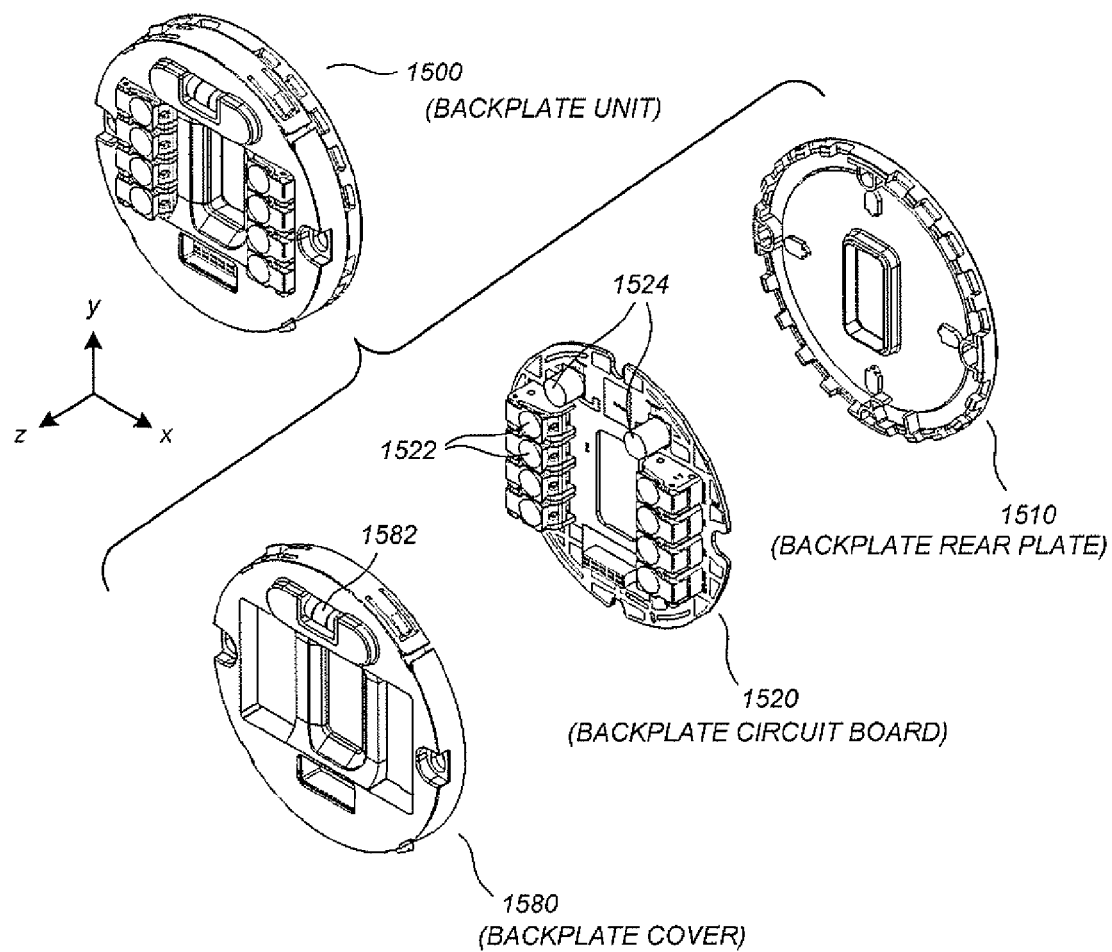
FIGS. 17A-17B illustrate the backplate unit with respect to its primary components.
Figure 17B:
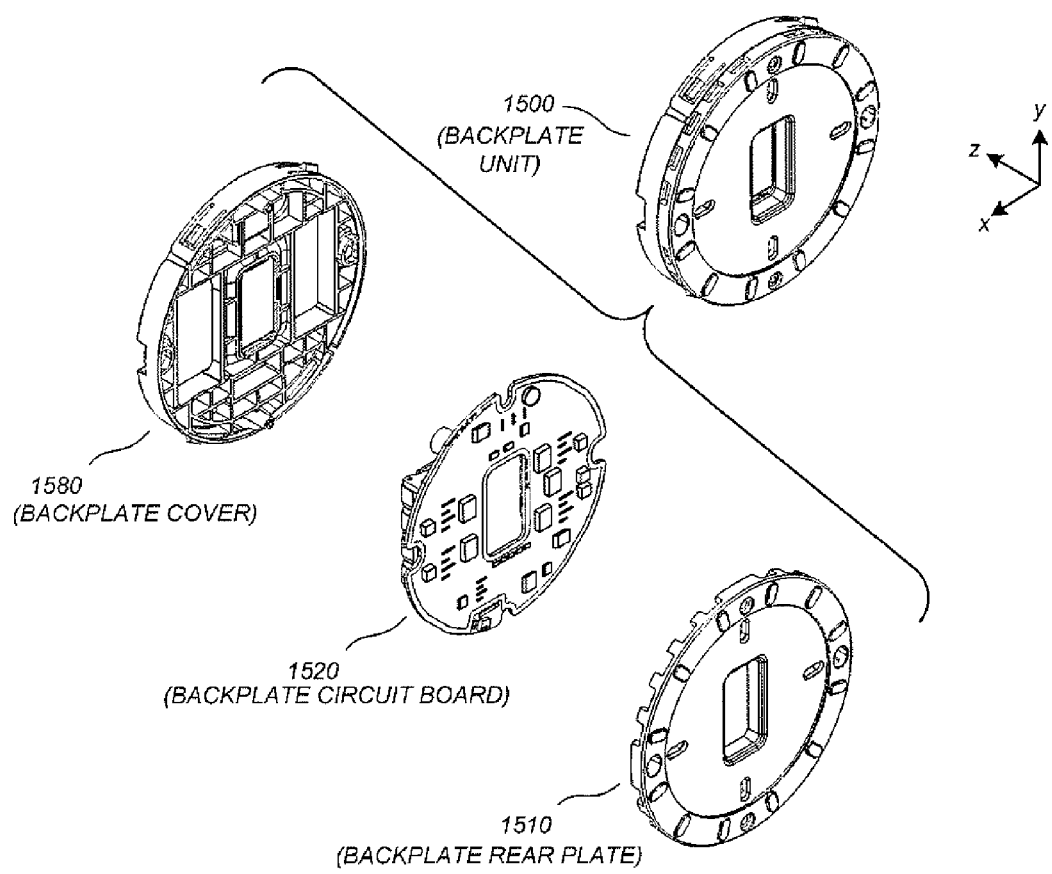

FIGS. 17A-17B illustrate the backplate unit with respect to its primary components. Backplate unit 1500 comprises a backplate rear plate 1510, a backplate circuit board 1520, and a backplate cover 1580. Visible in FIG. 17A are the HVAC wire connectors 1522 that include integrated wire insertion sensing circuitry, and two relatively large capacitors 1524 that are used by part of the power stealing circuitry that is mounted on the back side of the backplate circuit board 1520 and discussed further below with respect to FIG. 20.

Figure 18:
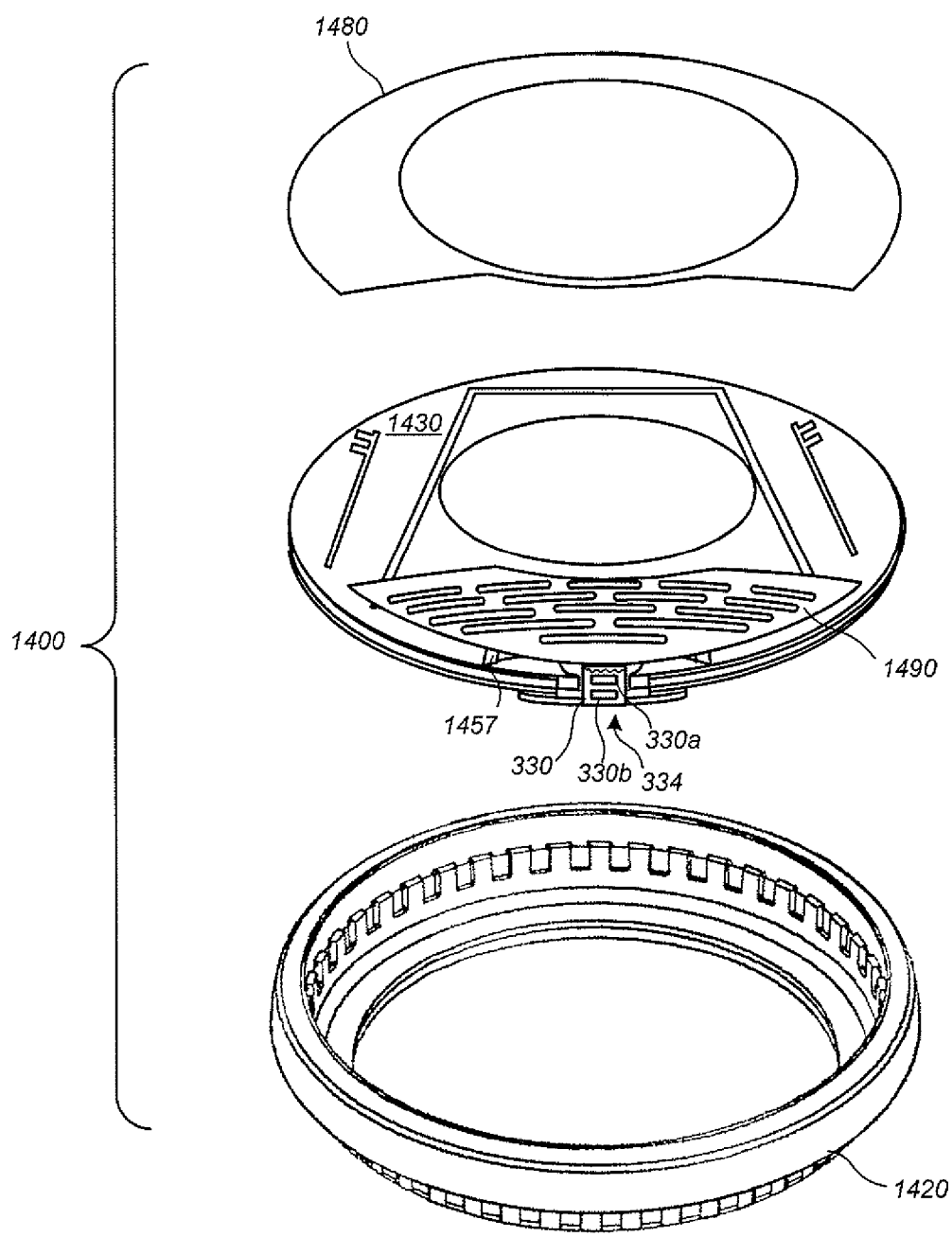
FIG. 18 a partially assembled head-unit front.

FIG. 18 a partially assembled head-unit front. FIG. 18 shows the positioning of grille member 1490 designed in accordance with aspects of the present invention with respect to several sensors used by the thermostat. In some implementations, placement of grille member 1490 over the Fresnel lens 1457 and an associated PIR motion sensor 334 conceals and protects these PIR sensing elements, while horizontal slots in the grille member 1490 allow the PIR motion sensing hardware, despite being concealed, to detect the lateral motion of occupants in a room or area. A temperature sensor 330 uses a pair of thermal sensors to more accurately measure ambient temperature. A first or upper thermal sensor 330a associated with temperature sensor 330 tends to gather temperature data closer to the area outside or on the exterior of the thermostat while a second or lower thermal sensor 330b tends to collect temperature data more closely associated with the interior of the housing. In one implementation, each of the temperature sensors 330a and 330b comprises a Texas Instruments TMP112 digital temperature sensor chip, while the PIR motion sensor 334 comprises PerkinElmer DigiPyro PYD 1498 dual element pyrodetector.

To more accurately determine the ambient temperature, the temperature taken from the lower thermal sensor 330b is taken into consideration in view of the temperatures measured by the upper thermal sensor 330a and when determining the effective ambient temperature. This configuration can be used to compensate for the effects of internal heat produced in the thermostat by the microprocessor(s) and/or other electronic components, obviating or minimizing temperature measurement errors that might otherwise be suffered. In some implementations, the accuracy of the ambient temperature measurement may be further enhanced by thermally coupling upper thermal sensor 330a of temperature sensor 330 to grille member 1490 as the upper thermal sensor 330a better reflects the ambient temperature than lower thermal sensor 334b.

Figure 19:
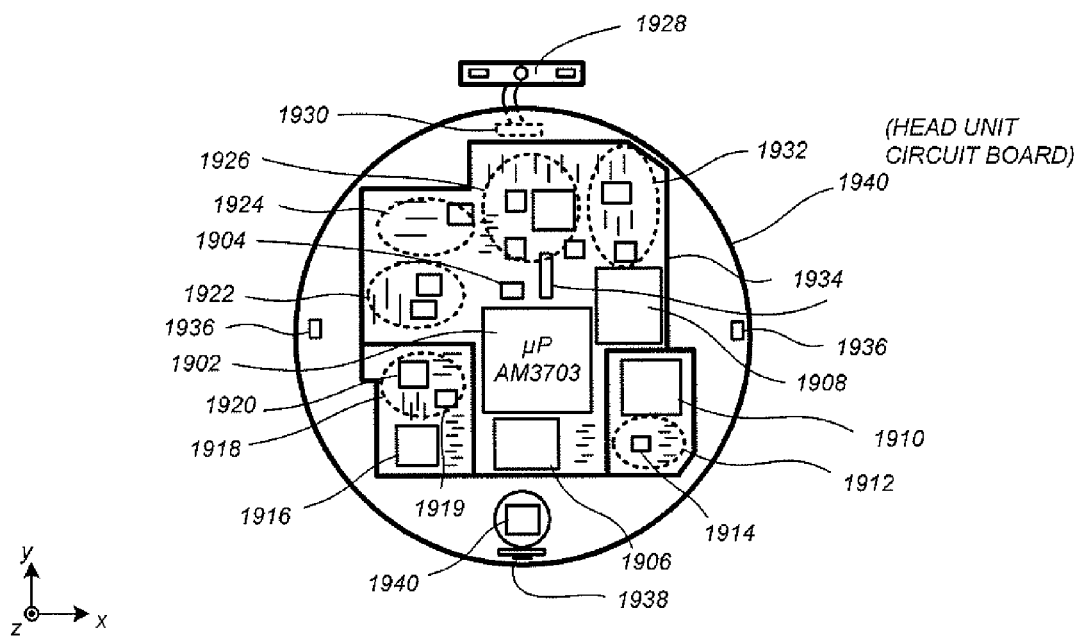
FIG. 19 illustrates a head-on view of the head-unit circuit board.

FIG. 19 illustrates a head-on view of the head-unit circuit board. The head unit circuit board 1440 comprises a head unit microprocessor 1902 (such as a Texas Instruments AM3703 chip) and an associated oscillator 1904, along with DDR SDRAM memory 1906, and mass NAND storage 1908. For Wi-Fi capability, there is provided in a separate compartment of RF shielding 1934 a Wi-Fi module 1910, such as a Murata Wireless Solutions LBWA19XSLZ module, which is based on the Texas Instruments WL1270 chipset supporting the 802.11b/g/n WLAN standard. For the Wi-Fi module 1910 is supporting circuitry 1912 including an oscillator 1914. For ZigBee capability, there is provided also in a separately shielded RF compartment a ZigBee module 1916, which can be, for example, a C2530F256 module from Texas Instruments. For the ZigBee module 1916 there is provided supporting circuitry 1918 including an oscillator 1919 and a low-noise amplifier 1920. Also provided is display backlight voltage conversion circuitry 1922, piezoelectric driving circuitry 1924, and power management circuitry 1926 (local power rails, etc.). Provided on a flex circuit 1928 that attaches to the back of the head unit circuit board by a flex circuit connector 1930 is a proximity and ambient light sensor (PROX/ALS), more particularly a Silicon Labs SI1142 Proximity/Ambient Light Sensor with an I2C Interface. Also provided are battery charging-supervision-disconnect circuitry 1932 and spring/RF antennas 1936. Also provided is a temperature sensor 1938 (rising perpendicular to the circuit board in the +z direction containing two separate temperature sensing elements at different distances from the circuit board), and a PIR motion sensor 1940. Notably, even though the PROX/ALS and temperature sensors 1938 and PIR motion sensor 1940 are physically located on the head unit circuit board 1440, all these sensors are polled and controlled by the low-power backplate microcontroller on the backplate circuit board, to which they are electrically connected.

Figure 20:
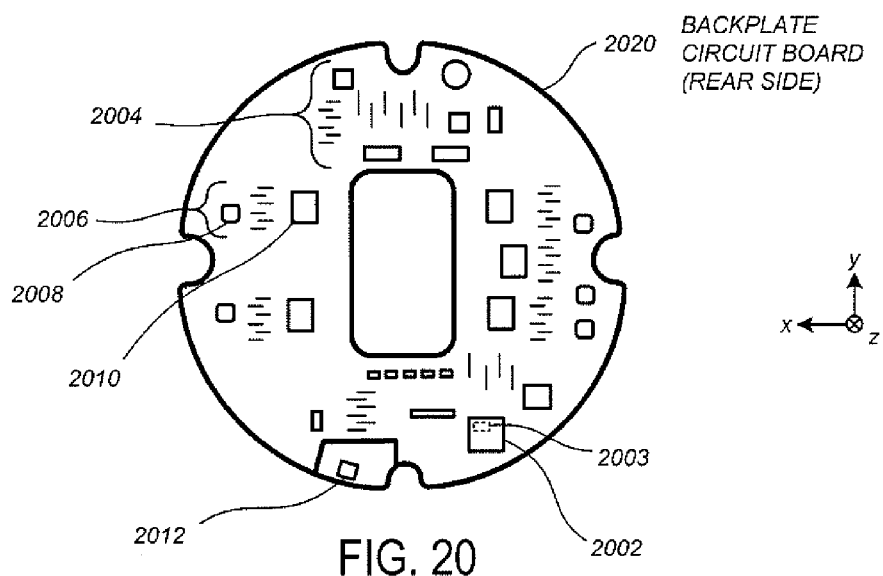
FIG. 20 illustrates a rear view of the backplate circuit board.

FIG. 20 illustrates a rear view of the backplate circuit board. The backplate circuit board 1520 comprises a backplate processor/microcontroller 2002, such as a Texas Instruments MSP430F System-on-Chip Microcontroller that includes an on-board memory 2003. The backplate circuit board 1520 further comprises power supply circuitry 2004, which includes power-stealing circuitry, and switch circuitry 2006 for each HVAC respective HVAC function. For each such function the switch circuitry 2006 includes an isolation transformer 2008 and a back-to-back NFET package 2010. The use of FETs in the switching circuitry allows for "active power stealing", i.e., taking power during the HVAC "ON" cycle, by briefly diverting power from the HVAC relay circuit to the reservoir capacitors for a very small interval, such as 100 micro-seconds. This time is small enough not to trip the HVAC relay into the "off" state but is sufficient to charge up the reservoir capacitors. The use of FETs allows for this fast switching time (100 micro-seconds), which would be difficult to achieve using relays (which stay on for tens of milliseconds). Also, such relays would readily degrade doing this kind of fast switching, and they would also make audible noise too. In contrast, the FETS operate with essentially no audible noise. Also provided is a combined temperature/humidity sensor module 2012, such as a Sensirion SHT21 module. The backplate microcontroller 2002 performs polling of the various sensors, sensing for mechanical wire insertion at installation, alerting the head unit regarding current vs. set point temperature conditions and actuating the switches accordingly, and other functions such as looking for appropriate signal on the inserted wire at installation.

The thermostat 1300 represents an advanced, multi-sensing, microprocessor-controlled intelligent or "learning" thermostat that provides a rich combination of processing capabilities, intuitive and visually pleasing user interfaces, network connectivity, and energy-saving capabilities (including the presently described auto-away/auto-arrival algorithms) while at the same time not requiring a so-called "C-wire" from the HVAC system or line power from a household wall plug, even though such advanced functionalities can require a greater instantaneous power draw than a "power-stealing" option (i.e., extracting smaller amounts of electrical power from one or more HVAC call relays) can safely provide. The head unit microprocessor 1902 can draw on the order of 250 mW when awake and processing, the LCD module 1460 can draw on the order of 250 mW when active. Moreover, the Wi-Fi module 1910 can draw 250 mW when active, and needs to be active on a consistent basis such as at a consistent 2% duty cycle in common scenarios. However, in order to avoid falsely tripping the HVAC relays for a large number of commercially used HVAC systems, power-stealing circuitry is often limited to power providing capacities on the order of 100 mW-200 mW, which would not be enough to supply the needed power for many common scenarios.

The thermostat 1300 resolves such issues at least by virtue of the use of the rechargeable battery 1444 (or equivalently capable onboard power storage medium) that will recharge during time intervals in which the hardware power usage is less than what power stealing can safely provide, and that will discharge to provide the needed extra electrical power during time intervals in which the hardware power usage is greater than what power stealing can safely provide. In order to operate in a battery-conscious manner that promotes reduced power usage and extended service life of the rechargeable battery, the thermostat 1300 is provided with both a relatively powerful and relatively power-intensive first processor (such as a Texas Instruments AM3703 microprocessor) that is capable of quickly performing more complex functions such as driving a visually pleasing user interface display and performing various mathematical learning computations and a relatively less powerful and less power-intensive second processor (such as a Texas Instruments MSP430 microcontroller) for performing less intensive tasks, including driving and controlling the occupancy sensors. To conserve valuable power, the first processor is maintained in a sleep state for extended periods of time and is woken up only for occasions in which its capabilities are needed, whereas the second processor is kept on more or less continuously (although slowing down or disabling certain internal clocks for brief periodic intervals to conserve power) to perform relatively low-power tasks. The first and second processors are mutually configured such that the second processor can wake the first processor on the occurrence of certain events, which can be referred to as "wake-on facilities." These wake-on facilities can be turned on and turned off as part of different functional and/or power-saving goals to be achieved. For example, a wake-on-PROX facility can be provided by which the second processor, when detecting a user's hand approaching the thermostat dial by virtue of an active proximity sensor (PROX, such as provided by a Silicon Labs SI1142 Proximity/Ambient Light Sensor with I2C Interface), will wake up the first processor so that it can provide a visual display to the approaching user and be ready to respond more rapidly when their hand touches the dial. As another example, a wake-on-PIR facility can be provided by which the second processor will wake up the first processor when detecting motion somewhere in the general vicinity of the thermostat by virtue of a passive infrared motion sensor (PIR, such as provided by a PerkinElmer DigiPyro PYD 1998 dual element pyrodetector). Notably, wake-on-PIR is not synonymous with auto-arrival, as there would need to be N consecutive buckets of sensed PIR activity to invoke auto-arrival, whereas only a single sufficient motion event can trigger a wake-on-PIR wake-up.

FIGS. 21A-21C illustrate the sleep-wake timing dynamic, at progressively larger time scales. FIGS. 21A-21C illustrate examples of the sleep-wake timing dynamic that can be achieved between the head unit (HU) microprocessor and the backplate (BP) microcontroller that advantageously provides a good balance between performance, responsiveness, intelligence, and power usage. The higher plot value for each represents a wake state (or an equivalent higher power state) and the lower plot value for each represents a sleep state (or an equivalent lower power state). As illustrated, the backplate microcontroller is active much more often for polling the sensors and similar relatively low-power tasks, whereas the head unit microprocessor stays asleep much more often, being woken up for "important" occasions such as user interfacing, network communication, and learning algorithm computation, and so forth. A variety of different strategies for optimizing sleep versus wake scenarios can be achieved by the disclosed architecture and is within the scope of the present teachings.

Figure 22:
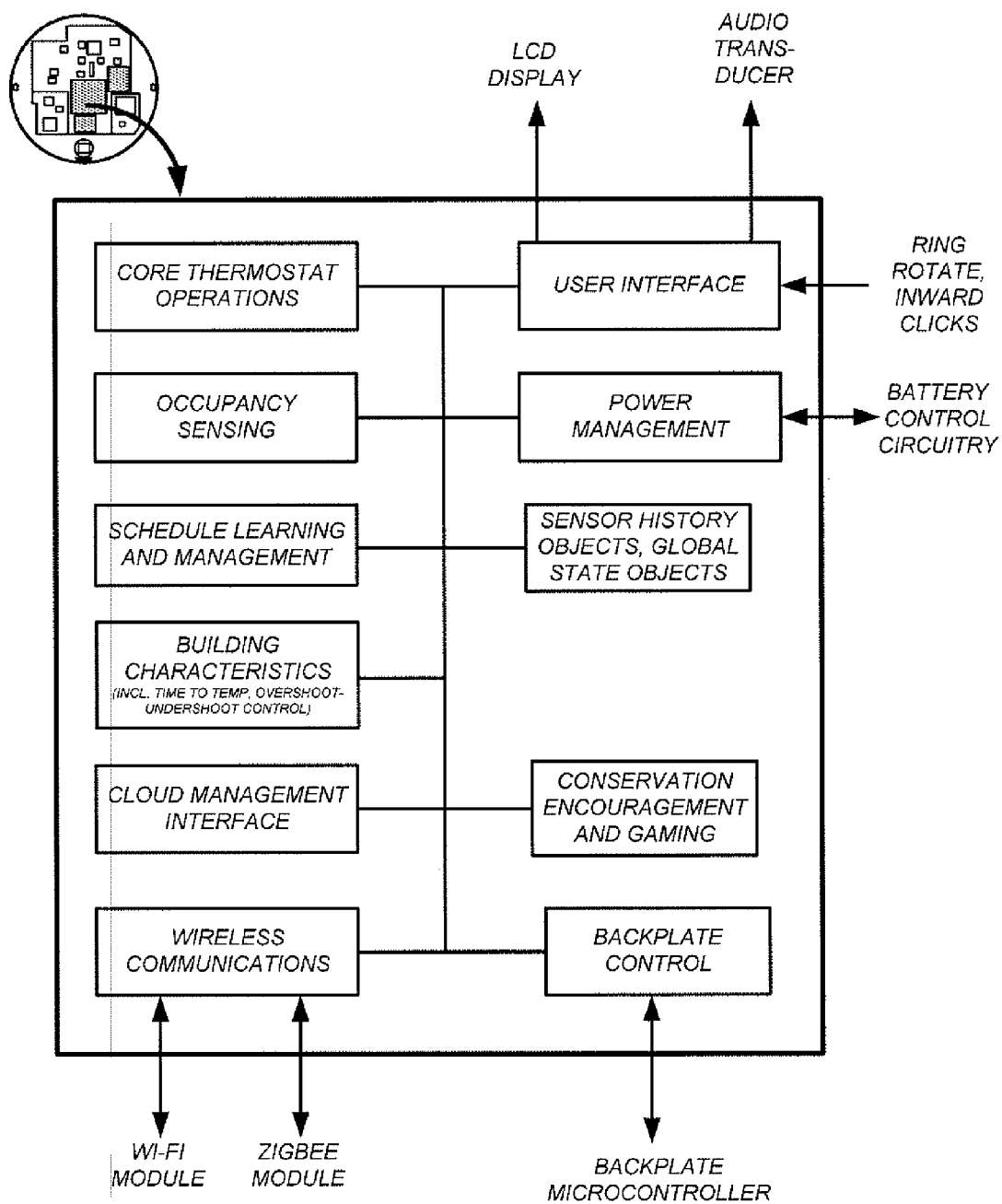
FIG. 22 illustrates a self-descriptive overview of the functional software, firmware, and/or programming architecture of the head unit microprocessor.
Figure 23:
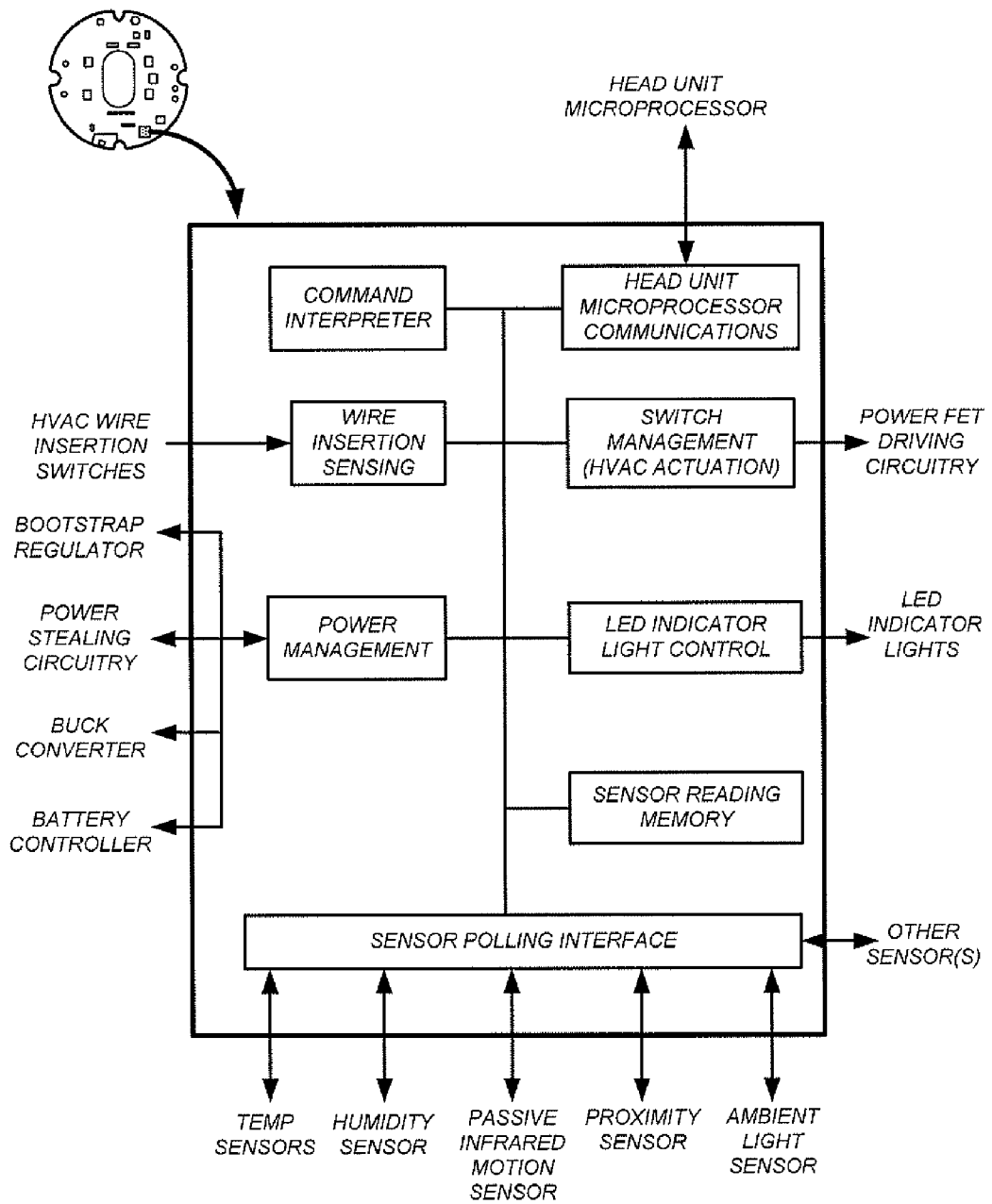
FIG. 23 illustrates the functional software, firmware, and/or programming architecture of the backplate microcontroller.

FIG. 22 illustrates a self-descriptive overview of the functional software, firmware, and/or programming architecture of the head unit microprocessor 1902. FIG. 23 illustrates the functional software, firmware, and/or programming architecture of the backplate microcontroller 2002.

Figure 24:
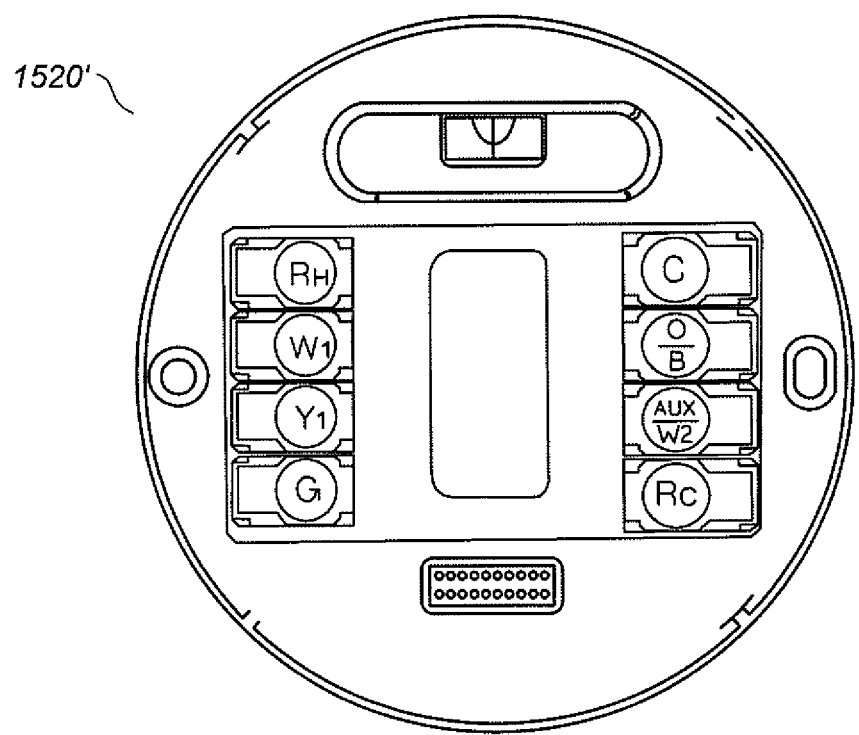
FIG. 24 illustrates a view of the wiring terminals, as presented to the user, when the backplate is exposed.

FIG. 24 illustrates a view of the wiring terminals, as presented to the user, when the backplate is exposed. Each wiring terminal is configured so that the insertion of a wire is detected and made apparent to the backplate microcontroller and ultimately the head unit microprocessor. According to one example, when the insertion of a particular wire is detected, a further check is automatically carried out by the thermostat to ensure that signals appropriate to that particular wire are present. For one example, a voltage waveform between that wiring node and a "local ground" of the thermostat is automatically measured. The measured waveform should have an RMS-type voltage metric that is above a predetermined threshold value, and when such predetermined value is not reached, then a wiring error condition is indicated to the user. The predetermined threshold value, which may vary from circuit design to circuit design depending on the particular selection of the local ground, can be empirically determined using data from a population of typical HVAC systems to statistically determine a suitable threshold value. In some examples, the "local ground" or "system ground" can be created from the $R_h$ line and/or $R_c$ terminal and whichever of the G, Y, or W terminals from which power stealing is being performed, these two lines going into a full-bridge rectifier (FWR) which has the local ground as one of its outputs.

Figure 25:
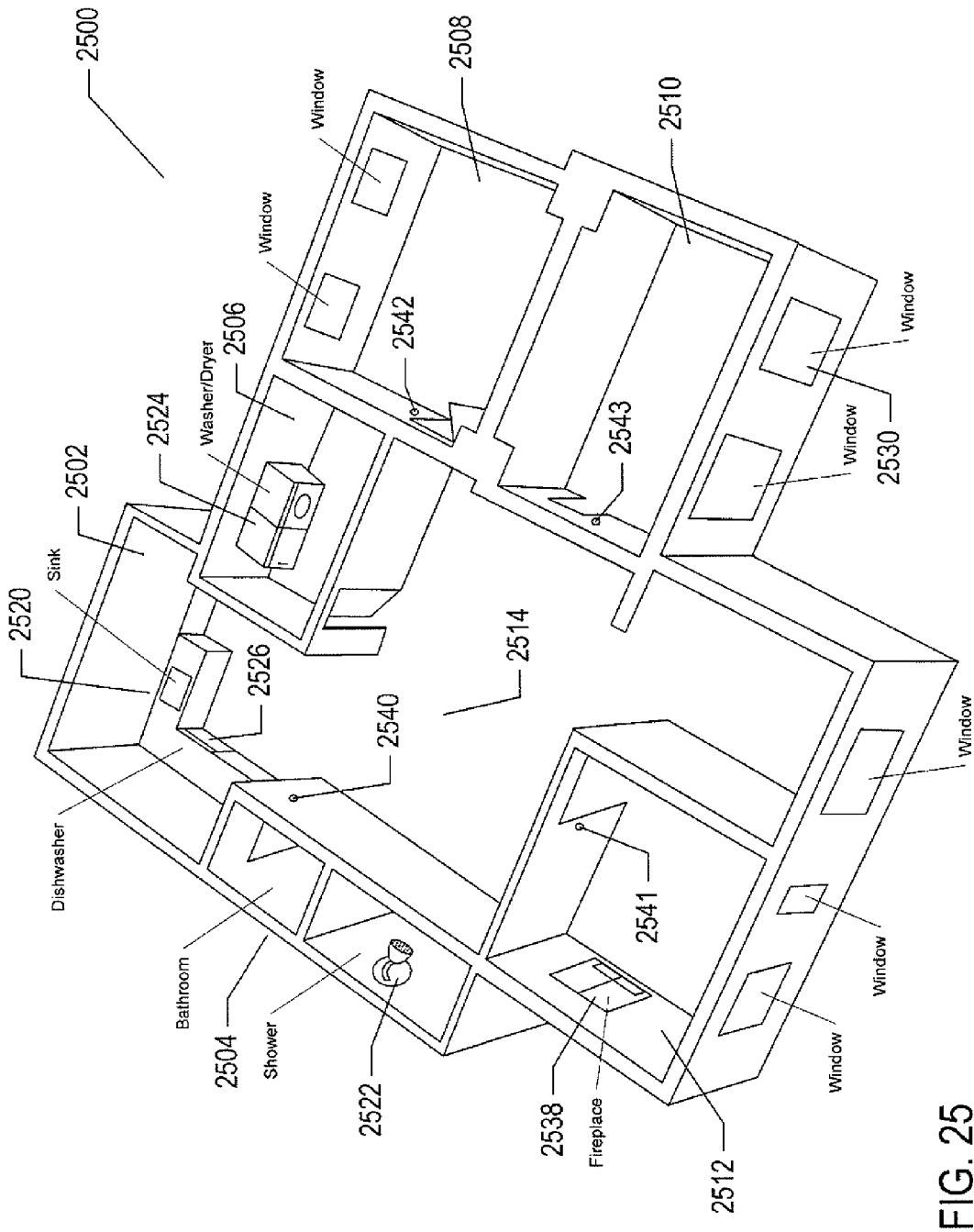
FIG. 25 shows a residential housing unit that is monitored and controlled by an intelligent-thermostat-based intelligent control system.

Continuous Intelligent-Control-System Update Using Information Requests Directed to User Devices FIG. 25 shows a residential housing unit that is monitored and controlled by an intelligent-thermostat-based intelligent control system. The housing unit 2500 includes a kitchen area 2502, bathroom and shower 2504, a utility room 2506, two bedrooms 2508 and 2510, a den 2512, and a large central living space 2514. As with any living space, the housing unit 2500 shown in FIG. 25 includes many different features that may input or release heat into the housing unit or remove heat from the housing unit, referred to as heat sources and heat sinks.

Examples of heat sources include hot-water taps 2520, shower heads 2522, washer/dryer appliances 2524, a dishwasher 2526, a fireplace 2528, and windows, such as window 2530. Windows may be heat sources when direct sunlight is streaming through the windows, when the outside temperature is greater than the inside temperature, and under other conditions. Hot-water taps and shower heads may be heat sources when operating to introduce hot water into the living environment, such as filling a sink or generating a warm shower spray that exchanges heat with the interior environment. Most electromechanical appliances, including refrigerators, are heat sources, since motors, cooling units, and other components of electromechanical appliances generate heat during operation. Human occupants and pets may also be heat sources, as are most lighting systems, display devices, televisions, and computers.

By contrast, heat sinks remove heat from the residential unit, and include range-hood fans ported to the exterior environment, windows, when the outside temperature is lower than the inside temperature and direct sunlight is not streaming through the windows, vents and other unsealed openings, such as spaces below doors without weather stripping, when the outside temperature is lower than the inside temperature, cold-water taps, which introduce cold water into the environment that is warmed by heat from the internal environment, and even a fireplace, when the fireplace is not dampened and air is sucked from within the environment and expelled from a chimney.

The housing unit may also include various types of insulation and heat barriers, heat-exchange passageways, such as open doors through which heat may flow from a warmer room to a colder room through a doorway or corridor, and may contain many different types of objects and materials with different heat capacities that absorb heat as the interior environment is being warmed. Heat sources, heat sinks, materials and objects with relatively large heat capacities, the degrees of insulation in various parts of the residence, and channels for heat exchange between different portions of the residence may all contribute to the heating and cooling characteristics of a residence in which an HVAC system and other heating and cooling components controlled by intelligent thermostats operate. Precise, energy-efficient control of heating and cooling within a controlled environment, such as the housing unit illustrated in FIG. 25, is facilitated when these various parameters and characteristics are known, dynamically monitored, and even predicted according to learned operational and behavioral patterns by an intelligent control system that includes intelligent thermostats. The parameters and characteristics may include the locations and characteristics of various heat sources and heat sinks, insulation levels, the R values of various rooms and even walls within the rooms, the locations and capacities of interior conduits for heat exchange, such as open doors, and the operational status of various heat-producing appliances and heat-introducing features.

Unfortunately, as shown in FIG. 25, there may be fewer intelligent thermostats 2540-2543 than rooms, limiting the reach and range of the intelligent thermostats with respect to the controlled environment. The intelligent thermostats may generally have a limited number of sensors that generate signals from only a limited number of different types of environmental phenomena, limiting the types and quantities of information available to the intelligent thermostats. Additionally, the range and angles over which specific sensors can receive signals may not allow sensor data to be generated for large portions of a controlled environment. For example, as discussed in the preceding sections, an intelligent thermostat may have temperature sensors, light sensors, sound sensors, and proximity sensors, among others. It is even possible for high-end intelligent thermostats to include web cams or other visual-surveillance monitors. Despite having these various types of sensors, it is a nonetheless a formidable and generally intractable task for an intelligent control system to acquire and interpret sufficient sensor input to fully characterize all of the various heat sources, heat sinks, and other information, discussed above, that would be desirable to be collected and maintained, on an ongoing basis, in order to effectively and efficiently control the temperature and other aspects of the residential unit, detect hazardous conditions, and predict future control-related events and conditions. Similar considerations apply to other types of enclosed spaces, entire buildings, and other environments controlled by intelligent control systems that include intelligent thermostats.

Figure 26A:
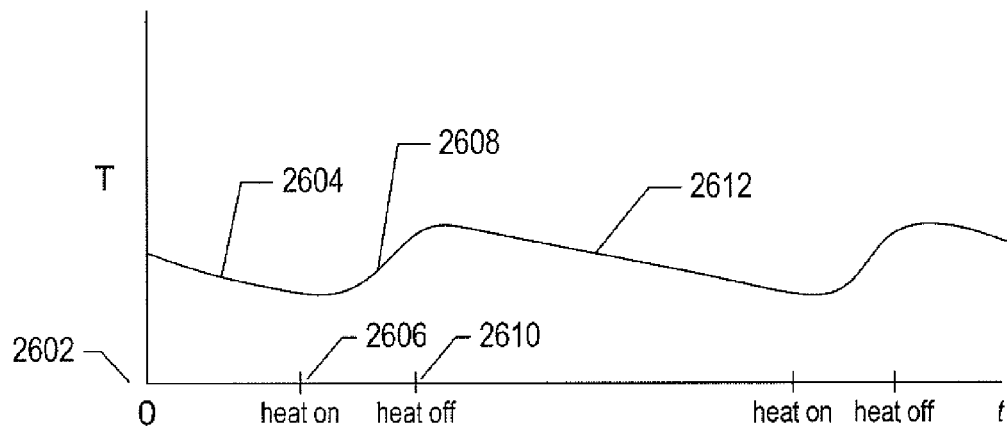
FIGS. 26A-C illustrate one example of how a full characterization of a residential unit, or other controlled environment, may contribute to effective and efficient temperature control by an intelligent control system.
Figure 26B:
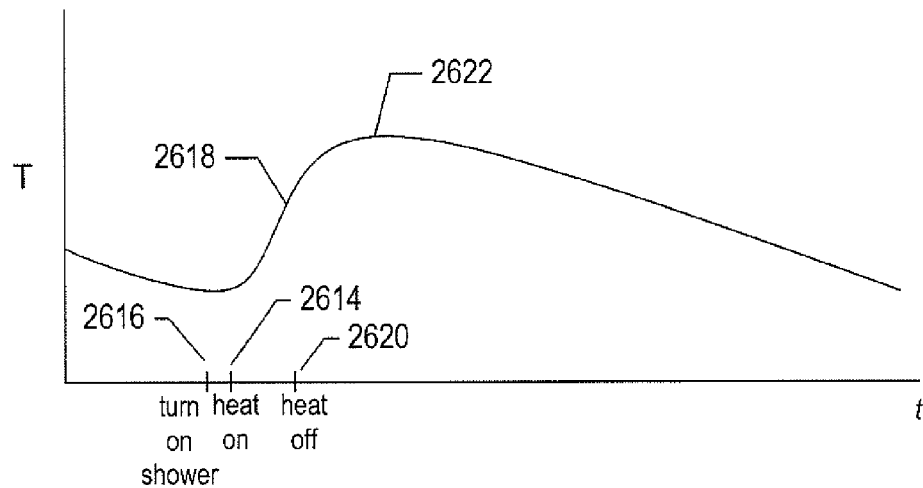
Figure 26C:
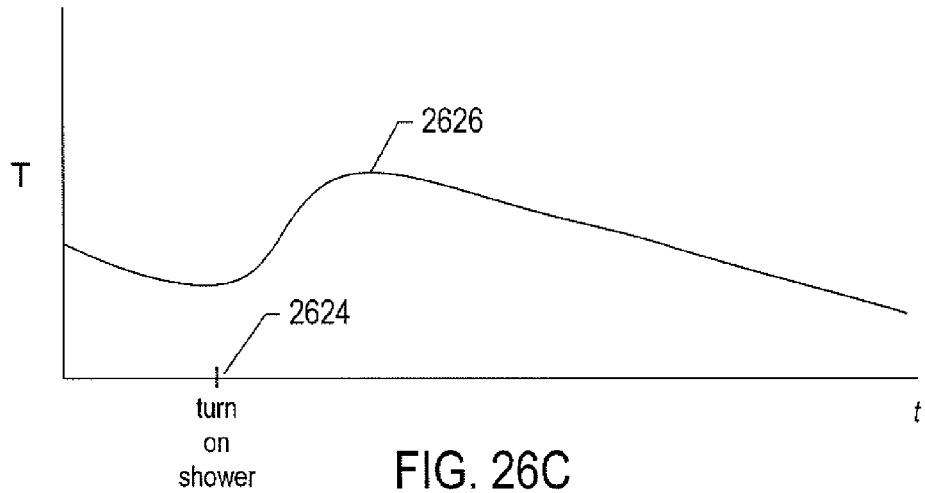

FIGS. 26A-C illustrate one example of how a full characterization of a residential unit, or other controlled environment, may contribute to effective and efficient temperature control by an intelligent control system. FIGS. 26A-C all use similar illustration conventions and show plots of temperature versus time, with temperature represented by the vertical axis and time represented by the horizontal axis. FIG. 26A shows a temperature versus time curve for a residential unit. The heating unit, at time 0 (2602 in FIG. 26A) is powered off because the temperature at that time is within a previously specified, desirable temperature range. The temperature falls, in the initial portion of the curve 2604, as heat is slowly lost from the controlled environment, until a time 2606 at which the heating unit is activated by the control system. The temperature then rapidly rises, in the steep upward portion of the curve 2608, to a point that the heating unit is powered off 2610, after which the temperature slowly decreases in the gradual, down-sloping of the curve 2612. These cycles continue at regular intervals, when no other changes or events that affect the heating response of the controlled environment or that affect control of the intelligent control system occur.

In the graph shown in FIG. 26B, just prior to heating-unit activation at time 2614, an occupant turns on a hot-water shower 2616. The hot-water shower introduces a substantial amount of heat to the interior environment of the residential unit, in addition to the heat generated by the heating unit, resulting in a steep rise in temperature in the upward portion 2618 of the curve. The heating unit is powered off relatively early in this portion of the curve 2620, but the temperature continues to rise, as a result of the hot-water shower, to a significantly higher temperature 2622 than specified as being desired by the resident. This is an example of activation of a heat source within the residential environment in addition to the heating unit, resulting in the interior temperature rising higher than desired and wasting of a heating cycle.

FIG. 26C illustrates the same scenario illustrated in FIG. 26B when the heating unit is controlled by an intelligent control system with awareness of additional heat sources within the residential unit as well as when they are activated. As in FIG. 26B, in FIG. 26C, the resident turns on the hot-water shower 2624 as the temperature is approaching the temperature at which the heating unit would normally be activated. However, the intelligent control system is aware that the hot-water shower has been turned on, due to correctly interpreting an audio signal or the combination of an audio signal and a humidity signal, understands that this will quickly contribute a significant amount of heating to the residential interior environment, and thus defers activating the heating unit in expectation of the heating soon to be provided by the hot-water shower. As a result, the temperature does not rise as high, as can be seen by comparing the peak temperature 2626 reached in the curve shown in FIG. 26C with the peak temperature 2622 reached in FIG. 26B. Additionally, the wasted heating cycle during the time period from times 2614 to 2620 in FIG. 26B is avoided, saving energy as well as avoiding a power-on/power-off cycle of the heating unit.

The example illustrating the benefits of interior-environment awareness by an intelligent control system shown in FIGS. 26A-G is but one of myriad possible examples of the benefits of interior-environment awareness. By learning the patterns of behavior and activities of residents and characteristics of the controlled environment, and by developing a computational model of the controlled environment, an intelligent control system, by continuously monitoring the interior environment, may detect anomalies and events that correspond to dangerous and hazardous aberrant conditions, including fires, malfunctioning appliances, doors left open when occupants are away for long periods, water left running for unusual periods of time, and other such events. The intelligent control system can generate various types of alarms and attempt to contact responsible parties in order to address the unusual, potentially hazardous conditions. Interior-environment awareness can also, as shown in FIGS. 26A-C, lead to far more efficient and effective control of an interior environment. In another example, when the intelligent control system learns a pattern of fireplace usage in the residence depicted in FIG. 25 and knows which pathways within the residence are currently available for transmitting heat from the fireplace to other portions of the residence, such as open doors and operating ceiling fans, the intelligent control system may alter patterns of heating-unit activation and the direction of heat produced by the heating unit to various parts of the residence in order to optimally or near optimally make use of the heat that is anticipated to be generated by the fireplace. An intelligent control system may, for example, learn that, on weekends, from November through March, when the outside temperature is below freezing and at least one resident is at home, the fireplace will be activated at 4:00 PM with a likelihood of greater than 90 percent. As a result, the intelligent control system can accurately anticipate activation of the fireplace at 4:00 PM on the days that correspond to the pattern of fireplace activity and begin, prior to 4:00 PM, controlling heating-unit activation and distribution of heating to various parts of the residential unit in order to optimally or near-optimally make use of the heat soon to be generated by the fireplace.

Figure 27:
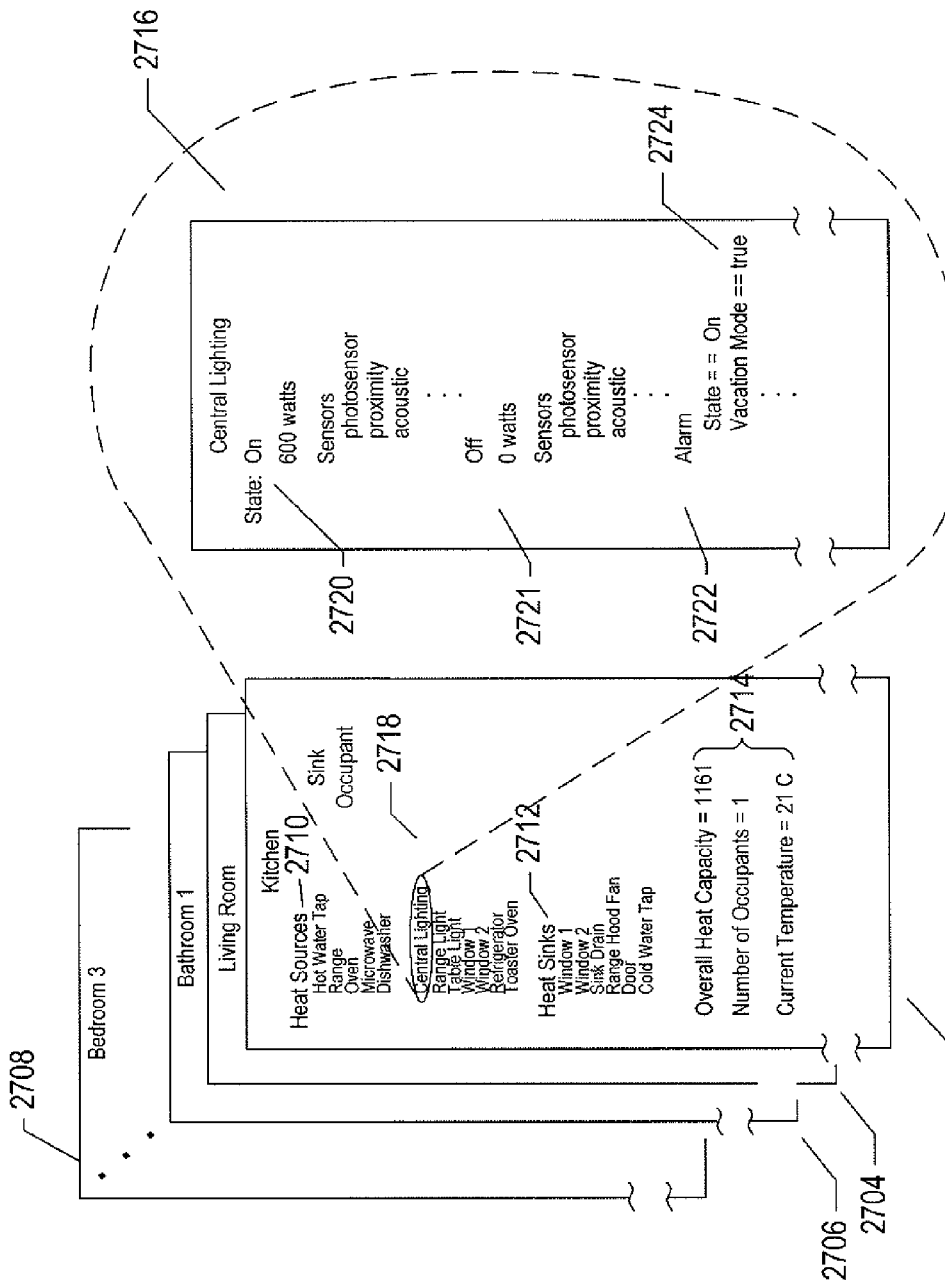
FIG. 27 illustrates the type of information that would be desirably acquired and maintained, on a continuing basis, by an intelligent control system for controlling the environment within a residential unit, building, or other structure.

FIG. 27 illustrates the type of information that would be desirably acquired and maintained, on a continuing basis, by an intelligent control system for controlling the environment within a residential unit, building, or other structure. The information may be organized, as shown in FIG. 27, by room, with a data structure, or sub-data structure for each room in the residential unit or building. In FIG. 27, there is a data structure shown for a kitchen 2702, a living room 2704, a bathroom 2706, and additional rooms ending with a final data structure 2708 for a third bedroom. For each room, the heat sources 2710, heat sinks 2712, and various additional characteristics and parameters 2714 are included in the information stored in the data structure. These entries themselves may be data structures, such as data structure 2716 corresponding to the central-lighting 2718 heat source. In the central-lighting data structure 2716, the intelligent control system maintains a list of the various states of the central-lighting system 2720-2721, for each state indicating the amount of energy output by the central-lighting system and additionally indicating the types of sensor outputs by which the state can be detected. Various additional alarm states 2722 may be coded as predicates 2724 comprising Boolean expressions of combinations of states, characteristics, and sensor readings that indicate a particular alarm condition. This is but one example of the types of encodings and types of interior-environment information that may be created, stored, and continuously updated by an intelligent control system based on monitoring sensor input from intelligent thermostats and other sensors within the interior environment. The data illustrated in FIG. 27 is digitally encoded stored in one or more electronic memories within an intelligent thermostat as well as within remote computers of an intelligent control system.

Unfortunately, as discussed above with reference to FIG. 25, the intelligent control system is generally constrained by the numbers and types of sensors included in intelligent thermostats and the generally partial coverage of those sensors with respect to the entire controlled environment. For example, in FIG. 25, the closest intelligent thermostat 2540 to the kitchen area does not face towards the kitchen area and is around the corner from the door that leads into the bathroom 2504. Thus, the amount and types of information that can be acquired by an intelligent control system with respect to the kitchen and bathroom is likely to be relatively constrained in comparison to the information that can be acquired with regard to the living space 2514 located in front of intelligent thermostat 2540. Additionally, only a relative small amount of desirable information can be directly obtained through sensor-data interpretation. For example, no combination of sensor data is likely to reveal the model number of a kitchen appliance, needed to determine various operational characteristics of the appliance. Often, because of limited types of sensor input available to the intelligent control system, the intelligent control system may need additional user input in order to interpret sensor data. For example, an audio sensor within intelligent thermostat 2540 may record an output of a signal corresponding to the sounds generated by the dishwasher 2526, sink faucet 2520, and shower head 2522, but is likely unable to unambiguously determine that a particular pattern of audio signals corresponds to the dishwasher. The locations of the dishwasher, faucet, and shower head may have been determined through a configuration and initial-information-gathering interactive session with the user, but learning, by the intelligent control system, the patterns of audio signals corresponding to activation of particular devices from sensor data collected during monitoring of the controlled environment may require user input to identify devices responsible for particular patterns of sensor data. Furthermore, the patterns of acoustic signals may change, over time, as appliances age and wear, as furniture is rearranged, and for a variety of other reasons. New appliances may be purchased and operated, and myriad characteristics and parameters may dynamically change. Dynamic changes may include seasonal changes, diurnal changes, and changes correlated with patterns of user occupation and behaviors.

Figure 28:
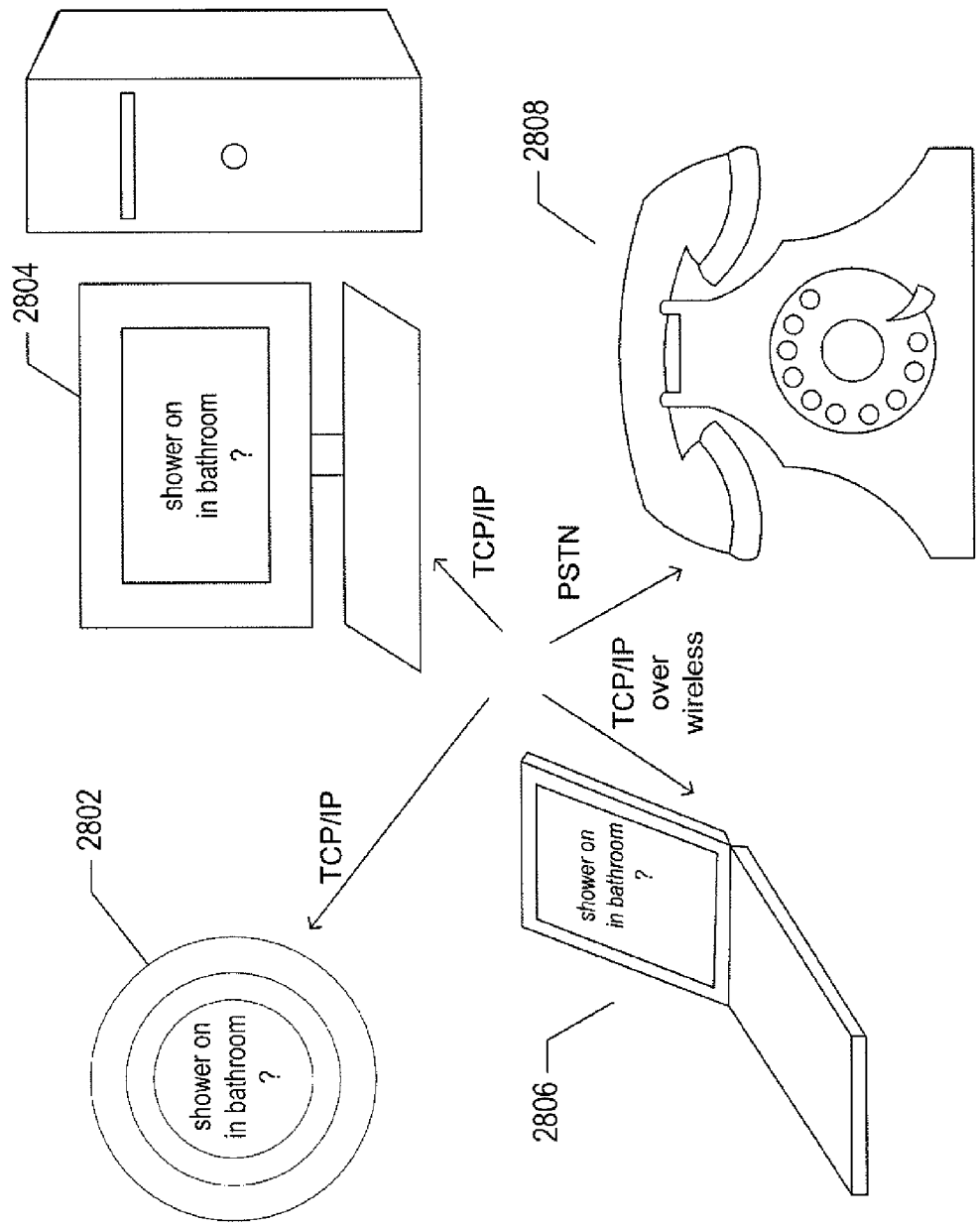
FIG. 28 illustrates the types of devices through which a user may be reached by the intelligent control system.

To obtain needed supplementary information in order to interpret signals acquired through monitoring an interior environment and in order to assemble as complete an information set as possible in order to characterize the interior environment, the intelligent control system, to which the current application is directed, transmits information queries to a user. FIG. 28 illustrates the types of devices through which a user may be reached by the intelligent control system. The intelligent control system may send an information query via TCP/IP, for display and user response, to an intelligent thermostat 2802, by TCP/IP to a user computer 2804, by TCP/IP over wireless communications to a user mobile phone 2806, and even by the public switched telephone network to a user landline phone 2808. Information queries may be additionally transmitted to other types of devices through which a user can be reached. Different types of devices may be preferable in different circumstances. For example, for queries related to ongoing activities and events in the residential environment, information requests displayed on the intelligent thermostat may be preferred, since a user viewing and responding to such information queries is certain to be present within the environment and in the best position to accurately respond to the queries. By contrast, an information inquiry related to unusual activity observed when residents are away on vacation may be preferably directed to a resident's cell phone. While particular user-contact devices may be preferable for particular types of information queries, such preferences may also be weighed against user-specified preferences with respect to times and methods for receiving information queries from the intelligent control system as well as, when possible, determination, by the intelligent control system, on an ongoing basis, how best to transmit an information query to a user at various different times and under various different conditions.

Figure 29:
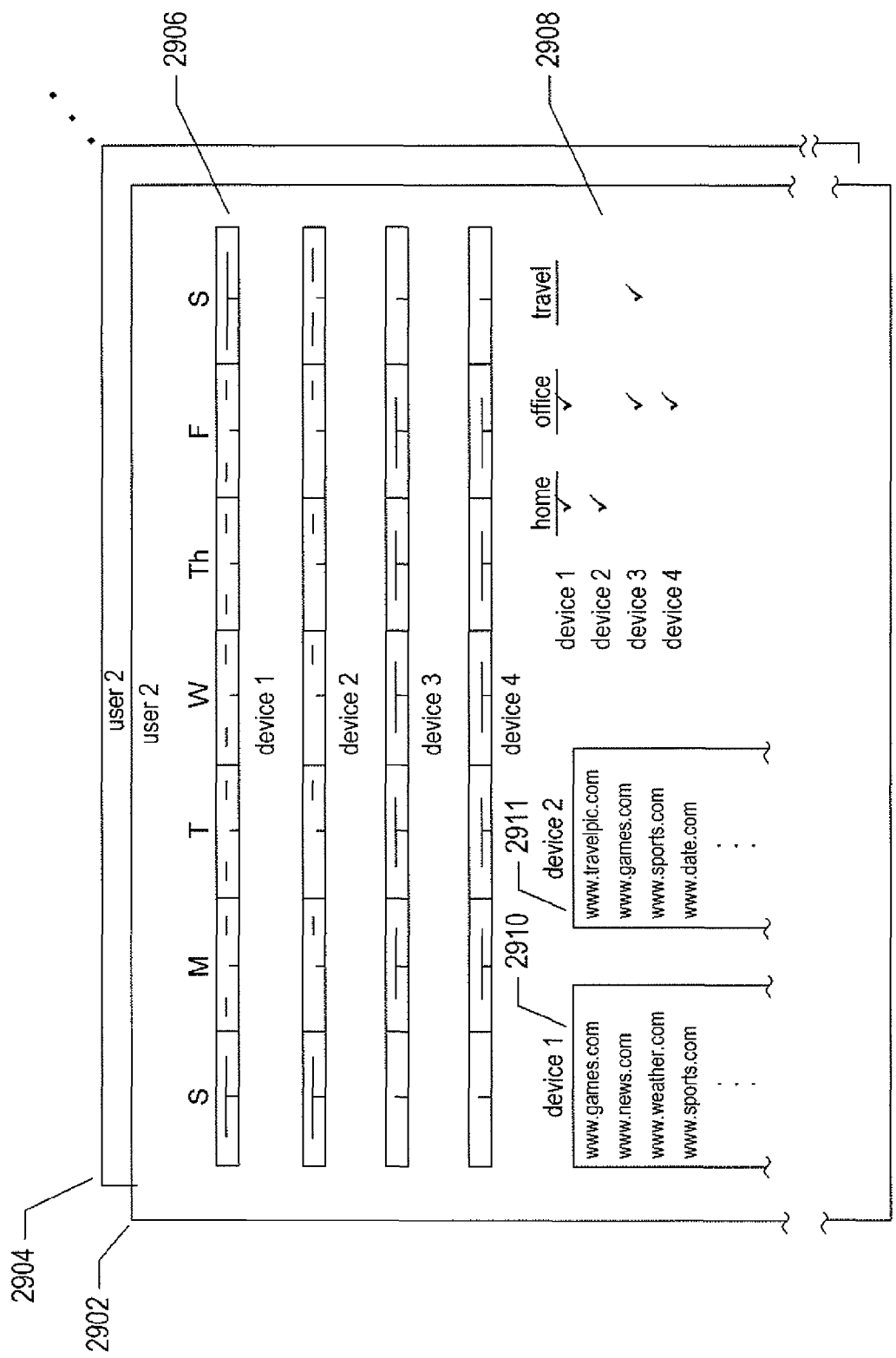
FIG. 29 illustrates contact information that may be maintained by an intelligent control system in order to effectively and non-obtrusively obtain information about a controlled environment from users.
Figure 30A:
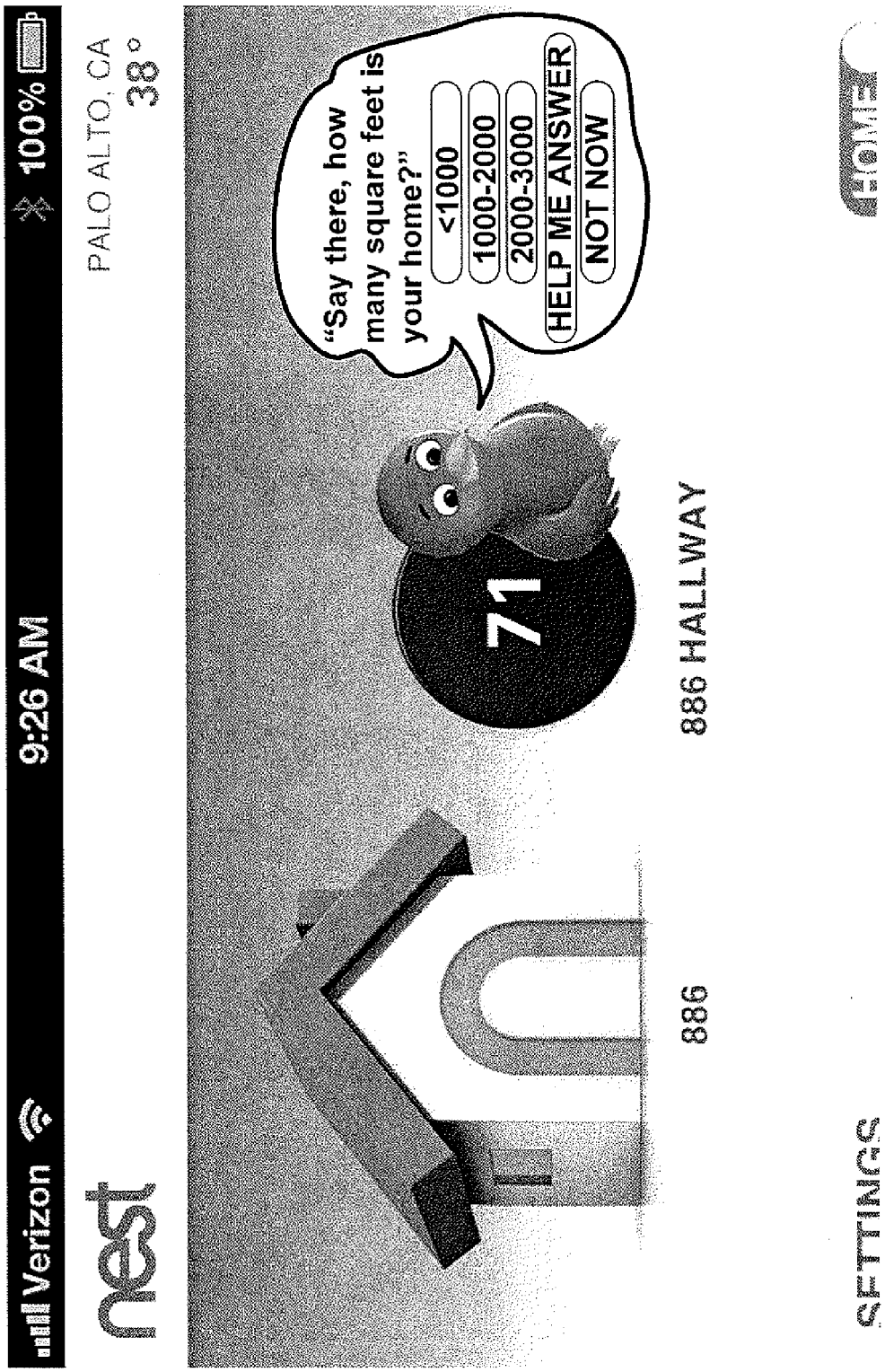
FIGS. 30A-C illustrate friendly, engaging information inquiries displayed on a mobile phone, a web browser, and on an intelligent thermostat, respectively.
Figure 30B:
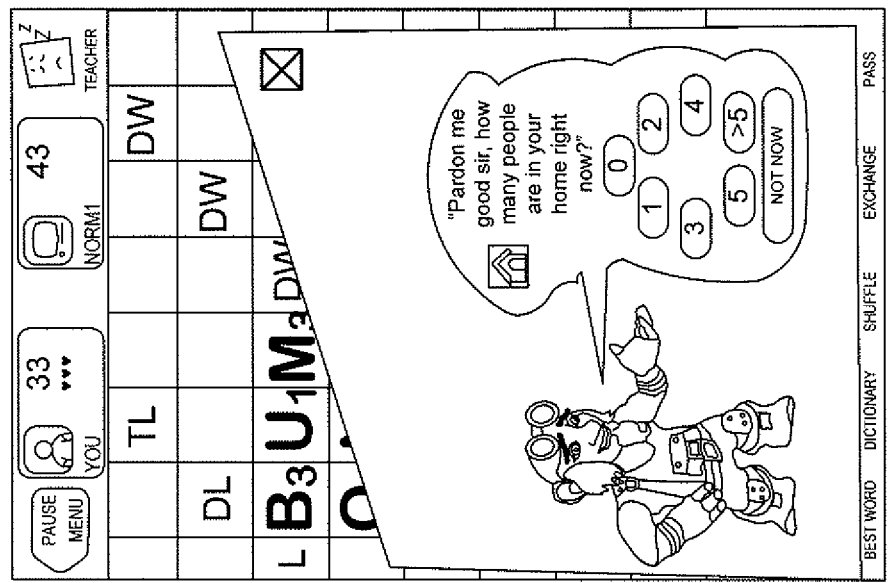
Figure 30C:
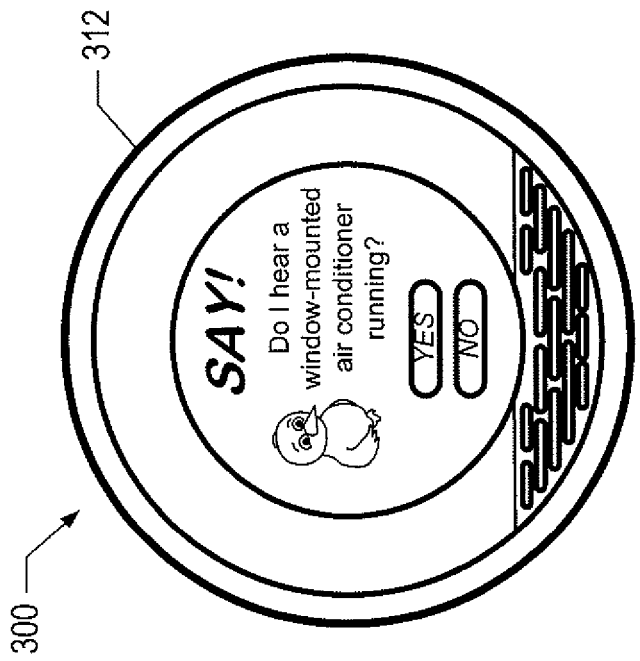

FIG. 29 illustrates contact information that may be maintained by an intelligent control system in order to effectively and non-obtrusively obtain information about a controlled environment from users. As shown in FIG. 29, contact information may be maintained by the intelligent control system for each user that can be contacted for information concerning a controlled environment 2902 and 2904. The information may include a detailed schedule, such as schedule 2906, for each device through which a user may be contacted. The schedule indicates times during which a user can be reached through a particular device. There may be different schedules for different classes of information inquiries, such as separate schedules for routine information collection, critical information collection, and alarm conditions. There may be additional information 2908 with regard to devices preferred by the user when the user is in different locations or engaged in different types of activities. For devices that support web browsers, there may be tables of web-site listings 2910-2911 that provide indications of browsing activities during which the user is amenable to receiving information inquiries in browser pop-ups or windows. There may be additional information regarding the types and formats of information inquiries preferred by the user. For example, certain users may prefer a simple, terse message, such as the message "shower on in bathroom?" displayed on various devices in FIG. 28. By contrast, a user may prefer more engaging, friendly inquiries. FIGS. 30A-C illustrate friendly, engaging information inquiries displayed on a mobile phone, a web browser, and on an intelligent thermostat, respectively. This information may be acquired during initial configuration in an interactive session with a user, by similar periodic interactive sessions, by tracking explicit feedback from users included in information-query responses, and by collecting and compiling statistical information related to the rate of success achieved by different types of user-contact methods.

The user contact information, discussed with reference to FIG. 29, information concerning the controlled environment, discussed with reference to FIG. 27, and other information components of a computational model for a controlled environment may be stored locally in an intelligent thermostat, stored centrally in a central-data-center component of the intelligent control system, or stored in distributed fashion among various components of the intelligent control system. The information is digitally encoded and stored on physical mass-storage devices, including electromagnetic mass-storage and electro-optico-mechanical data-storage devices.

Information queries can be displayed, and responses to the information queries can be received, by a wide variety of different communications mechanisms. The intelligent control system may employ and manage browser plug-ins for user-device web browsers, mobile-phone applications, personal-computer applications, and other such mechanisms for displaying textural and graphical information inquiries. In addition, the intelligent control system may maintain lists of various different types of contact information by which the intelligent control system may contact a user using instant messaging, automated phone messages, email messages, and many other types of communications. The contact information maintained for users, illustrated in FIG. 29, may be acquired by the intelligent control system using many different techniques and methods. For example, the device schedules and other information may be input through an intelligent thermostat using user interfaces similar to those used to input heating and cooling schedules. Alternatively, contact-information interactive configuration-management tools may be made available to users on personal computers, tablets, and mobile phones to allow users to initially indicate their availability for responding to information inquiries from the intelligent control system as well as preferred types of contact. The information may be updated, as mentioned above, on a continuing basis, by the intelligent control system based on user responses to information queries as well as direct and indirect user feedback associated with those queries. For example, the queries may allow a user to indicate that it is inconvenient or impossible for the user to respond, under current conditions, or that the user prefers some alternative type of information query. Over time, user preferences and availabilities may change, an intelligent control system can update the contact information maintained by users in order to track changes in user preferences and availabilities.

The information queries sent to users may be sent from an off-site control system, from intelligent thermostats, from centralized communications servers associated with the intelligent control system, or by various combinations of cooperating devices and systems. Certain classes of information queries may be generated locally by intelligent thermostats for immediate, local responses. When residents are unavailable or elect not to respond to the information queries, the information queries may be discarded by the intelligent thermostat. Certain types of information queries, particularly those associated with potentially hazardous observed conditions or activities, may be transmitted to multiple devices and periodically retried until a response is received.

Figure 31:
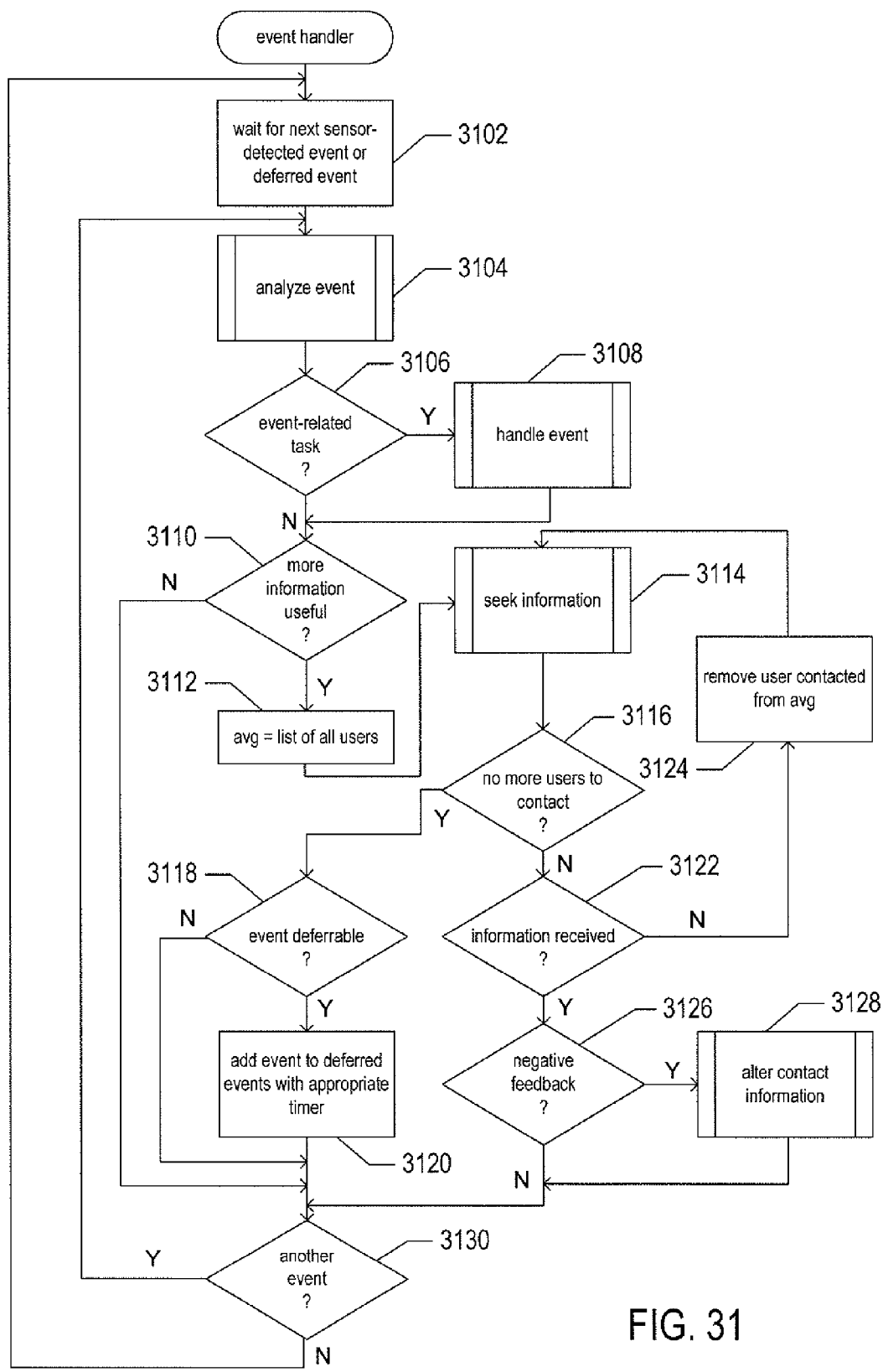
FIGS. 31-34 provide control-flow diagrams that illustrate querying of users for information by an intelligent control system.

FIGS. 31-34 provide control-flow diagrams that illustrate querying of users for information by an intelligent control system. FIG. 31 shows a control-flow diagram for an intelligent control system which includes an offsite intelligent control system that communicates within on-site intelligent thermostats or an on-site intelligent thermostat. The intelligent control system is modeled as an event handler that continuously waits, in step 3102, for a next sensor-detected event or expiration of a timer associated with a deferred information query, or information-query-timer event, and then responds to the event or deferred information query. When the next event is detected, the intelligent control system analyzes the event, in step 3104. Event analysis may involve a comparison of various types of sensor data with the detailed information that characterizes and parameterizes the controlled environment, such as that shown in FIG. 27. The analysis may result in a precise characterization of the event, a list of possible different types of events associated with the observed sensor data, or may result in an indication of an unexpected, previously unobserved, and therefore uninterpretable event, among possible analysis results.

When the event can be characterized to some threshold level of certainty, as determined in step 3106, and when there is a task for the intelligent control system associated with the event, then the intelligent control system undertakes event handling for the event in step 3106. Many different types of event handling are possible. For example, the occurrence of certain types of events may result in adjustment of the operational parameters associated with heating/cooling units and other actively controlled devices and systems. Alternatively, events may result in the triggering of alarms, contact of police or security organizations, and many other types of intelligent-control-system activities. Once the event is handled, prior to handling the event, or concurrently with event handling, the intelligent control system may determine that more information related to the event may be useful, in step 3110. When more information from a user is determined to be potentially useful, the intelligent control system constructs a list of all possible users who may be contacted as an argument, in step 3112, for calling a seek-information routine in step 3114. The seek-information routine, discussed below, attempts to obtain information from a particular user included in the list of users. The seek-information routine may determine that there are no users who can be contacted, currently, may determine that there are no more users to evaluate left in the list of users passed to the seek-information routine, or may obtain the sought information as well as feedback concerning the information inquiry. When the seek-information routine has failed to obtain the information and there are no more users to contact, as determined in step 3116, then, in step 3118, the intelligent control system determines whether or not the information query is deferrable. When collection of additional information for the event is deferrable, the intelligent control system adds the information query to a list of deferred information queries and associates the information query with an appropriate timer, in step 3120, to ensure that the information query is subsequently reconsidered and information again sought with respect to the event. When the routine seek-information has failed to obtain information from a user, and there are more users to attempt to contact, as determined in step 3122, then the user from which information was failed to be obtained is removed from the list of users supplied as argument to the seek-information routine, in step 3124, and the seek-information is then called to attempt to obtain information from another user. When the information was obtained by the seek-information routine, as determined in step 3122, and when feedback was explicitly or implicitly associated with the user's response, as determined in step 3126, then the information control system calls the alter-contact-information routine in step 3128 to adjust contact information for the user. Once the event has been handled and any additional information collected or attempted to be collected, and when there is another event to handle that has occurred during handling of the event analyzed in step 3104, as determined in step 3130, then control flows back to step 3104 to analyze the next event. Otherwise, control flows back to step 3102, where the intelligent control systems waits for the occurrence of a next event.

Figure 32:
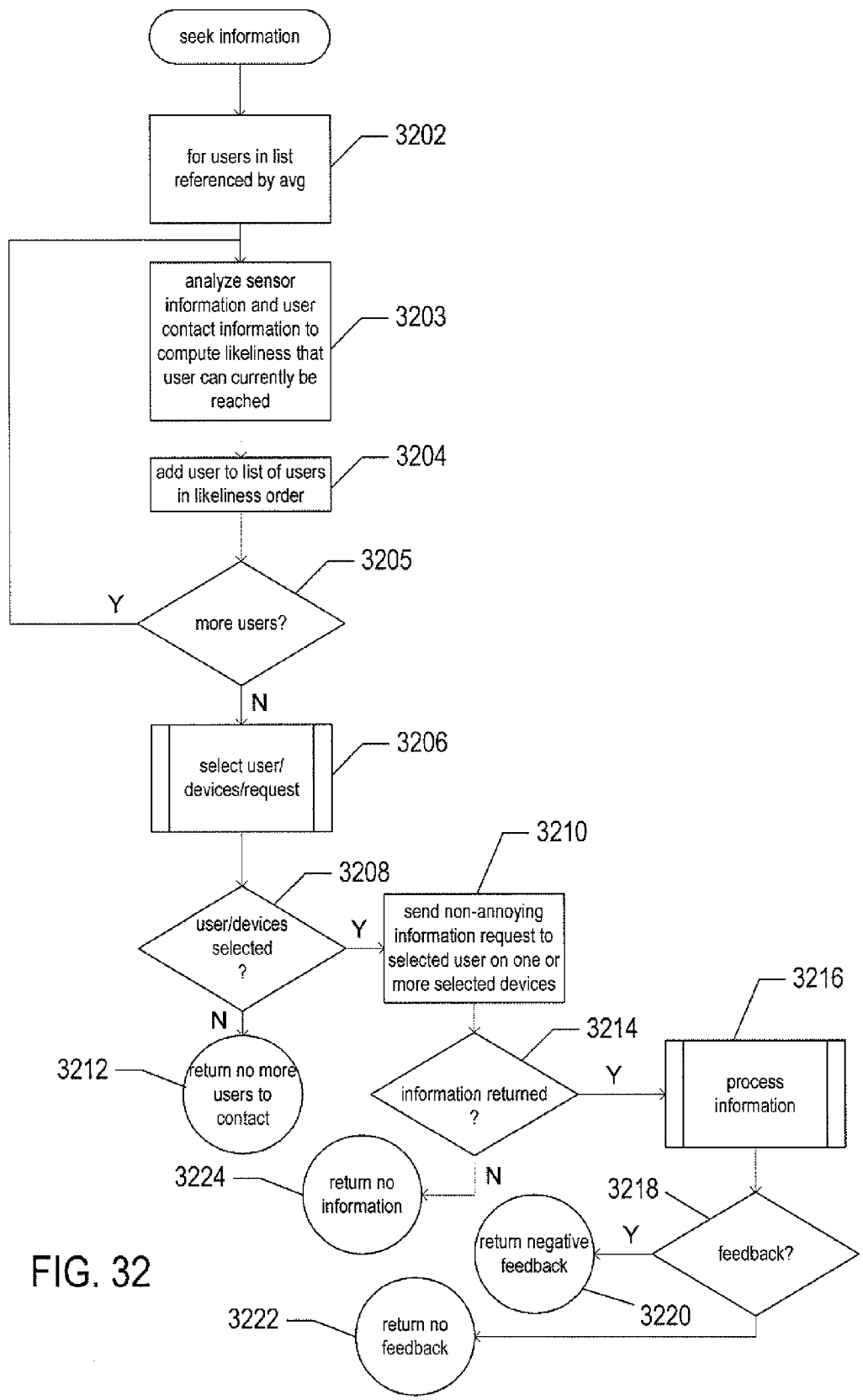

FIG. 32 provides a control-flow diagram of the seek-information routine called in step 3114 of FIG. 31. In the for-loop of steps 3202-3205, the seek-information routine evaluates each user in the list of users supplied as an argument to the routine with respect to the likelihood that the user is available for responding to an information query regarding a particular event. Then, in step 3206, the seek-information routine calls a select user/devices/request routine in order to select a particular user, one or more user devices, and a request type. When a user and one or more user devices and request type have been selected, as determined in step 3208, then the information control system sends an information request to the selected user on the one or more selected devices of the selected request type in step 3210. Otherwise, the seek-information routine returns an indication that there are no more users to attempt to contact in order to obtain information, in step 3212. When an information request has been sent in step 3210, and information is returned by the user, as determined in step 3214, the information is processed in step 3216 by the intelligent control system. The types of information processing may vary depending on the type of information requested and on the type of event with respect to which the information was requested. As discussed above, processing of the information may result in updating the information obtained to characterize and parameterize the controlled environment, discussed above with reference to FIG. 27, and may additionally generate additional intelligent-control-system activities. When the returned information includes explicit or implicit feedback, as determined in step 3218, then an indication that feedback was received is returned in step 3220. Otherwise, an indication that information was received without feedback is returned in step 3222. When no information is obtained in response to the information query, as determined in step 3214, then an indication of no information being received is returned in step 3224.

Figure 33:
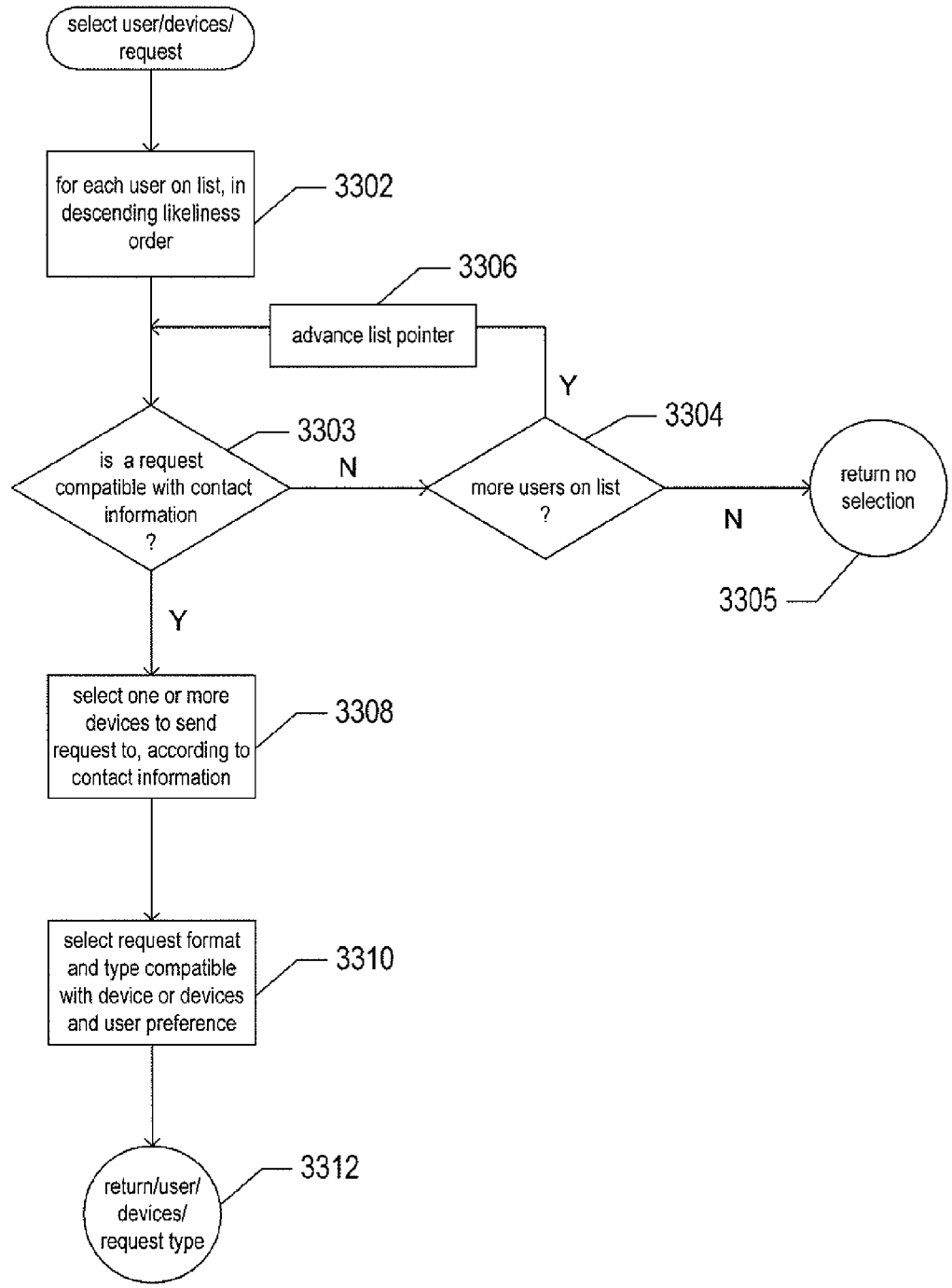

FIG. 33 provides a control-flow diagram for the select user/devices/request routine called in step 3206 in FIG. 32. In the for-loop of steps 3302-3306, the select user/devices/request routine evaluates each user on the list of users generated in the for-loop of steps 3202-3205, in FIG. 32, to determine whether the user contact information associated with the user is compatible with transmitting an information query to the user. The list of users is evaluated in descending-likeliness-of-responding order, so that the first user associated with contact information compatible with sending an information query is selected for contact, in step 3303. When a currently evaluated user is not compatible for receiving an information query, as determined in step 3303, then when there are more users on the list prepared in the for-loop of steps 3202-3205, as determined in step 3304, then a list pointer is advanced, in step 3306, so that a next user on the list is evaluated in a next iteration of the for-loops of steps 3302-3306. Otherwise, when there are no more users on the list, an indication that no selection was made is returned in step 3305. When a user is selected, then, in step 3308, the user's contact information is evaluated to determine one or more devices to which an information query is sent. This determination may depend on the type of information sought, the contact information associated with the user, and other considerations. Finally, a request type is chosen for the request in step 3310, again depending on type of information, the type of request preferred by the user as indicated in the user's contact information, and other criteria. In step 3312, an indication of the selected user, user devices, and request type is returned.

Figure 34:
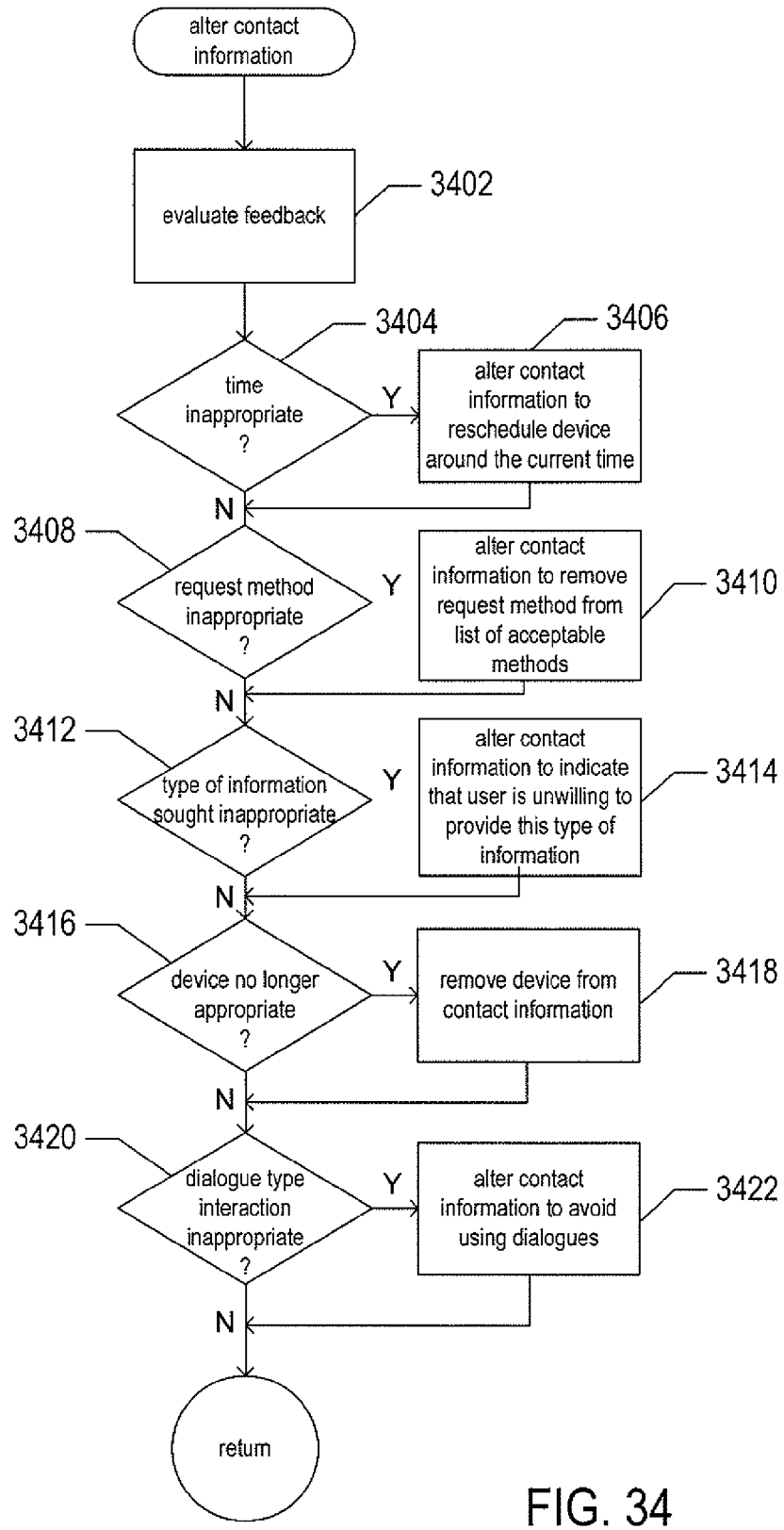

FIG. 34 is a control-flow diagram for the alter-contact-information routine called in step 3128 in FIG. 31. In step 3402, the feedback returned along with the information in response to an information query is evaluated. When the feedback indicates that the time at which the information query was sent was inappropriate, as determined in step 3404, then the information control system alters contact information for a user to de-schedule the device or devices for times around the current time, in step 3406. When feedback indicates that the request method was inappropriate, as determined in step 3408, then the contact information for the user is altered to change the preferred request type with respect to the time and event, in step 3410. When the feedback indicates that the type of information sought was inappropriate, as determined in step 3412, then the user's contact information is altered to indicate that the user is unwilling to respond to the type of information request sent to the user, in step 3414. When the feedback information indicates that the device on which the user was contacted is no longer appropriate for information queries, as determined in step 3416, then the device is removed from the user's contact information in step 3418. When the feedback information indicates that the dialog type of the information-seeking interaction with the user was inappropriate, as determined in step 3420, then the contact information is altered to indicate that the user prefers not to be queried using interactive dialogs, in step 3422. There are many additional types of feedback and actions related to these types of feedback possible for updating and tracking user preferences for information-query contact. Additionally, contact methods that result in lack of responses may be tabulated and compared to contact methods for which responses are returned, in order to learn, over time, the best ways for collecting information from particular users, the learning reflected in the stored contact information as well as in additional predicates, rules, and other information that may be generated, over time, by the intelligent control system. In general, the intelligent control system seeks to optimize the response level to information queries from users by directing information queries intelligently to users best able and most willing to respond to them through user devices which the users are most likely to respond to received information queries at times appropriate for the users and using formats and styles most likely to encourage user responses.

The subject matter of this patent specification also relates to the subject matter of the following commonly assigned applications: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; and U.S. Prov. Ser. No. 61/627,996 filed Oct. 21, 2011. PCT/US11/61339 filed Nov. 18, 2011; PCT/US11/61344 filed Nov. 18, 2011; PCT/US11/61365 filed Nov. 18, 2011; PCT/US11/61379 filed Nov. 18, 2011; PCT/US11/61391 filed Nov. 18, 2011; PCT/US11/61479 filed Nov. 18, 2011; PCT/US11/61457 filed Nov. 18, 2011; PCT/US11/61470 filed Nov. 18, 2011; PCT/US11/61339 filed Nov. 18, 2011; PCT/US11/61491 filed Nov. 18, 2011; PCT/US11/61437 filed Nov. 18, 2011; PCT/US11/61503 filed Nov. 18, 2011; U.S. Ser. No. 13/342,156 Filed Jan. 2, 2012; PCT/US12/00008 filed Jan. 3, 2012; PCT/US12/20088 filed Jan. 3, 2012; PCT/US12/20026 filed Jan. 3, 2012; PCT/US12/00007 filed Jan. 3, 2012; U.S. Ser. No. 13/351,688 filed Jan. 17, 2012; U.S. Ser. No. 13/356,762 filed Jan. 24, 2012; and PCT/US12/30084 filed Mar. 22, 2012. Each of the above-referenced patent applications is incorporated by reference herein.

Although the present invention has been described in terms of particular examples, it is not intended that the invention be limited to these examples. Modifications within the spirit of the invention will be apparent to those skilled in the art. For example, as discussed above, information queries can be generated, transmitted, and responses received by intelligent thermostats, offsite intelligent control systems, centralized communications systems in communication with intelligent thermostats and/or offsite intelligent control systems, and by other entities. The information queries can be used to create and maintain any of many different types of information that characterize the described controlled environment to facilitate intelligent-control-system control of that environment. Information queries may be transmitted through many different types of communications media and many different types of forms that are displayed in many different ways to users. Implementation of user-query components and subsystems can be carried out using many different implementation strategies and methods by selecting values for any of many different implementation parameters, including control structures, data structures, modular organization, programming language, underlying operating system, and other such implementation parameters.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

The invention claimed is:

1. An intelligent control system comprising:
one or more intelligent thermostats, located in an environment controlled by the intelligent control system, the one or more intelligent thermostats being configured to:
employ sensor-based monitoring of the environment controlled by the intelligent control system; and
a centralized intelligent-control-system data center configured to:
maintain a list of one or more devices through which information queries may be sent to one or more users;
maintain personal contact information comprising times associated with the one or more devices during which the information queries may be sent to one or more users;
send the information queries, according to the times, to the one or more devices; and
maintain, in one or more electronic memories, a computational model of the environment controlled by the intelligent control system, wherein maintaining the computational model is based at least in part on:
the sensor-based monitoring of the environment; and
responses to the information queries directed to the one or more users.

2. The intelligent control system of claim 1 wherein the devices include one or more of:
intelligent thermostats;
mobile phones;
personal computers; and
phones connected to a public switched telephone network.

3. The intelligent control system of claim 1 wherein the personal contact information includes indications of user activities associated with the devices that can be interrupted by the information queries.

4. The intelligent control system of claim 1 wherein the personal contact information includes indications of types of the information queries that the one or more users are willing to respond to.

5. The intelligent control system of claim 1 wherein the personal contact information includes indications of types of information that the one or more users are willing to furnish to the intelligent control system in response to the information queries.

6. The intelligent control system of claim 1 wherein the intelligent control system, as part of continuous event handling:
determines whether additional information unavailable from sensor data and the already-stored computational model of the environment is needed; and
when the additional information is determined to be needed,
uses the personal contact information to select a user and a device through which the user can receive information queries,
uses the personal contact information to select a type of information query that corresponds to the user's preferences for information queries and that is compatible with the selected device, and
transmits an information query of the selected type to the selected user through the selected device for the additional information.

7. The intelligent control system of claim 6 wherein the intelligent control system selects the user by:
when information about only one user is stored in the personal contact information, selecting the one user; and
when information about multiple users is stored in the personal contact information, selecting a user, from among the multiple users, determined to be most likely to respond to an information query.

8. The intelligent control system of claim 6 wherein the intelligent control system selects the device by:
determining a device from among the devices characterized by the personal contact information that is likely to be accessible to the selected user at a time when the information query is transmitted.

9. The intelligent control system of claim 6 wherein, by selecting the user, device, and type of information query based on the personal contact information, the intelligent control system optimizes, over time, the percentage of information queries transmitted to users for which responses from users are received.

10. A method of using an intelligent control system, the method comprising:
employing, by one or more intelligent thermostats located in an environment controlled by the intelligent control system, sensor-based monitoring of an environment controlled by the intelligent control system;
maintaining, by a centralized intelligent-control-system data center, a list of one or more devices through which information queries may be sent to one or more users;
maintaining, by the centralized intelligent-control-system data center, personal contact information comprising times associated with the one or more devices during which the information queries may be sent to one or more users;
sending, by the centralized intelligent-control-system data center, the information queries, according to the times, to the one or more devices; and
maintaining, by the centralized intelligent-control-system data center, and in one or more electronic memories, a computational model of the environment controlled by the intelligent control system, wherein maintaining the computational model is based at least in part on:
the sensor-based monitoring of the environment; and
responses to the information queries directed to the one or more users.

11. The method of claim 10, wherein the devices include one or more of:
intelligent thermostats;
mobile phones;
personal computers; and
phones connected to a public switched telephone network.

12. The method of claim 10, wherein the personal contact information includes indications of user activities associated with the devices that can be interrupted by the information queries.

13. The method of claim 10, wherein the personal contact information includes indications of types of the information queries that the one or more users are willing to respond to.

14. The method of claim 10, wherein the personal contact information includes indications of types of information that the one or more users are willing to furnish to the intelligent control system in response to the information queries.

15. The method of claim 10, further comprising:
determining, by the centralized intelligent-control-system data center, whether additional information unavailable from sensor data and the already-stored computational model of the environment is needed; and
when the additional information is determined to be needed,
using, by the centralized intelligent-control-system data center, the personal contact information to select a user and a device through which the user can receive information queries,
using, by the centralized intelligent-control-system data center, the personal contact information to select a type of information query that corresponds to the user's preferences for information queries and that is compatible with the selected device, and
transmitting, by the centralized intelligent-control-system data center, an information query of the selected type to the selected user through the selected device for the additional information.

16. The method of claim 15, wherein selecting the user comprises:
when information about only one user is stored in the personal contact information, selecting, by the centralized intelligent-control-system data center, the one user; and
when information about multiple users is stored in the personal contact information, selecting, by the centralized intelligent-control-system data center, a user, from among the multiple users, determined to be most likely to respond to an information query.

17. The method of claim 15, wherein selecting the device comprises:
determining, by the centralized intelligent-control-system data center, a device from among the devices characterized by the personal contact information that is likely to be accessible to the selected user at a time when the information query is transmitted.

18. The method of claim 15, further comprising optimizing, over time by the centralized intelligent-control-system data center, a percentage of information queries transmitted to users for which responses from users are received by selecting the user, device, and type of information query based on the personal contact information.

* * * * *